United States Patent [19]

Toide et al.

[11] Patent Number: 5,570,140
[45] Date of Patent: Oct. 29, 1996

[54] PROJECTION UNIT FOR PROJECTION TYPE DISPLAY APPARATUS

[75] Inventors: Eiichi Toide; Kazuo Tsukagoshi, both of Nagaokakyo, Japan

[73] Assignee: Mitsubishi Denki Kabushiki Kaisha, Tokyo, Japan

[21] Appl. No.: 271,672

[22] Filed: Jul. 7, 1994

[30] Foreign Application Priority Data

| Jul. 8, 1993 | [JP] | Japan | 5-169054 |
| Jul. 16, 1993 | [JP] | Japan | 5-176676 |
| Aug. 6, 1993 | [JP] | Japan | 5-215146 |
| Aug. 19, 1993 | [JP] | Japan | 5-205133 |
| Sep. 21, 1993 | [JP] | Japan | 5-234994 |
| Apr. 8, 1994 | [JP] | Japan | 6-070697 |

[51] Int. Cl.$^6$ ............................................. H04N 5/74
[52] U.S. Cl. ...................... 348/744; 348/748; 348/750; 348/756; 359/649; 359/652
[58] Field of Search ............................ 348/744, 748, 348/749, 750, 756, 778, 779, 781, 657; 359/455, 448, 820, 649, 652, 653; H04N 5/74

[56] References Cited

U.S. PATENT DOCUMENTS

| 4,916,532 | 4/1990 | Streck et al. | 358/83 |
| 4,941,036 | 7/1990 | Itoh | 358/60 |
| 5,146,322 | 9/1992 | Tetsuda | 348/750 |
| 5,157,554 | 10/1992 | Kashihara | 359/820 |
| 5,287,173 | 2/1994 | Onuma et al. | 348/744 |
| 5,337,093 | 8/1994 | Kaneko et al. | 348/778 |

FOREIGN PATENT DOCUMENTS

| 5-34819 | 2/1993 | Japan | H04N 5/74 |

*Primary Examiner*—Safet Metjahic
*Assistant Examiner*—Jeffrey S. Murrell

[57] ABSTRACT

A projection type display apparatus incorporating a light receiver or a light transmitter, in which the light signal is received or transmitted through a screen or condensing lens disposed in its vicinity, and hence the luminous flux utility efficiency is high.

A projection type display apparatus capable of preventing deterioration of picture quality due to difference in color in the projection units, and the best picture quality is realized even when the projection lenses for different colors are composed of nearly same components.

11 Claims, 54 Drawing Sheets

BLUE

GREEN

RED

PROJECTION UNIT FOR PROJECTION TYPE DISPLAY APPARATUS

BACKGROUND OF THE INVENTION

1. Field of the Invention

The present invention relates to a projection type display apparatus capable of easily obtaining a large screen image, and more particularly to a constitution of projection type display apparatus and projection unit provided with a spatial light transmission system for transmitting and receiving video signals and audio signals by a spatial light transmission apparatus that does not require wiring.

2. Description of the Related Art

FIG. 1 is a schematic longitudinal sectional view showing a general constitution of a conventional projection type display apparatus. At the front side of a projection type display apparatus 1, a screen 5 is provided, and a mirror 4 is installed obliquely downward in its back side. Further at a lower side, a CRT 2 is provided at a specific angle to the mirror 4, and a projection lens 3 is disposed at the display surface side of the CRT 2.

The image formed on the CRT 2 is magnified by the projection lens 3, reflected by the mirror 4, and is magnified and projected on the screen 5. At this time, the video signal and audio signal are given from a signal source 6 such as VTR and optical disk connected by wire to the projection type display apparatus 1. Accordingly, the signal source 6 must be installed near the projection type display apparatus 1, and it was inconvenient to replace the tape or disk. Besides, since the viewer must replace the tape by hand, when the signal source 6 is located near the viewer, the signal wires may be laid around, which was not advantageous for the appearance of the room.

Recently, as the apparatus for solving this problem, a spatial light transmission apparatus is noticed. FIG. 2 is a structural drawing showing a conventional spatial light transmission apparatus. The spatial light transmission apparatus comprises a spatial light transmission transmitter (hereinafter called light transmitter) 7 connected to a signal source 6 disposed apart from a projection type display apparatus 1, and a spatial light transmission receiver (hereinafter called light receiver) 8 disposed on the top of the projection type display apparatus 1, being connected by using a short signal wire. The light transmitter 7 modulates the video signal and audio signal by a modulation circuit, and converts into light signal by a light source 9 such as light emitting diode, and emits a luminous flux 10. FIG. 3 is a schematic diagram showing the constitution of the light receiver 8. The light receiver 8 comprises a photoreceptor 21 including a photo detector 11, and a demodulation circuit. In the light receiver 8, the photo detector 11 receives the luminous flux 10, converts photoelectrically, then demodulates the signal in the demodulation circuit, and gives to the projection type display apparatus 1.

In such spatial light transmission apparatus, it is not necessary to install a signal source around the signal source 6 and projection type display apparatus 1, and they can be separated in space. Therefore, when viewing the projection type display apparatus 1 from a relatively distant place, it is not necessary to lay down a long signal wire, and it is particularly advantageous.

FIG. 4 is a diagram showing the state of appreciating the picture by the projection type display apparatus. The projection type display apparatus 1 can show a large screen of about 40 inches to 70 inches on a screen 5 by its projection unit, and it is a display apparatus suited to be viewed by a multiplicity of audience at a position several meters apart, but when occupied by one person or to prevent the sound from leaking outside, as shown in FIG. 4, it is often enjoyed by connecting a headphone so that the sound may not be heard by the others. In such a case, the viewer puts on a headphone 31 connected to the projection type display apparatus 1 by way of a signal wire 32.

However, when the viewer appreciates from a position several meters apart from the display type projection apparatus 1, it is necessary to connect a long signal wire 32 of several meters from the projection type display apparatus 1. Such case was accompanied by the trouble of wire laying, deterioration of signal during transmission through the signal wire 32, and restriction of the motion of the viewer by the length of the signal wire 32, among others.

The spatial light transmission apparatus is noticed as an apparatus for solving such problems. FIG. 5 is a diagram showing other constitution of such conventional spatial light transmission apparatus. This space-transmission apparatus comprises a spatial light transmission transmitter (hereinafter called light transmitter) 33 connected to the top of the projection type display apparatus 1 through a short signal wire, and a spatial light transmission receiver (hereinafter called light receiver) 34 connected to the headphone 31. The light transmitter 33 modulates the audio signal by the modulation circuit, converts into light signal by a light source such as light emitting diode, and emits a luminous flux 35. In the light receiver 34, the photo detector receives the luminous flux 35, converts photoelectrically, demodulates the signal in the demodulation circuit, and transmits a desired audio signal to the headphone 31. Since the spatial light transmission apparatus can transmit audio signal to the viewer without resort to wire, long wiring installation is not needed.

In the conventional projection type display apparatus 1 as shown in FIG. 2, however, the luminous flux utility rate is low due to the spread of the luminous flux 10 of the light transmitter 7 and the smallness of the light receiving area of the light receiver 8, and this caused a problem that the spatial light transmission efficiency in a long distance was poor. Besides, the light receiver 8 or light transmitter 33 is disposed on the projection type display apparatus 1, which was not favorable For the appearance.

A main cause of low utility rate of luminous flux is that the light emitting diode 9 as light source generally includes a half-power spreading angle of 5 degrees to 10 degrees or more, that is, in the case of spatial light transmission for about 5 meters, the diameter of the luminous flux is about 2 meters. On the other hand, the photo detector 11 is required to have a fast response to the video signal, and hence its area is limited, and specifically it is defined within about. 3 mm to 5 mm. Therefore, since the utility efficiency of luminous flux is the area ratio, only about 10E to 6 can be utilized. To compensate for such low luminous flux utility efficiency, as conventional examples of improvement, plural light emitting diodes 9 were used the transmitter 7, or a condensing lens 12 with an aperture of about 10 mm to 20 mm is disposed at the front side of the photo detector 11 of the photoreceptor 21 as shown in FIG. 3, thereby increasing the apparent light receiving area.

At this time, however the light transmitter and receiver 7, 8 become large in size, and the cost is increased, and the incident angle of the luminous flux 10 that can be received is limited, and these problems remain unsolved. That is, as shown in FIG. 3, the luminous flux with an incident angle exceeding angle θ determined by the focal length of the condensing lens 12 and size of the photo detector 11 cannot be received by the photo detector 11. Therefore, to confront the direction of the exit luminous flux 10 from the light transmitter 7 in FIG. 2, there arised such problems that it was necessary to adjust the direction of the photoreceptor 21.

Moreover, in the conventional projection type display apparatus 1 shown in FIG. 5, the position of the audience was limited by the directivity of the luminous flux 35. Yet, same as in FIG. 2, the light receiver 8 or light transmitter 33 is disposed on the projection type display apparatus 1, which was not favorable for the appearance.

Generally, the light emitting diode of the light source used in the transmitter 7 includes a half-power spreading angle of 5 degrees to 10 degrees or more, and in the case of spatial light transmission for about 5 meters, for example, the diameter of the luminous Flux is about 2 meters. On the other hand, the projection type display apparatus 1 includes a wide viewing range of about 140 degrees in the horizontal direction, and about 30 degrees in vertical direction, and hence there arised such problems that it was necessary to adjust the direction of the light transmitter 33 so that the optical axis 36 which is the center line of the luminous flux 35 may be directed to the light receiver 34, in order to receive the luminous flux 35 depending on the position of the viewer.

A constitution of a conventional three-tube projection type display apparatus having three monochromatic CRTs as image forming means is explained by reference to FIG. 6. Reference numerals 71R, 71G, and 71B are CRTs (cathode ray tubes) comprising image forming means for red, green and blue, respectively, and projection lenses 72R, 72G, and 72B are disposed at the face plate side of the CRTs 71R, 71G, and 71B through spacers 74R, 74G, and 74B, respectively. The optical axes 75R, 75G, and 75B of the lights emitted from the CRTs 71R, 71G, and 71B and passing through the spacers 74R, 74G, and 74B and projection lenses 72R, 72G, and 72B are projected on a screen 73 at specific angles.

CRTs are monochromatic CRTs 71R, 71G, and 71B corresponding to the three primary colors of red, green, and blue, and, as shown in FIG. 6, images drawn on CRTs 71R, 71G, and 71B are magnified and projected by the projection lens 72 and formed on the screen 73. At this time, the projection unit including the CRT 71 and projection lens 72 is disposed so that the optical axes 75R, 75G, and 75B may intersect nearly in the middle of the screen 73, and it is constituted so that the projection distances from the projection lenses 72R, 72G, and 72B along the optical axes 75R, 75G, and 75B to the screen 73 may be substantially equal.

The reasons why the focus adjustment is necessary are explained below. FIG. 7 is a longitudinal sectional view of the projection unit shown in FIG. 6. The projection lens 72 is composed of lens elements L1 to L6 disposed sequentially from the screen side, being supported by a lens barrel 78. The lens barrel 78 supports the lens elements L1 to L4 and lens elements L5, L6 separately, and incorporates a focal adjusting mechanism 79 for adjusting the interval between the lens element L4 and lens element L5 by a screw. The face plate 76 of the CRT 71 and the lens barrel 78 of the projection lens 72 are fixed to the spacer 74. The space enclosed by the face plate 76, the lens element L6 located at the position closest to the CRT side, and the spacer 74 is filled with a coolant 77.

According to the first reason why the focal adjustment is necessary, the projection lens 72 is designed at the specific projection distance and magnification, and actually when setting up the projection type display apparatus, an error of several hundred microns is caused, and when forming the image of the CRT 71 on the screen 73, a delicate focus deviation is caused, and the design performance cannot be achieved. Generally, therefore, a focal adjusting mechanism 79 as shown in FIG. 7 is provided, and the focal deviation is corrected by inching the lens barrel 78 portion which supports the lens elements L1 to L4, out of the plural lens elements L1 to L6 which compose the projection lens 72.

In the second reason why the focal adjustment is necessary, chromatic aberration is not corrected generally in the projection type display apparatus for consumer use for the purpose of cost reduction, and the projection lens 72 is varied in the focal length by the wavelength of the passing luminous flux, that is, the color light. In this prior art, since projection lenses of same composition are used in optical system of red, green, and blue colors, for example, the projection lens designed at the wavelength of green color is deviated in focus in the projection unit of red and blue. Hence, using the focal adjusting mechanism 79, it has been adjusted to obtain the best image-forming performance.

Of the plural lens elements L1 to L6 for composing the projection lens 72 for adjusting the focus, only part of them (L1 to L4) are moved, which is because coolant 77 is sealed between the projection lens 72 and face plate 76, and since the final lens element L6 is in contact, at least the final lens element L6 cannot be moved for the purpose of focal adjustment.

The conventional CRT projection type display apparatus had such constitution and action, and hence the following problems existed.

Since the projection lens 72 is in contact with the coolant 77, it is necessary to move part of the lens elements for focal adjustment. The focal adjustment for absorption of the disposition error as the first reason for requiring adjustment corresponds at most to several hundred microns or several millimeters at maximum on the screen, and the focal deviation on the screen due to difference in the wavelength or color light as the second reason for requiring adjustment was scores of millimeters to 10 cm in the projection type display apparatus of the screen size of about 40 inches to 50 inches, and this large focal deviation about 100 times of the disposition error must be absorbed by the adjustment mechanism of projection lens. As a result, in the constitution of the projection lens in the projection unit of red, green and blue, in FIG. 7, three colors could not be image-formed correctly unless the interval of the lens elements L4 and L5 was largely different.

In the projection lens, however, it is generally designed at a specific color, for example, the wavelength of green, and the shape and interval of lens elements are determined so as to achieve the optimum aberration correction at specific projection distance and magnification. Hence, in the red or blue projection unit in FIG. 7, when the interval of L4 and L5 is moved largely, the optimum aberration correction adjusted to the optimum position by focal adjustment is deviated, and the design performance is not obtained in other projection unit than green.

For example, the resolution characteristic (MTF) of the projection lens in FIG. 7 designed in green (545 nm) is shown in FIG. 8, and the resolution characteristic at the best focal position when using the same projection lens in red (610 nm) is shown in FIG. 9. In the diagrams, the axis of abscissas denotes the image height from the image center to the most peripheral area, the broken line indicates the MTF in the meridional direction (Mer), and the solid line, in the sagittal direction (Sag). When used in the red projection unit, a large performance deterioration may occur in the meridional direction in the image peripheral area, in particular.

The cause of this phenomenon lies in the reduction of size and heightening of brightness of the recent projection type display apparatus, and there is a strong demand for wider angle of view and lower F value in the projection lens. Accordingly, as shown in the example in FIG. 7, aspherical lenses are used in the lens elements L1, L2, L5, L6, to correct the aberration powerfully. In addition, the aspherical area is wide, and even a visible inflection point is formed in the peripheral pat of the aperture, in particular. Hence, the aberration correction is likely to be broken by a slight change in the relative position of the lens elements.

FIG. 10 is a schematic diagram showing an optical path in the projection lens 2, indicating only the parts of lens elements L4, L5. On a fluorescent plane 80 of the CRT 1, the luminous flux 12 emitted from the emission point 81 in the peripheral part of the screen is refracted by the lens elements L5, L4. Numeral 83 denotes the position of the lens element L4 in the design state designed for the green projection unit, and 84 indicates the position of the lens element L4 in the red projection unit. In the red projection unit, since the focal length is long, the lens elements L1 to L4 must be set remote from the lens element L5 for focal adjustment. The luminous flux 82 entering obliquely from the emission point 81 in the peripheral area of the screen differs in the incident position and angle from the design state along with the parallel move of the lens element L4. Hence, there arises a problem that the aberration correction in the design state is broken, and the picture quality deteriorates especially in the peripheral area of the screen.

This is a common problem in the projection unit having projection lens using aspherical lens, generally, not limited to the lens type shown in the prior art. Of course, the problem can be solved by designing the lenses separately for red, green and blue, or by using the lenses in consideration of the chromatic aberration correction, but it is too costly for the projection type display apparatus for consumer use, and it is an unrealistic measure.

SUMMARY OF THE INVENTION

The invention is devised to solve the above-mentioned problems of the prior art, and it is hence a primary object thereof to present a projection type display apparatus capable of transmitting and receiving in a wide range, at high utility efficiency of luminous flux, by incorporating a light transmitter or light receiver, without increasing the size of the light transmitter or light receiver.

In a projection type display apparatus of claim 1, it is characterized in that the luminous flux of the optical signal space-transmitted is received by a self-contained light receiver through a screen. Therefore, the luminous flux of the optical signal having the video signal and audio signal modulated into optical signal and space-transmitted is focused and entered into the apparatus by the Fresnel lens action of the screen which has a wide area, and is received by the self-contained light receiver.

A projection type display apparatus according to claim 2 is, in the aspect of claim 1, characterized in that the light receiver is in a conical form, and the aperture of the incident part is larger than that of the exit part, and a reflector having the top angle in the conical form greater than the viewing angle of the projection lens is disposed at the front side of the photo detector. Therefore, the focusing luminous flux from the entire screen is led into the tiny photo detector and received, while being reflected in a multiplicity by the reflector.

A projection type display apparatus according to claim 3 is, in the aspect of claim 1, characterized in that light receiver is in a conical form, and the aperture of the incident part is larger than the aperture of the exit part, and a light guide bulb with the top angle of 30 degrees or larger is provided at the front side of the photo detector. Therefore, the luminous flux focused by the screen is refracted by the incident part of the light guide, and is led into the tiny photo detector and received, while being reflected inside.

A projection type display apparatus according to claim 4 is, in the aspect of claim 1, characterized in that the photo detector is disposed near the projection lens, and plural condensing lenses are disposed so that their foci may be near the photo detector. Therefore, the luminous flux of the light signal space-transmitted is condensed and entered into the apparatus by the Fresnel lens action of the screen having a large area, and is received by the photo detector disposed near the projection lens located near the focal point. At the front side of the photo detector, plural condensing lenses are disposed so that the photo detector may be located near the focal point of each condensing lens. Accordingly, the luminous flux entering from various positions of the screen is condensed by each opposing condensing lens, and received by the photo detector.

A projection type display apparatus according to claim 5 is, in the aspect of claim 4, characterized in that plural condensing lenses are formed integrally and in a hemispherical surface shape. Therefore, luminous fluxes at various incident angles from the entire surface of the screen are condensed and received by the photo detector. As a result, the cost of the condensing parts is lowered.

A projection type display apparatus according to claim 6 is, in the aspect of claim 1, characterized in that the Fresnel lens plate is larger than the lenticular plate. Therefore, the luminous flux of the light signal transmitted in space is condensed and entered in the apparatus by the action of the Fresnel lens plate of the screen of a large area. Since the Fresnel lens plate has a larger region than the lenticular plate, the luminous flux entering through this region is not subjected to diffusion action by the lenticular plate, and hence the transmissivity is high and the utility efficiency of luminous flux is improved.

A projection type display apparatus according to claim 7 is, in the aspect of claim 6, characterized in that the larger region of the Fresnel lens plate than the lenticular plate is covered with a near infrared ray transmission filter. Therefore, undesired external light will not invade into the projection type display apparatus.

A projection type display apparatus according to claim 8 is, in the aspect of claim 1, characterized in that the photo detector is disposed at the image forming means side from the projection lens. Therefore, the luminous flux of the light signal transmitted in space is condensed and entered in the screen, and is further condensed by the projection lens and received by the photo detector.

A projection type display apparatus according to claim 9 is characterized in that a light receiver including a photo detector and a condense lens is self-contained, such that the light signal is received through the condensing lens. Therefore, the luminous flux of the light signal transmitted in space is condensed by the condensing lens, and is received by the photo detector.

A projection type display apparatus according to claim 10 is, in the aspect of claim 9, characterized by comprising an optical axis adjusting mechanism for rotating and adjusting the optical axis of the photo detector and condensing lens. Therefore, since the optical axis of the photo detector and condensing lens is adjusted by the optical axis adjusting mechanism, the luminous flux can be received by the photo detector without loss.

A projection type display apparatus according to claim 11 is, in the aspect of claim 9, characterized in that the condensing lens is a Fresnel lens. Therefore, the condensing lens may be composed in a small size and at a low cost.

A projection type display apparatus according to claim 12 is, in the aspect of claim 11, it is characterized in that in the larger region of the Fresnel lens plate than the lenticular plate, a Fresnel lens having a shorter focal length than the focal length of the Fresnel lens plate is formed integrally. Therefore, the action of condensing the luminous flux from the projection lens and the action of condensing the luminous flux transmitted in space can be done by one component.

A projection type display apparatus according to claim 13 is, in the aspect of claim 11, characterized in that plural Fresnel lenses of substantially same focal length are arranged in the larger region of the Fresnel lens plate than the lenticular plate. Therefore, it is possible to expand the incident angle of the luminous flux of space-transmission that can be led into the photo detector.

A projection type display apparatus according to claim 14 is, in the aspect of claim 13, characterized in that plural Fresnel lenses of substantially same focal length are formed integrally with the Fresnel lens plate. Therefore, the action as screen and the lens action of the photoreceptor wide in the incident angle range can be realized by one component.

A projection type display apparatus according to claim 15 is, in the aspect of claim 13, characterized in that the plural Fresnel lenses differ in the degree of eccentricity. Therefore, the luminous flux of space-transmission of a wider incident angle can be led into the photo detector.

A projection type display apparatus according to claim 16 is, in the aspect of claim 15, characterized in that the plural Fresnel lenses of substantially same focal length and differing in the degree of eccentricity are formed integrally with the Fresnel lens plate. Therefore, the action as screen and the lens action of the photoreceptor wide in the incident angle range can be realized by one component.

A projection type display apparatus according to claim 7, it is characterized in that the light signal transmitted from a self-contained light transmitter is sent outside through a screen. Therefore, by the screen effect, the luminous flux is transmitted to the viewer through the optical path substantially same as the image luminous flux.

A projection type display apparatus according to claim 18 is, in the aspect of claim 17, characterized in that the light transmitter includes plural light sources. Therefore, the light power to be transmitted can be amplified, and the video signal and audio signal of specified quality can be reproduced by the viewer even when he is relatively at a long distance.

A projection type display apparatus according to claim 19 is, in the aspect of claim 17, characterized in that the light source is located near the projection lens, and the spreading angle of the luminous flux emitted From the light transmitter is almost matched with the viewing angle of the projection lens. Therefore, the loss of the luminous flux in the apparatus can be eliminated.

A projection type display apparatus according to claim 20 is, in the aspect of claim 17, characterized in comprising an optical axis adjusting mechanism for adjusting the optical axis direction of the luminous flux emitted from the light transmitter, and radio control means for controlling the optical axis direction. Therefore, the direction of the luminous flux can be controlled by the viewer by radio means, and the luminous flux of maximum power can be always received.

A projection type display apparatus according to claim 21 is, in the aspect of claim 17, characterized in that the light source is located near the image forming means, and the luminous flux from the light source is emitted through the projection lens and screen. Therefore, the luminous flux can be transmitted to the light receiver at a position remote from the apparatus with a small loss.

A projection type display apparatus according to claim 22 is, in the aspect of claim 17, characterized in that the luminous flux from the light source is reflected by the image forming means, and is emitted through the projection lens and screen. Therefore, it is transmitted in the same optical path as the image signal through the projection lens.

A projection type display apparatus according to claim 23 is, in the aspect of claim 17, characterized in that the image forming means includes a first region for displaying an image, and a second region for emitting a luminous flux for spatial light transmission, and the luminous flux at wavelength of invisible light is emitted from the second region, and is sent out through the projection lens. Therefore, the luminous flux for spatial light transmission can be received exactly in the same optical path as the image signal.

A projection type display apparatus according to claim 24 is, in the aspect of claim 17, characterized in that the light source is located near the image forming means, and the luminous flux from the light source is emitted through the projection lens and the luminous flux exit region of the screen. Therefore, when the light source is located near the image display region, the luminous flux can be transmitted without being impeded by the screen.

A projection type display apparatus according to claim 25 is, in the aspect of claim 17, characterized in that the light source is disposed in a shorter distance than the projection distance from the screen to the projection lens, and the luminous flux from the light source is emitted through the screen. Therefore, the light signal can be transmitted in a wider region and by a stronger power.

A projection type display apparatus according to claim 26 is, in the aspect of claim 17, characterized in that a near infrared ray transmission filter is provided near the screen, and the luminous flux emitted from the light source is sent out through the near infrared ray transmission filter. Therefore, the luminous flux emitted from the light source is sent out from a region different from the screen, and by covering this range with the filter, the inside is not visible from the outside, and the external light does not enter.

It is other object of the invention to present a projection type display apparatus capable of realizing an optimum picture quality even when projection lenses for individual colors are formed substantially in a same constitution, while preventing deterioration of picture quality due to difference in color in the projection unit.

A projection type display apparatus according to claim 27 is characterized in that the interval between plural image forming means and projection lenses is varied in each projection unit depending on the light wavelength. Therefore, the difference in the focal length due to difference in color of rays of light, that is, difference in wavelength is corrected by varying the interval between the video display element and projection lens. When lights of different wavelengths are passed into projection lenses of same constitution, the focal length of the light longer in wavelength is longer than the focal length of the light shorter in wavelength. Accordingly, in order that rays of light of different colors may be focused on the screen at an equal distance from each projection lens, in the projection unit used in the ray of light longer in wavelength, the interval between the image forming means and projection lens is longer than in the projection unit used in the ray of light shorter in wavelength. Hitherto, such adjustment of focal length due to difference in wavelength has been done by the projection lens, but it is not necessary, so that the focus adjustment amount required in the projection lens may be substantially curtailed.

A projection type display apparatus according to claim 28 is, in the aspect of claim 27, characterized in that the interval between the image forming means and projection lens is varied by changing the spacer thickness. Therefore, the interval between the image forming means of each projection unit and projection lens can be set to a specified value. Accordingly, the thickness of the coolant sealed in the spacer can be varied.

A projection type display apparatus according to claim 29 is, in the aspect of claim 28, characterized in that three projection units are provided for red, green, and blue, and the length of the spacer is set short so that the thickness of the coolant may be as specified, becoming thinner in the sequence of red, green and blue. The red light longer in wavelength than blue light is focused further than the green light even when the projection lens of same constitution is used. The blue light shorter in wavelength than the green light is focused nearer than the green light even when the projection lens of same constitution is used. Herein, the length of the spacer of the projection unit of red color in the optical axis direction is set longer than the length of the spacer of the projection unit of green color in the optical axis direction. Meanwhile, the length of the spacer of the projection unit of blue color in the optical axis direction is set shorter than the length of the spacer of the projection unit of green color in the optical axis direction. By setting the length of the spacer in consideration of the wavelength of each projection unit, the focal length of the ray of light of each projection unit can be adjusted easily, and the ray of light can be focused precisely on the screen.

A projection type display apparatus according to claim 30, the refractive index of coolant varies in each projection unit depending on the wavelength of light. Therefore, the difference in focus position due to difference in color of ray of light, that is, difference in wavelength is corrected by varying the refractive index of coolant. When lights of different wavelengths are passed through projection lenses of same constitution as mentioned above, the focal length of the light long in wavelength is longer than the focal length of the light short in wavelength. Hence, in order that the rays of light of different colors may be focused on the screen at an equal distance from each projection lens, in the projection unit used in the ray of light longer in wavelength, the coolant having a lower refractive index than in the projection unit used in the ray of light shorter in wavelength is used. In the apparatus of the invention, same as in the apparatus of the invention in claim 27, the adjustment amount of projection lens by focus adjusting mechanism can be curtailed.

A projection type display apparatus according to claim 31 is, in the aspect of claim 30, characterized in that there are three projection units for red, green and blue, and the refractive index of the coolant increases in the sequence of red, green and blue. In the projection unit used in the red light longer in the focal length than the green light, the coolant having a relatively low refractive index is used, and the optical length is set longer at the image forming means side of the projection lens. Accordingly, when the other constitution is same as in the projection unit used in green light, the ray of light can be focused precisely on the screen. In the projection unit used in blue light shorter in focal length than in green light, the coolant having a relatively high refractive index is used, and the optical length is set shorter at the image forming means side of the projection lens. Hence, when the other constitution is same as in the projection unit used in green light, the ray of light can be focused precisely on the screen.

A projection type display apparatus according to claim 32, characterized in that the central thickness of the face plate which is the display surface of the image forming means varies in each projection unit depending on the wavelength of light. Therefore, the difference in focal position due to difference in color of ray of light, that is, difference in wavelength is corrected by varying the central thickness of the face plate of the image forming means depending on the color. More specifically, in order that the rays of light of different colors may be focused on the screen at an equal distance from each projection lens, in the projection unit used in the ray of light longer in wavelength, the face plate thicker in the central thickness than in the projection unit used in the ray of light shorter in wavelength is used. As a result, the ray of light emitted from the image forming area is longer in the optical length at the image forming means side of the projection lens by the action of the face plate. In the apparatus of the invention, same as in the apparatus of the invention in claim 27, the adjustment amount by the focus adjusting mechanism of the projection lens can be curtailed.

A projection type display apparatus according to claim 33 is, in the aspect of claim 32, characterized in that there are three projection units for red, green and blue, and the central thickness of the face plate decreases in the sequence of red, green and blue. In the projection unit used in the red light longer in the focal length than the green light, the face plate having a relatively large central thickness is used, and the optical length is set longer at the image forming means side of the projection lens. Accordingly, when the other constitution is same as in the projection unit used in green light, the ray of light can be focused precisely on the screen. In the projection unit used in green light shorter in focal length than in green light, the face plate relatively small in central thickness is used, and the optical length is set shorter at the image forming means side of the projection lens. Hence, when the other constitution is same as in the projection unit used in green light, the ray of light can be focused precisely on the screen.

A projection type display apparatus according to claim 34 characterized in that the central thickness of the lens element positioned mostly closely to the image forming means side differs in each projection unit depending on the wavelength of light. Therefore, the difference in the focal position due to difference in the color of ray of light, that is, difference in the wavelength is corrected by varying the central thickness of the lens element of the side confronting the image forming means of the projection lens depending on the color. More specifically, in order that the rays of light of different colors may be focused on the screen at an equal distance from each projection lens, in the projection unit used in the ray of light longer in wavelength, the lens element thicker in the central thickness than in the projection unit used in the ray of light shorter in wavelength is used. As a result, the ray of light emitted from the image display means is longer in the optical length at the screen side of the projection lens by the action of the lens element. In the apparatus of the invention, same as in the apparatus of the invention in claim 27, the adjustment amount by the focus adjusting mechanism of the projection lens can be curtailed.

A projection type display apparatus according to claim 35 is, in the aspect of claim 34, characterized in that there are three projection units for red, green and blue, and the central thickness of the lens element decreases in the sequence of red, green and blue. In the projection unit used in the red light longer in the focal length than the green light, the lens element having a relatively large central thickness is used, and the optical length is set longer at the screen side of the projection lens. Accordingly, when the other constitution is same as in the projection unit used in green light, the ray of light can be focused precisely on the screen. In the projection unit used in blue light shorter in focal length than in green light, the lens element relatively small in central thickness is used, and the optical length is set shorter at the screen side of the projection lens. Hence, when the other constitution is same as in the projection unit used in green light, the ray of light can be focused precisely on the screen.

A projection type display apparatus according to claim 36 characterized in that the projection distance from the projection lens to the screen differs in each projection unit depending on the wavelength of light. Therefore, the difference in the focal position due to difference in the color of ray of light, that is, difference in the wavelength is corrected by varying the projection distance from the image forming means to the screen. More specifically, in order that the rays of light of different colors emitted by the CRT at an equal distance from each projection lens may be focused on the screen, in the projection unit used in the ray of light longer in wavelength, the projection length is set longer than in the projection unit used in the ray of light shorter in wavelength. In the apparatus of the invention, same as in the apparatus of the invention in claim 27, the adjustment amount by the focus adjusting mechanism of the projection lens can be curtailed.

A projection type display apparatus according to claim 37 is, in the aspect of claim 36, characterized in that there are three projection units for red, green and blue, and the projection distance decreases in the sequence of red, green and blue. In the projection unit used in the red light longer in the focal length than the green light, the projection distance is set longer. Therefore, when the other constitution is same as in the projection unit used in green light, the ray of light can be focused precisely on the screen. In the projection unit used in green light shorter in focal length than in green light, meanwhile, the projection distance is set shorter. Hence, when the other constitution is same as in the projection unit used in green light, the ray of light can be focused precisely on the screen.

The above and further objects and features of the invention will more fully be apparent from the following detailed description with accompanying drawings.

13

Figure 27:
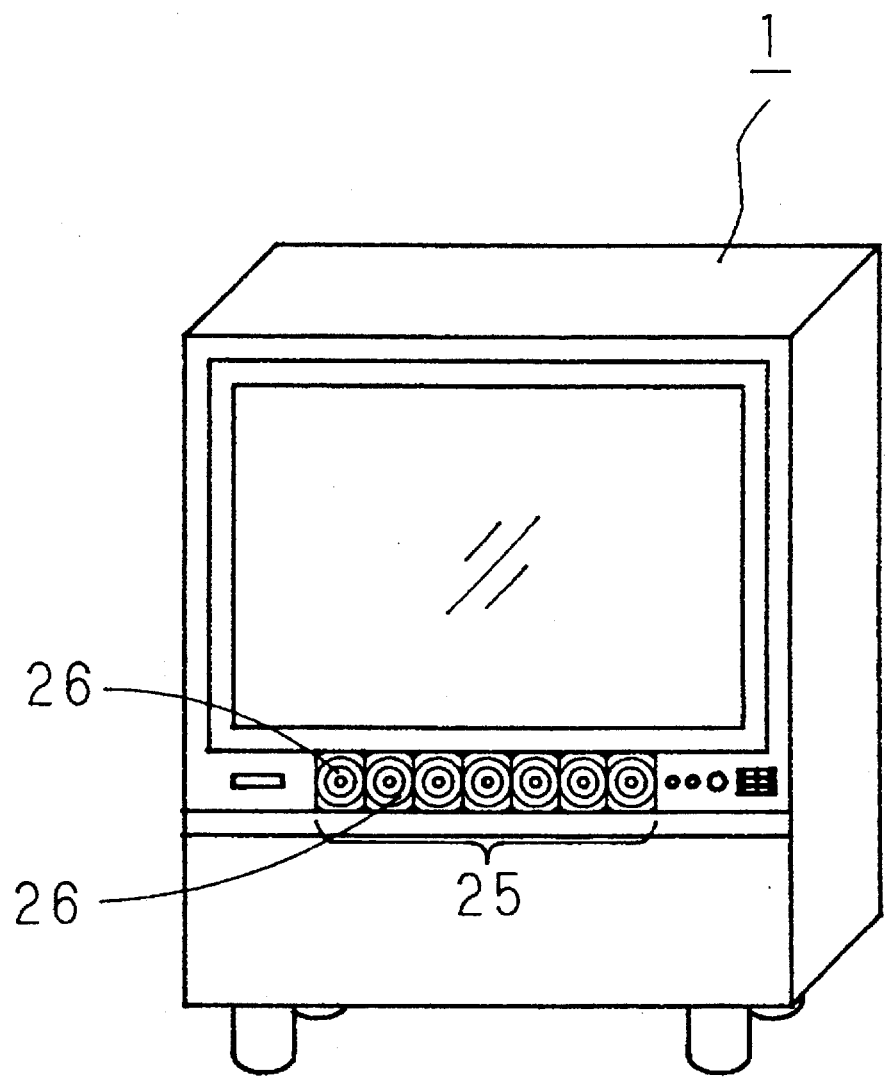

FIG. 27 is a perspective view showing embodiment 14 of a projection type display apparatus of the invention.

Figure 28:
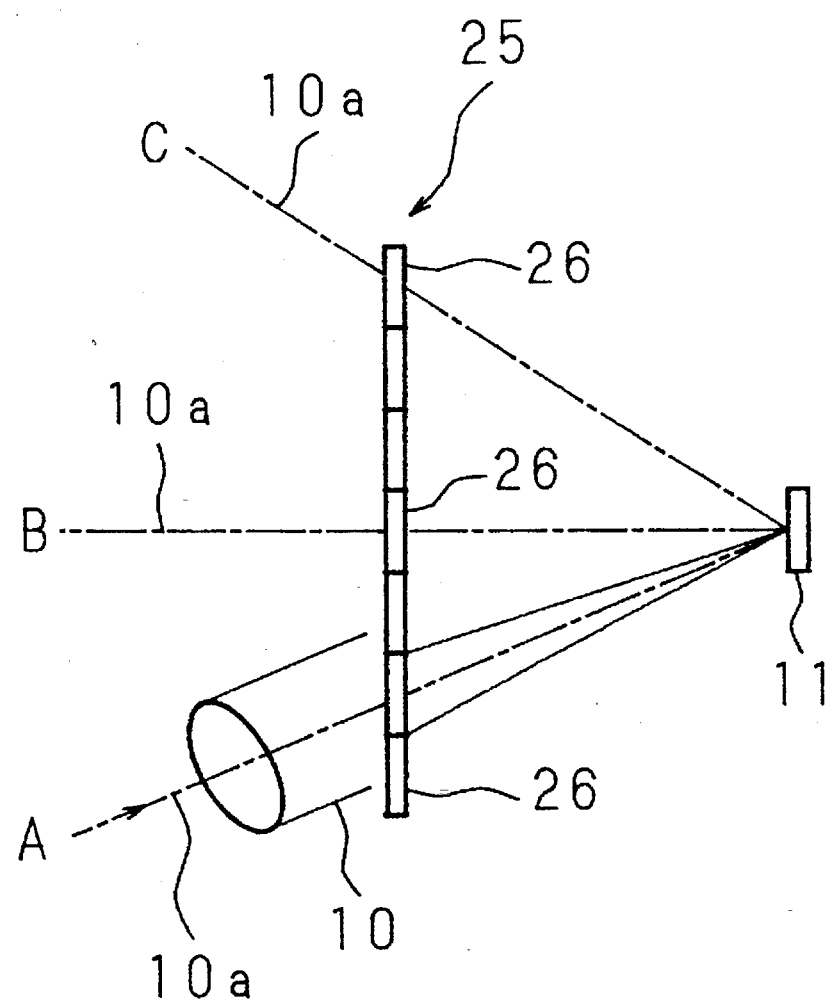

FIG. 28 is a plan view for explaining the optical path in embodiment 14.

Figure 29:
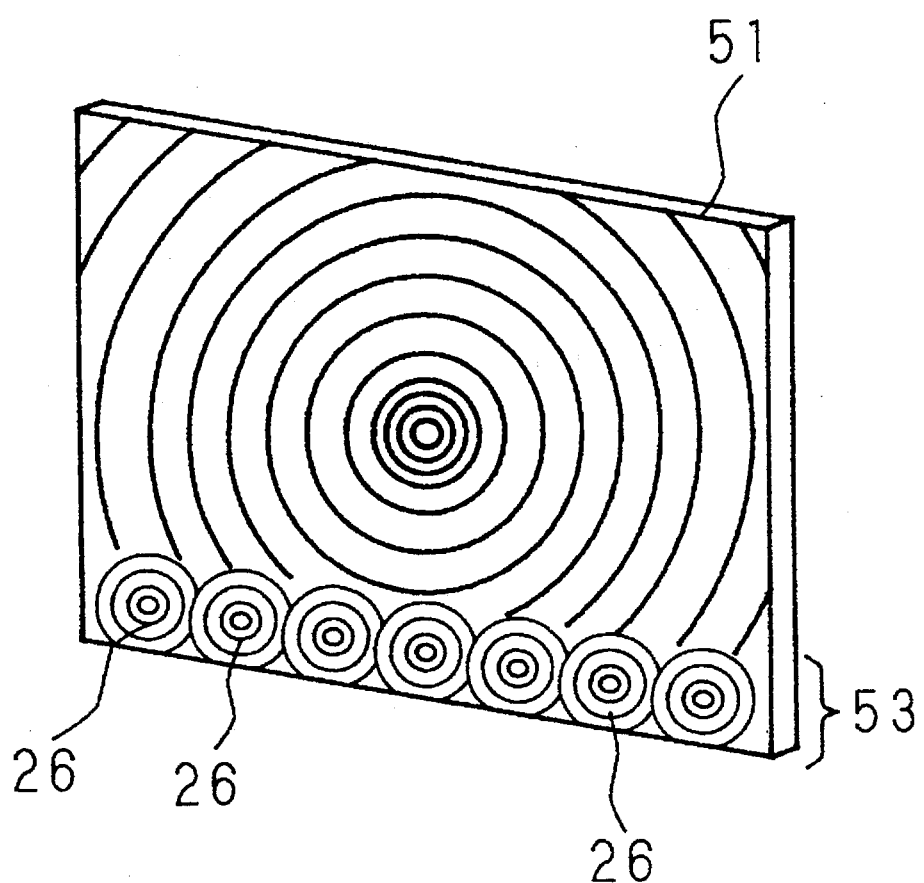

FIG. 29 is a diagram showing a Fresnel lens plate in embodiment 15 in a projection type display apparatus of the invention.

Figure 30:
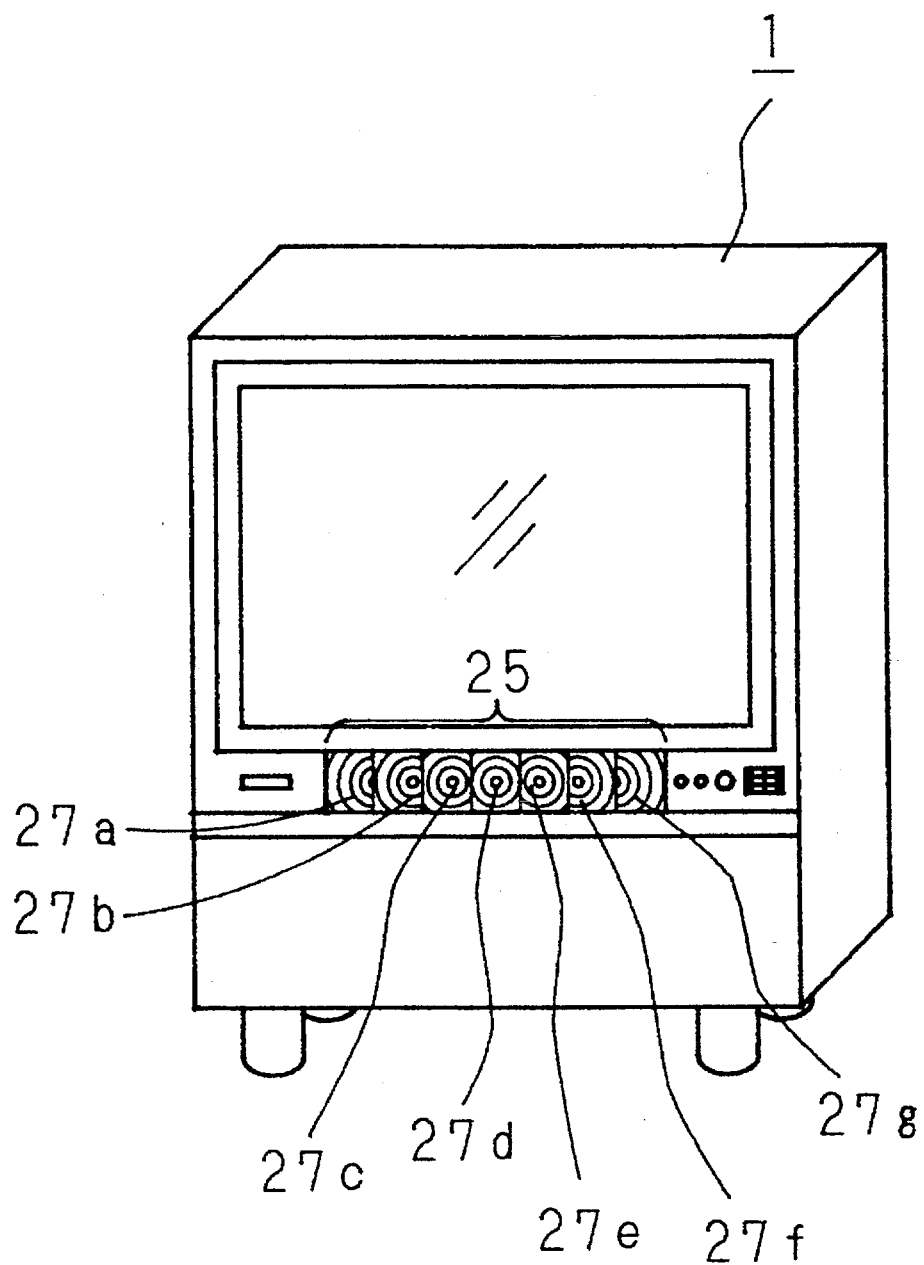

FIG. 30 is a perspective view showing embodiment 16 of a projection type display apparatus of the invention.

Figure 31:
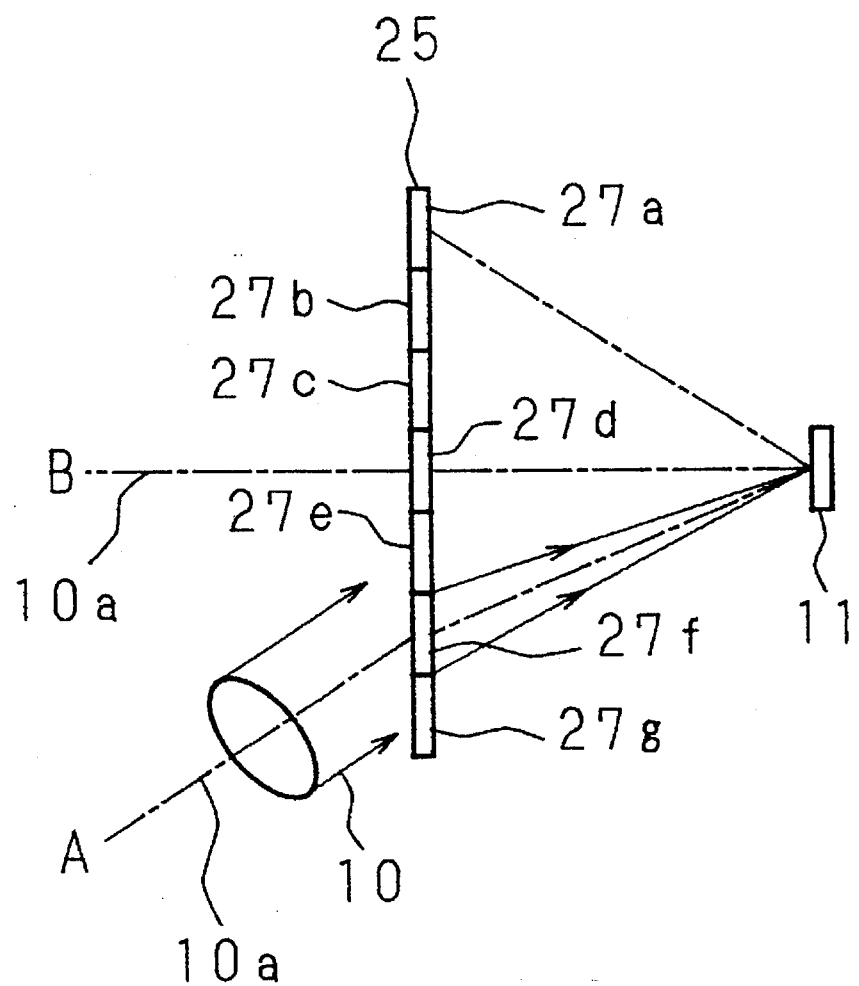

FIG. 31 is a plan view for explaining the optical path in embodiment 16.

Figure 32:
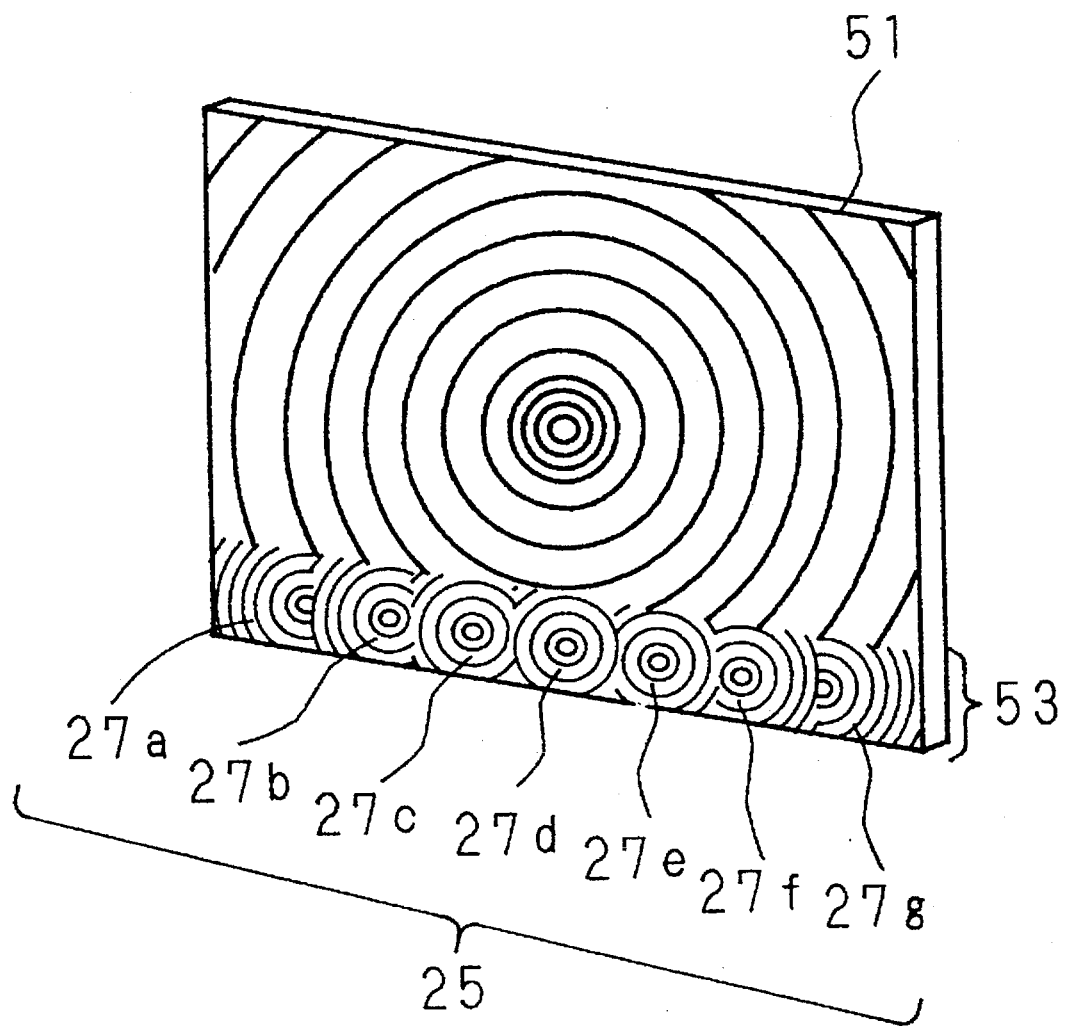

FIG. 32 is a diagram showing a Fresnel lens plate in embodiment 17 of a projection type display apparatus of the invention.

Figure 33:
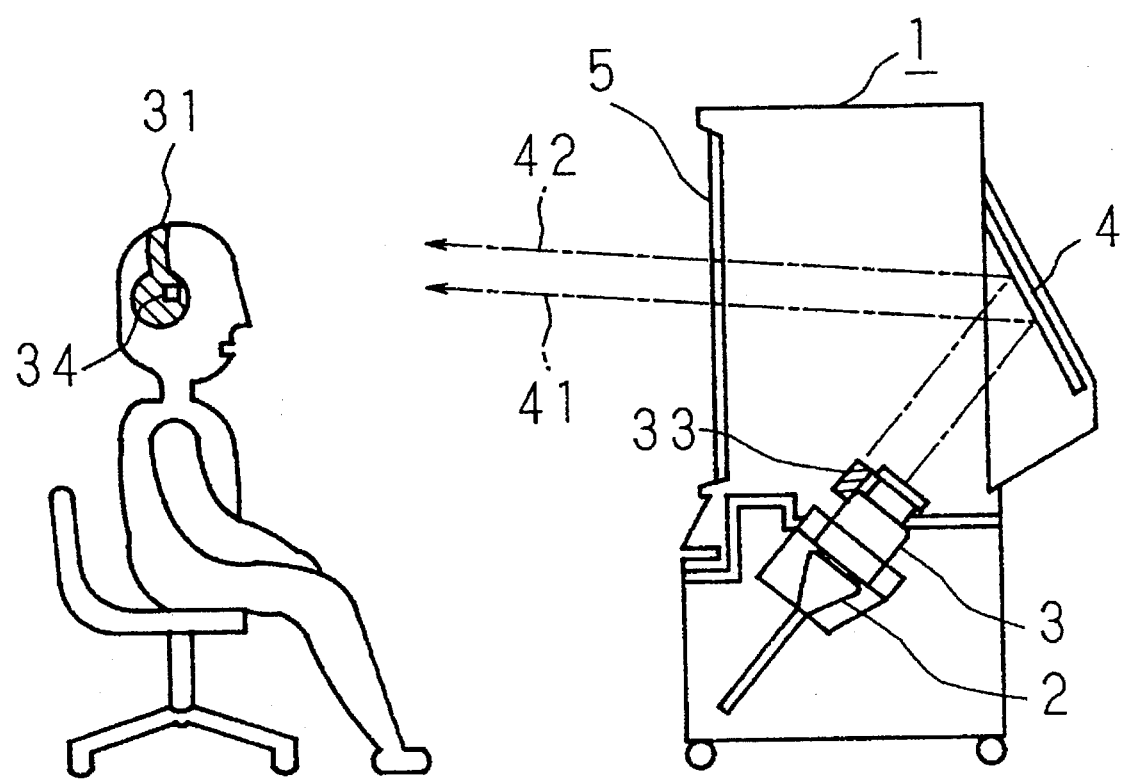

FIG. 33 is a schematic longitudinal sectional view showing embodiment 18 of a projection type display apparatus of the invention.

Figure 34:
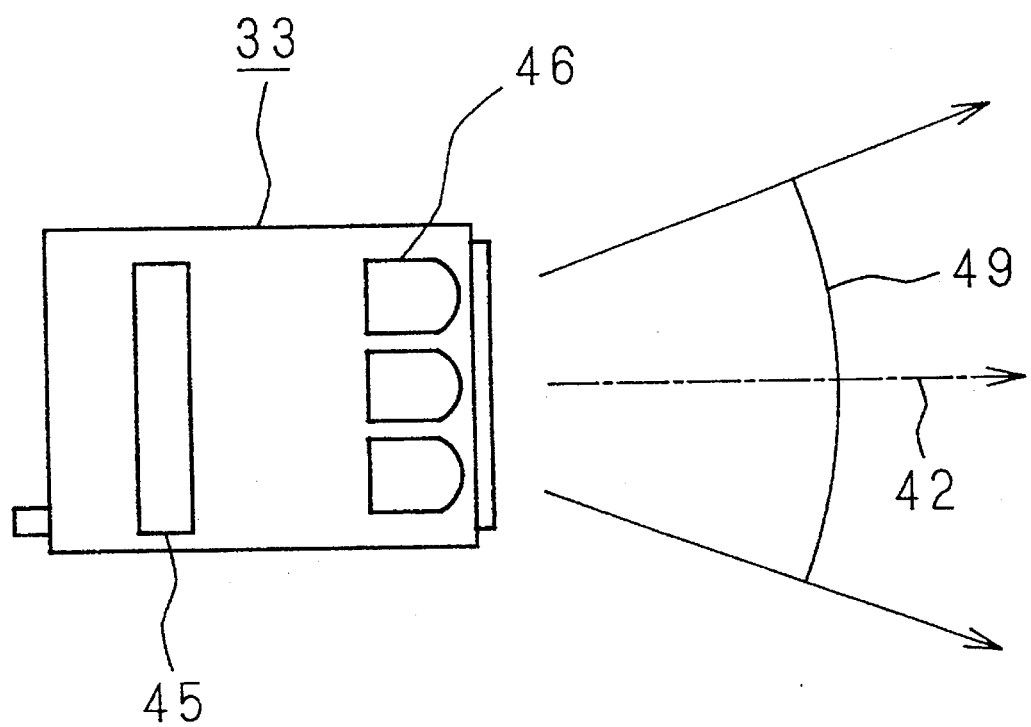

FIG. 34 is a structural diagram of a light transmitter shown in FIG. 33.

Figure 35:
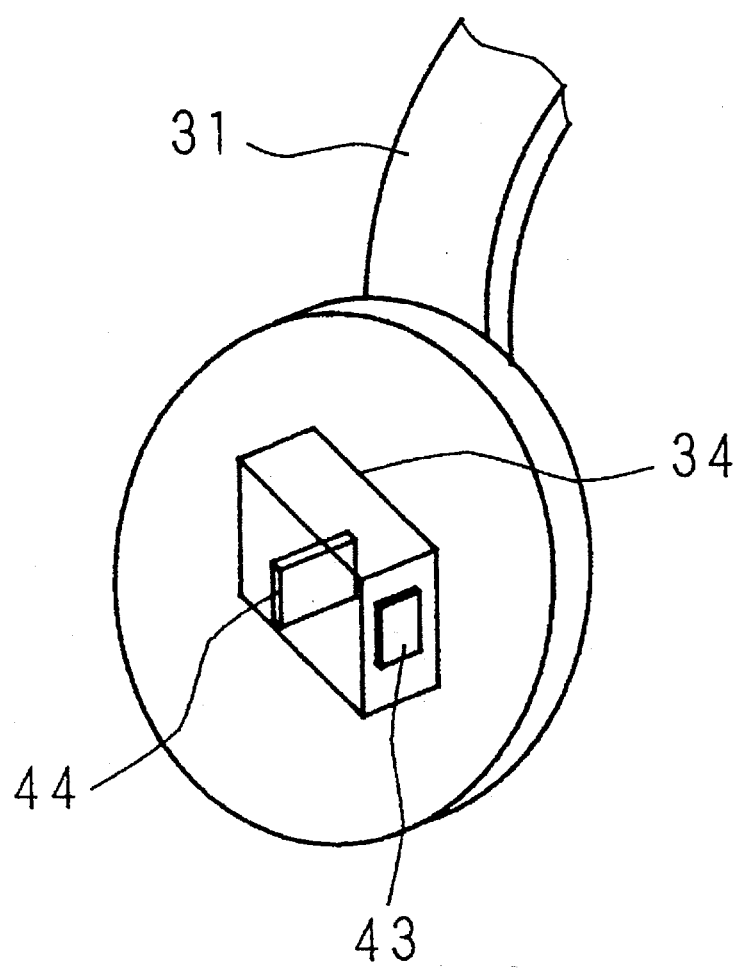

FIG. 35 is a structural diagram of a light receiver shown in FIG. 33.

Figure 36:
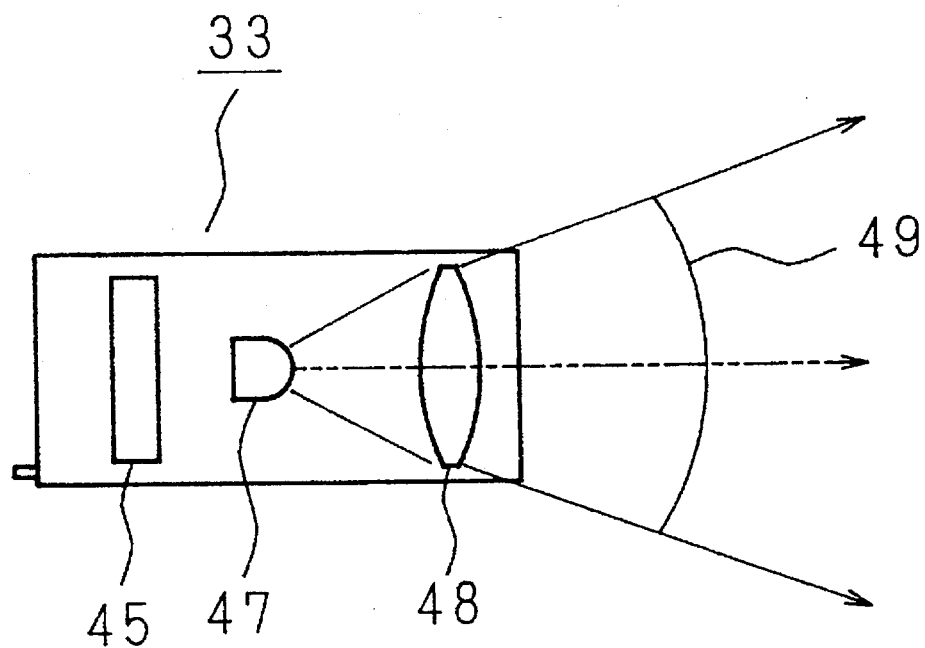

FIG. 36 is a structural diagram showing a light transmitter in embodiment 19 of a projection type display apparatus of the invention.

Figure 37:
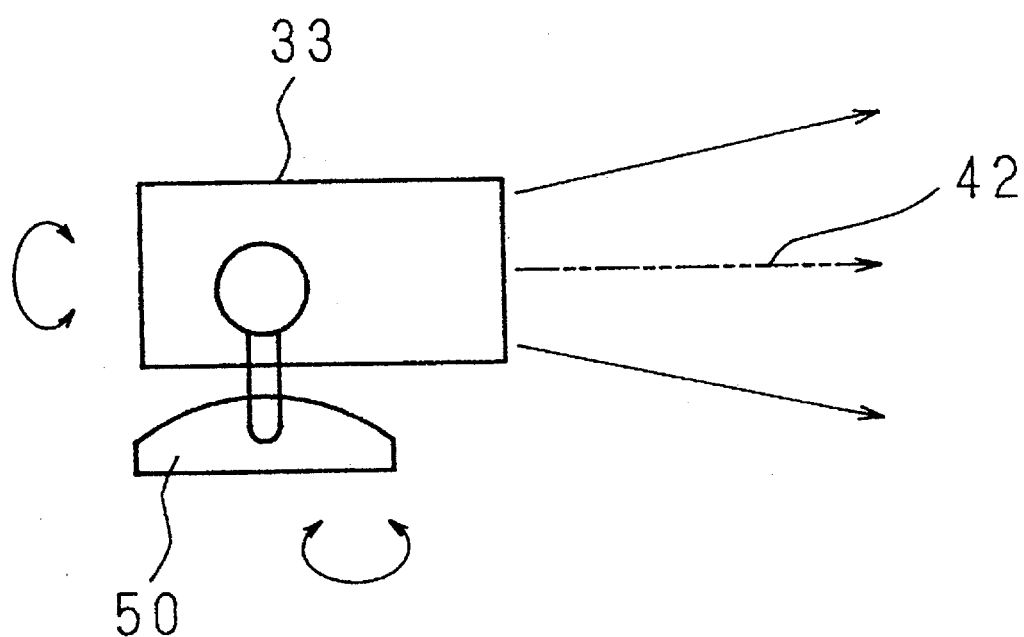

FIG. 37 is a structural diagram showing a light transmitter in embodiment 20 of a projection type display apparatus of the invention.

Figure 38:
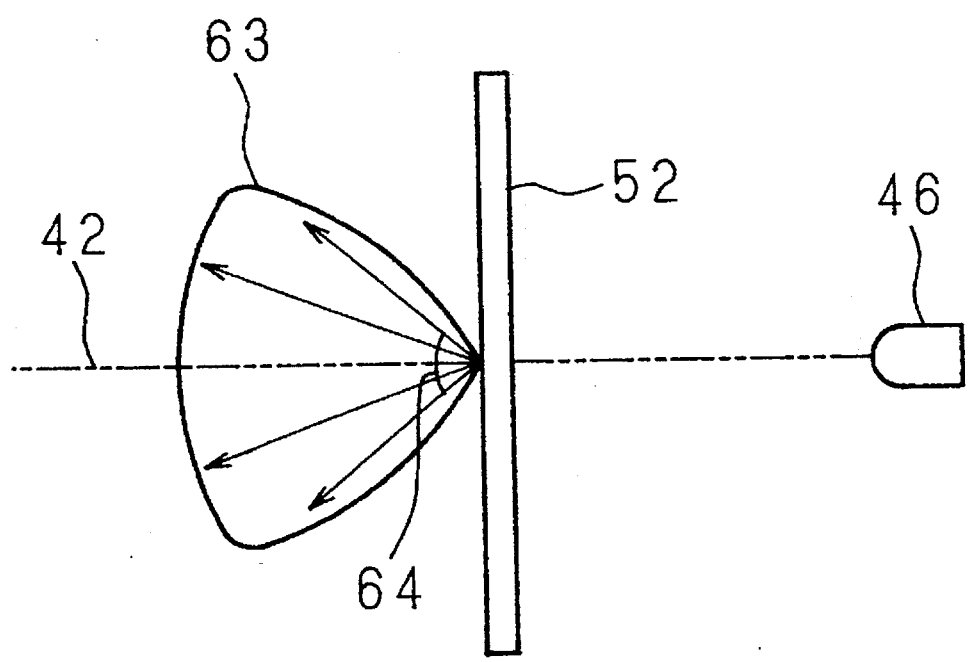

FIG. 38 is a diagram showing the mode of diffusion at the time of incidence of luminous flux from a light source into a lenticular plate.

Figure 39:
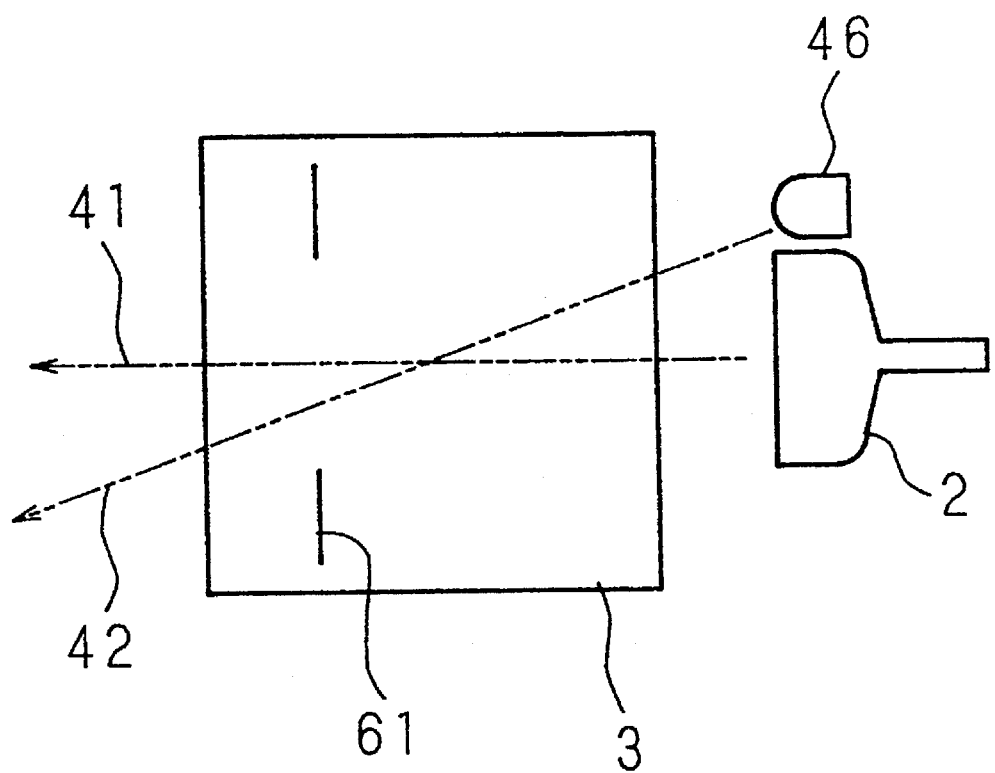

FIG. 39 is a structural diagram showing essential parts of embodiment 21 of a projection type display apparatus of the invention.

Figure 40:
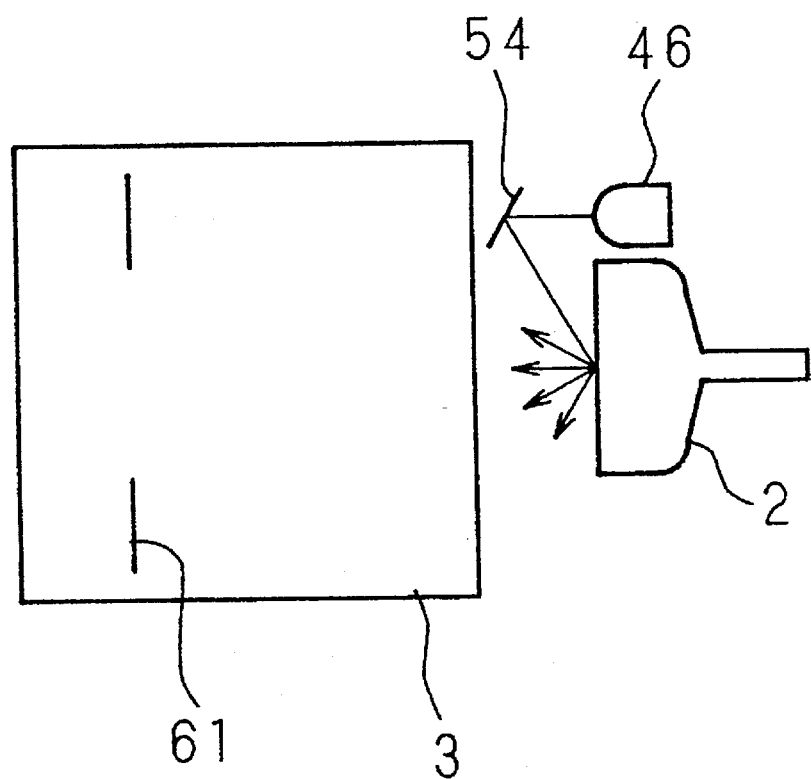

FIG. 40 is a structural diagram showing essential parts of embodiment 22 of a projection type display apparatus of the invention.

Figure 41:
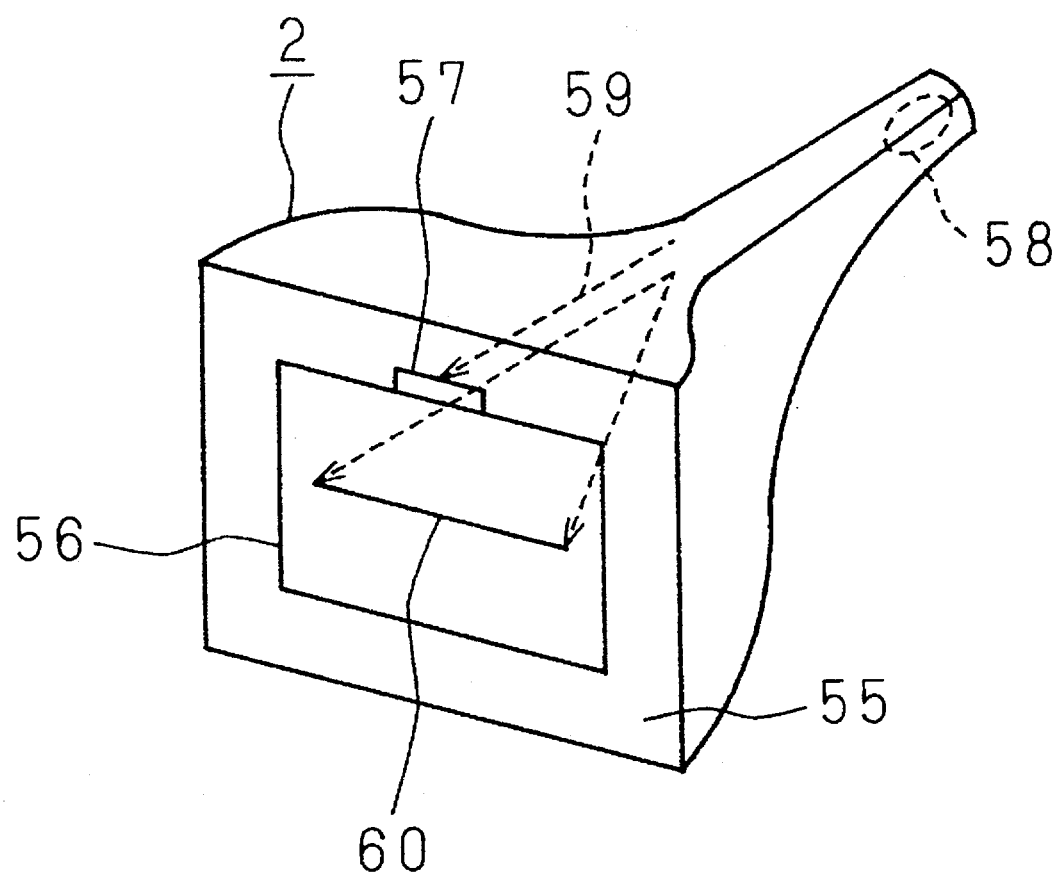

FIG. 41 is a structural diagram showing a CRT in embodiment 23 of a projection type display apparatus of the invention.

Figure 42:
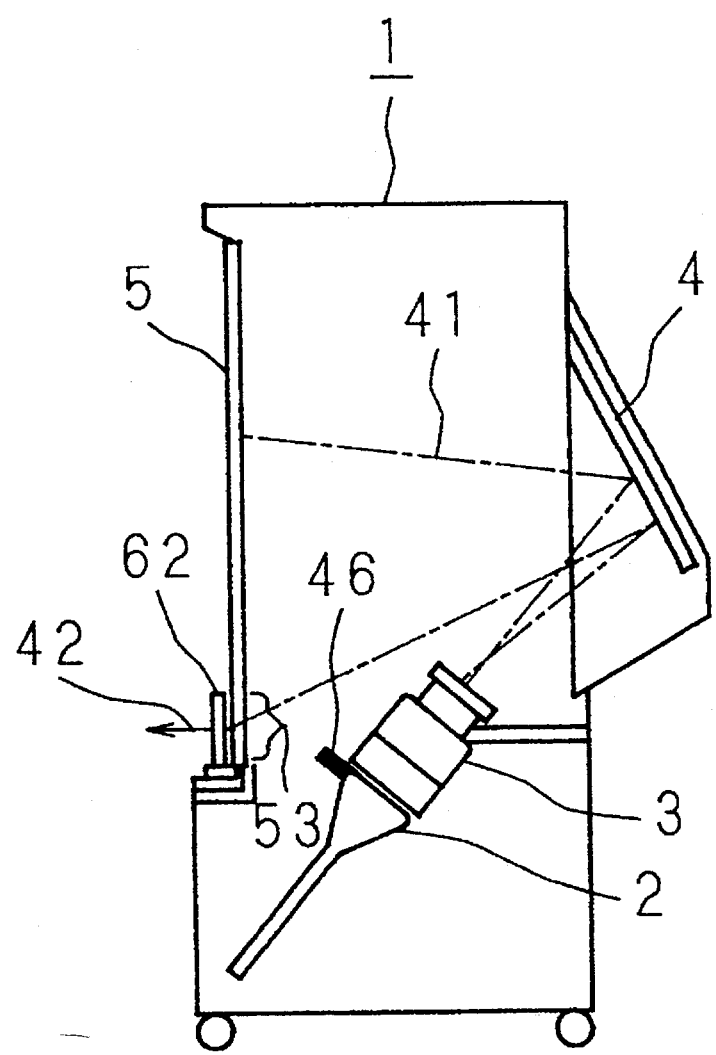

FIG. 42 is a schematic longitudinal sectional view showing embodiment 24 of a projection type display apparatus of the invention.

Figure 43:
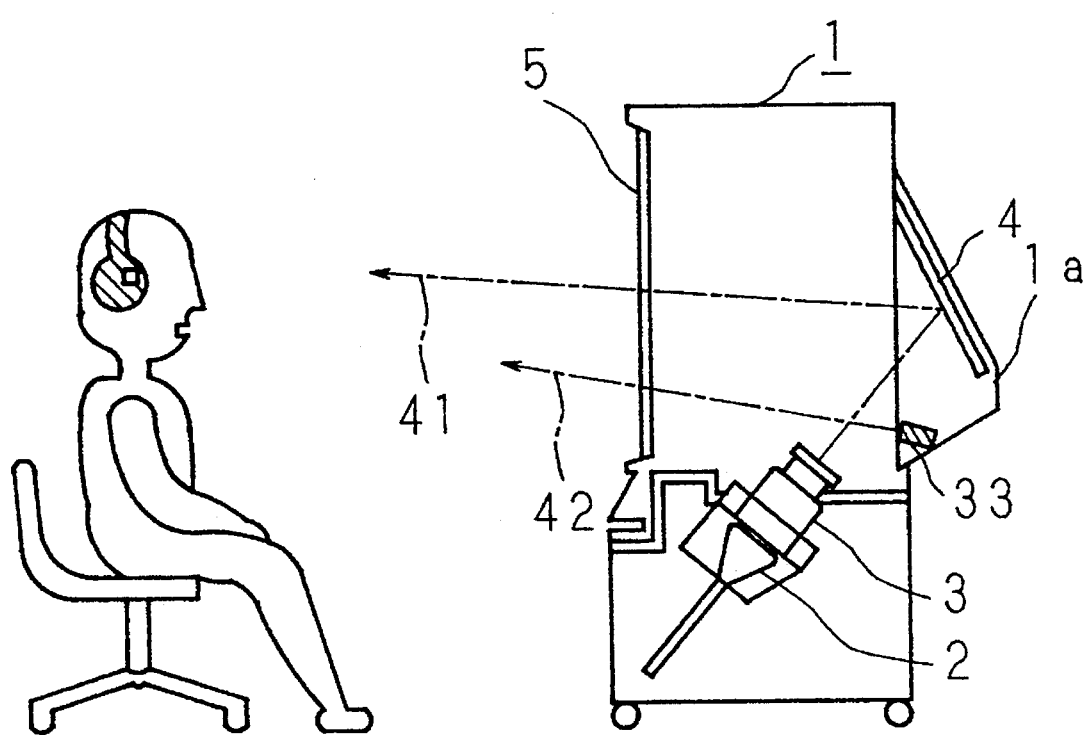

FIG. 43 is a schematic longitudinal sectional view showing embodiment 25 of a projection type display apparatus of the invention.

Figure 44:
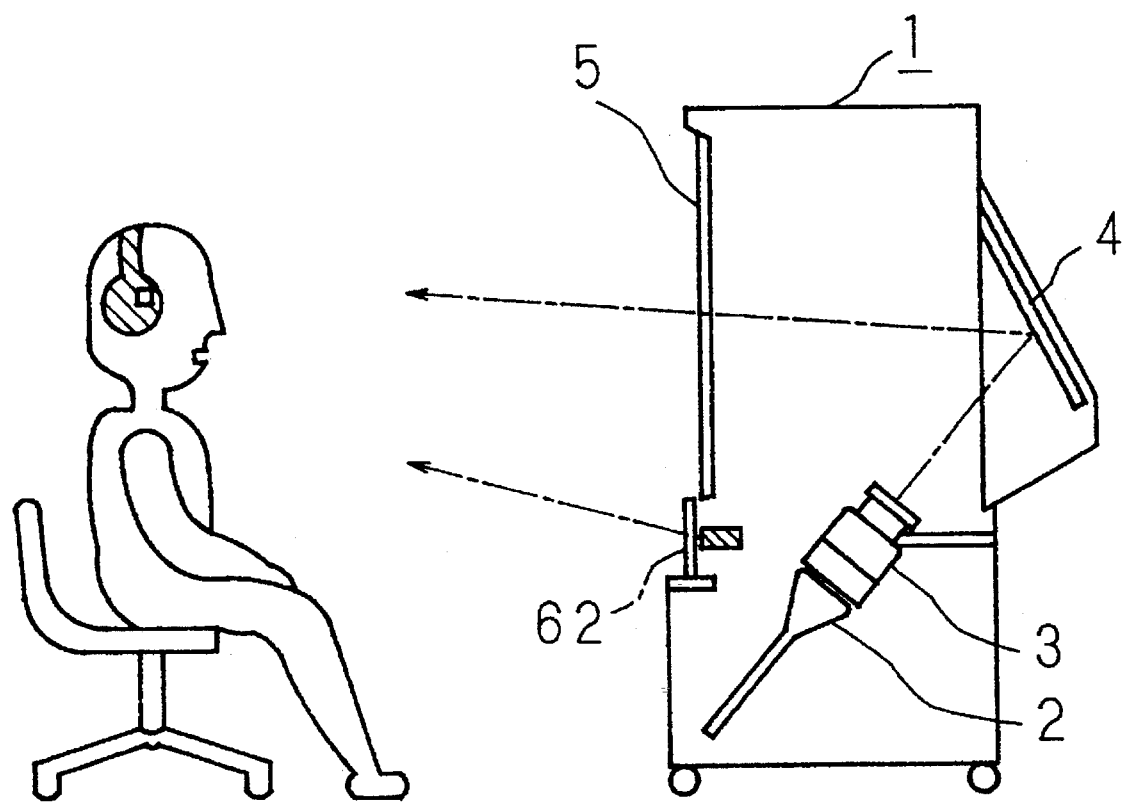

FIG. 44 is a schematic longitudinal sectional view showing embodiment 26 of a projection type display apparatus of the invention.

Figure 45:
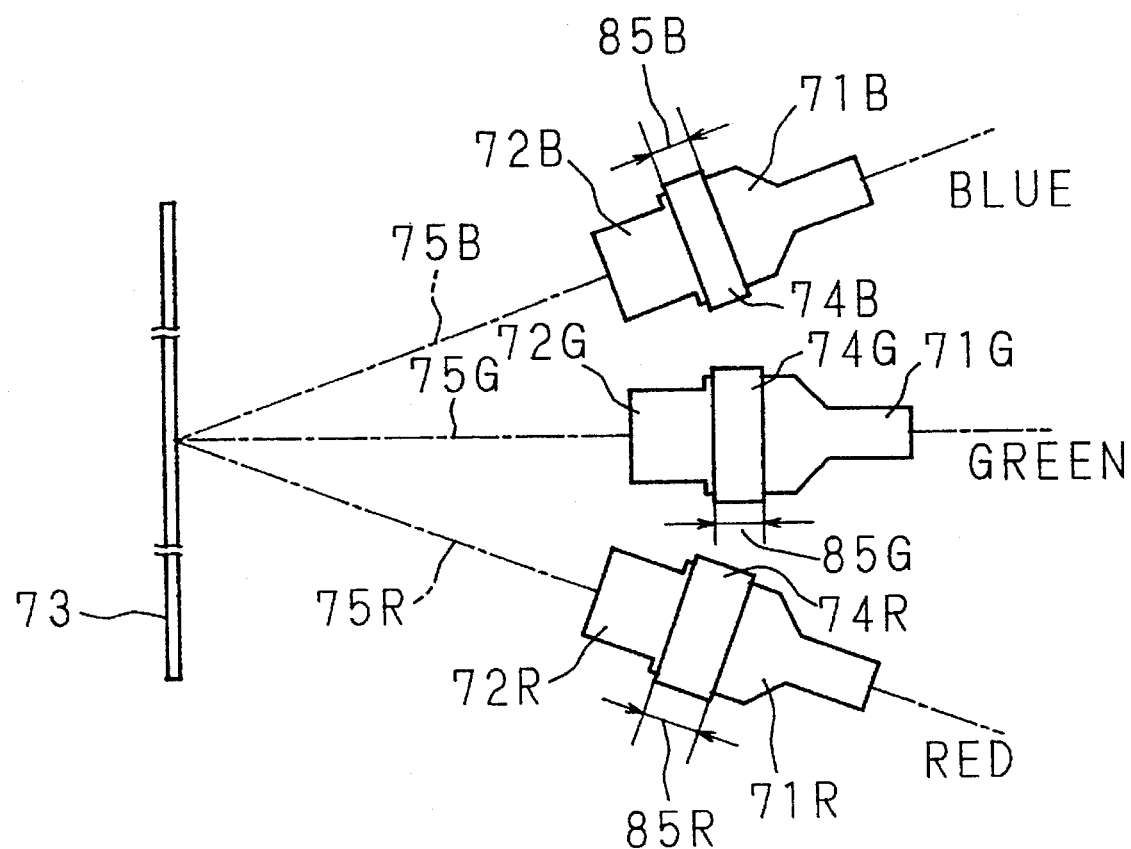

FIG. 45 is a structural diagram showing embodiment 27 of a projection type display apparatus of the invention.

Figure 46:
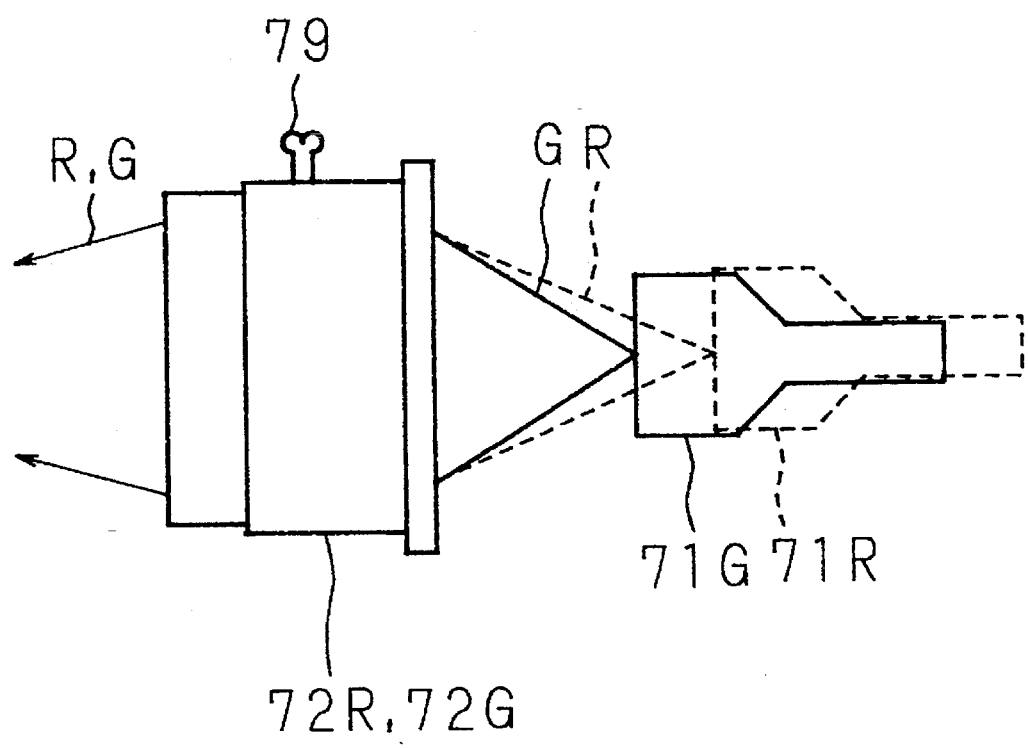

FIG. 46 is an explanatory diagram showing optical paths in a projection unit of green and red shown in FIG. 45.

Figure 47:
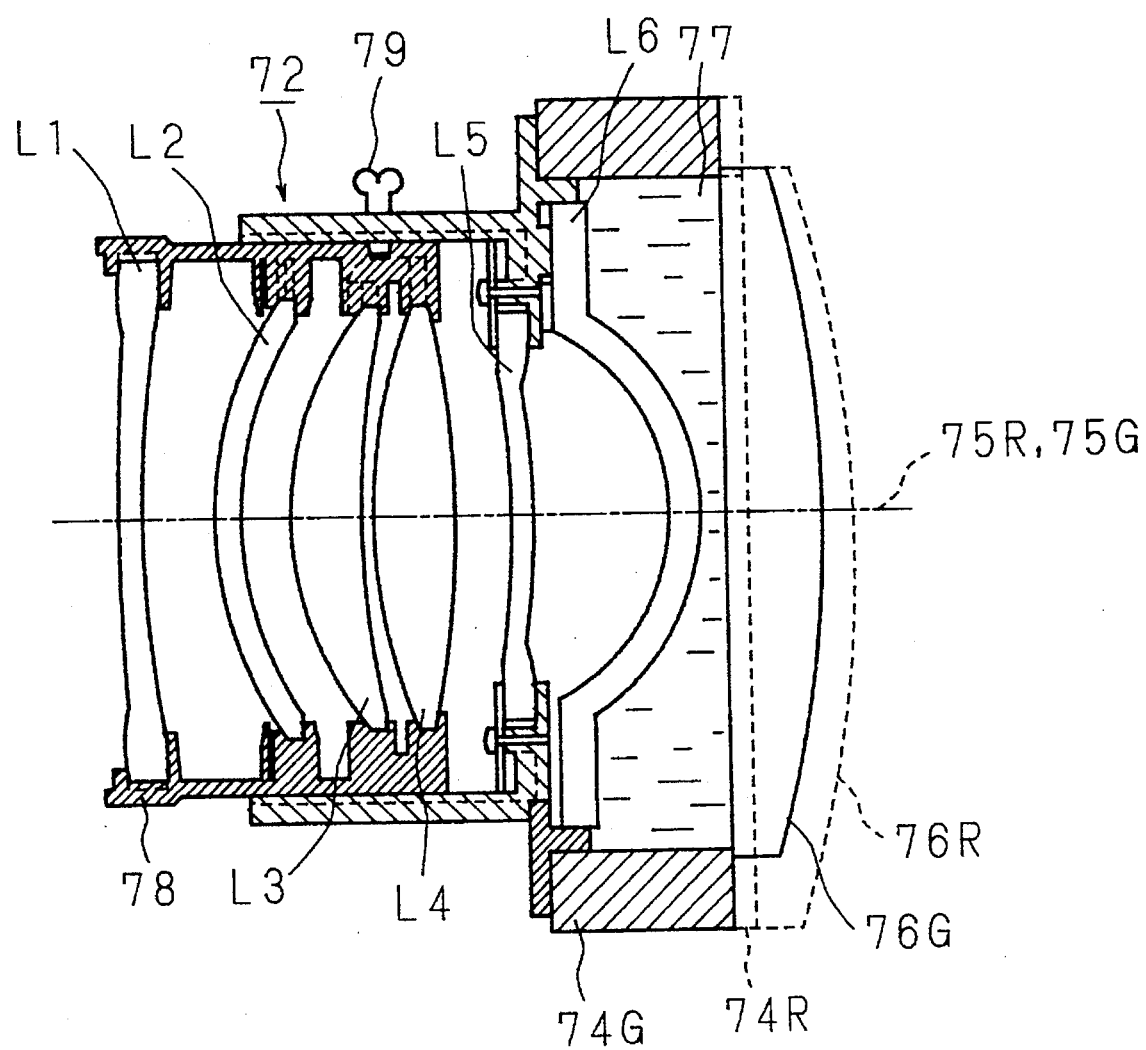

FIG. 47 is a longitudinal sectional view showing a constitution of a projection unit shown in FIG. 45.

Figure 48:
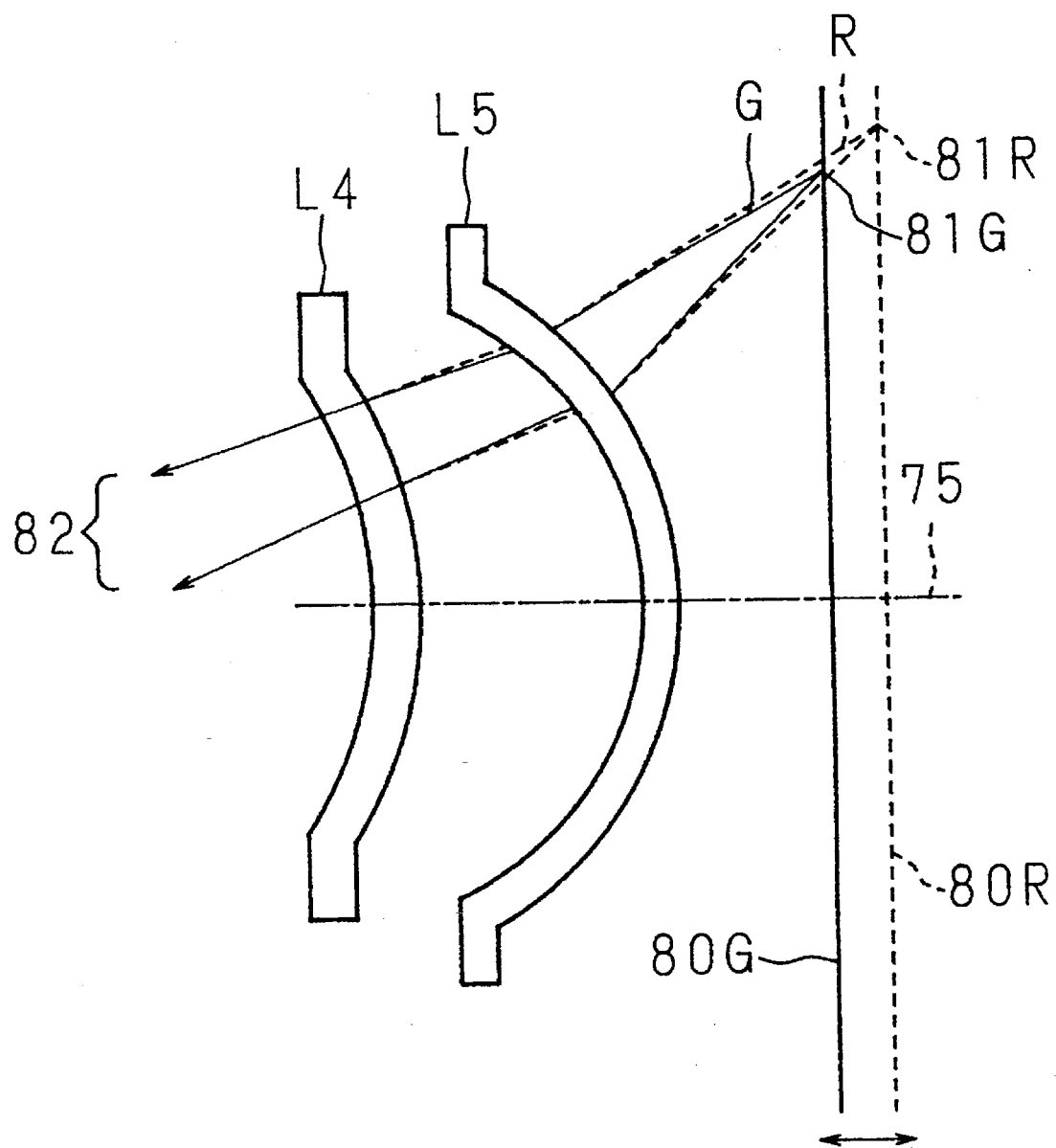

FIG. 48 is a diagram showing an optical path of luminous flux in embodiment 27.

Figure 49:
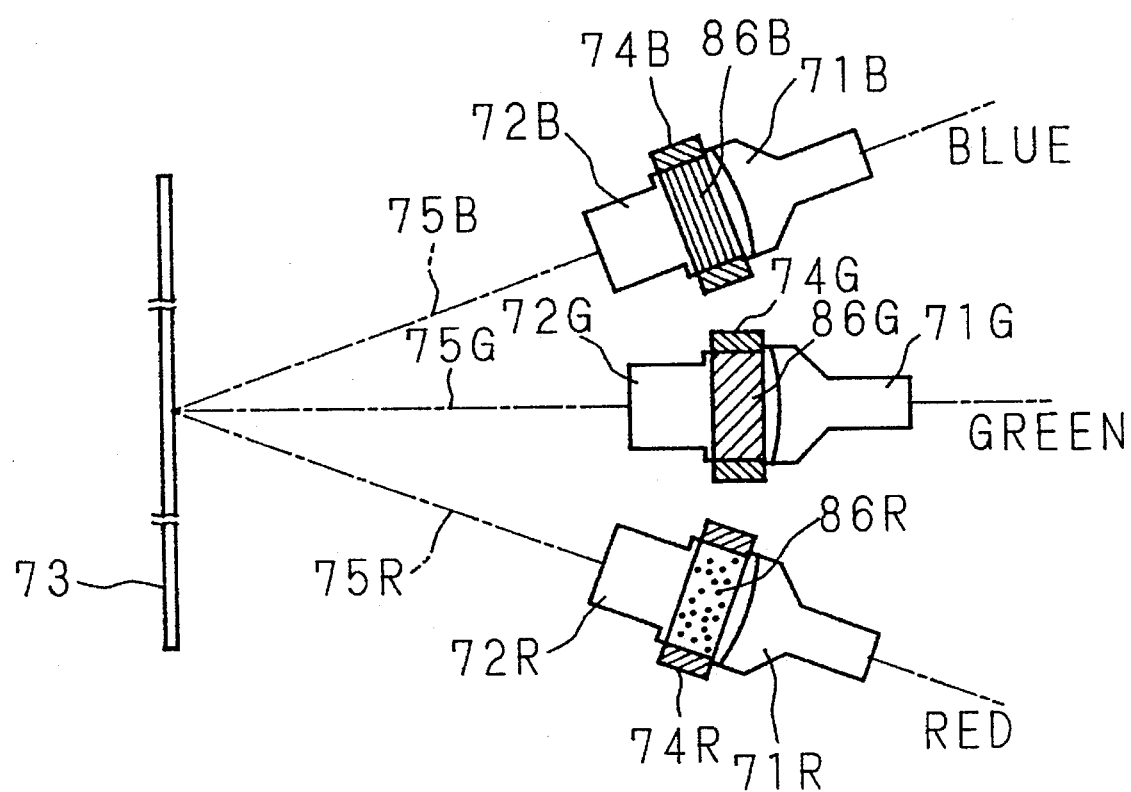

FIG. 49 is a structural diagram showing embodiment 28 of a projection type display apparatus of the invention.

Figure 50:
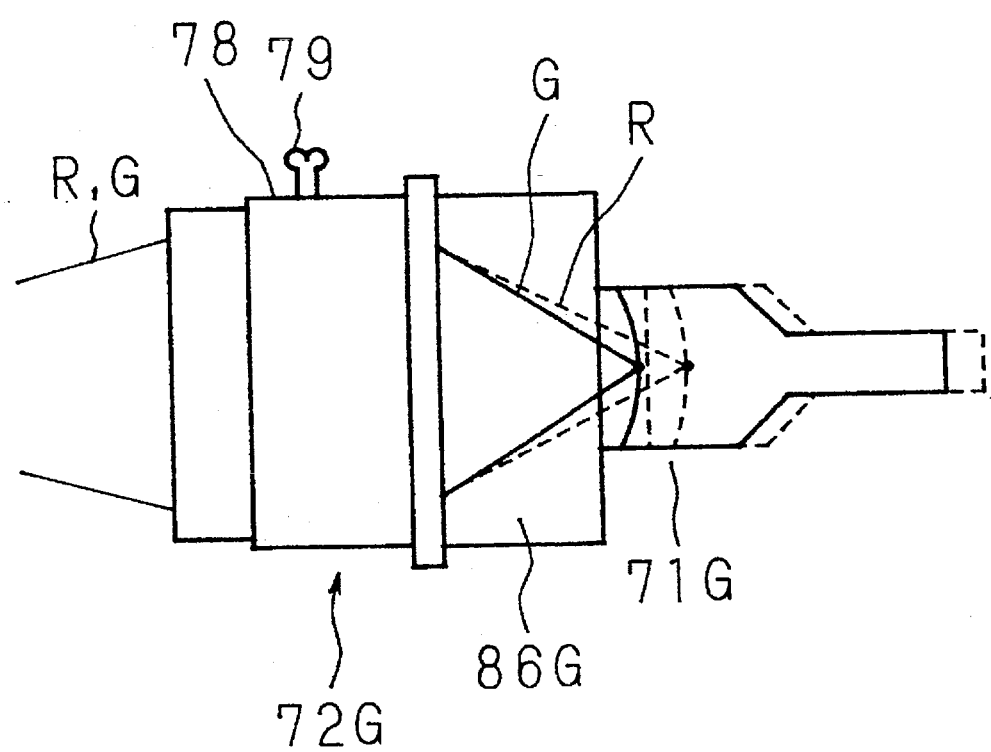

FIG. 50 is a schematic diagram for explaining an optical path in a projection unit of green shown in FIG. 49.

Figure 51:
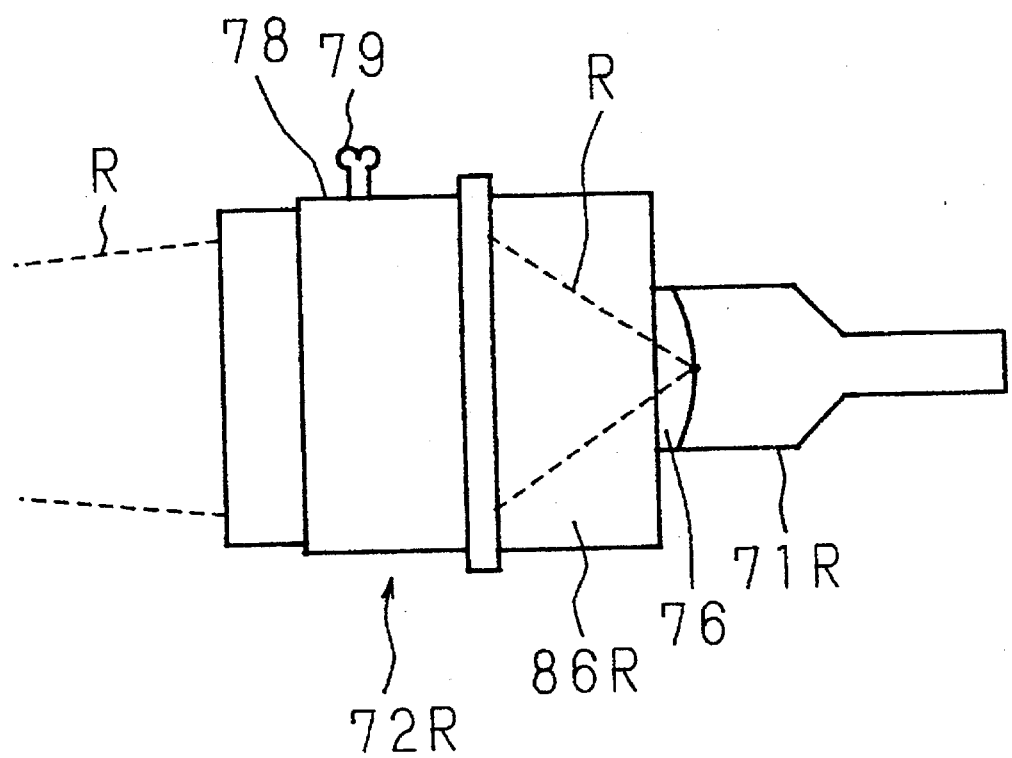

FIG. 51 is a schematic diagram for explaining an optical path in a projection unit of red shown in FIG. 49.

Figure 52:
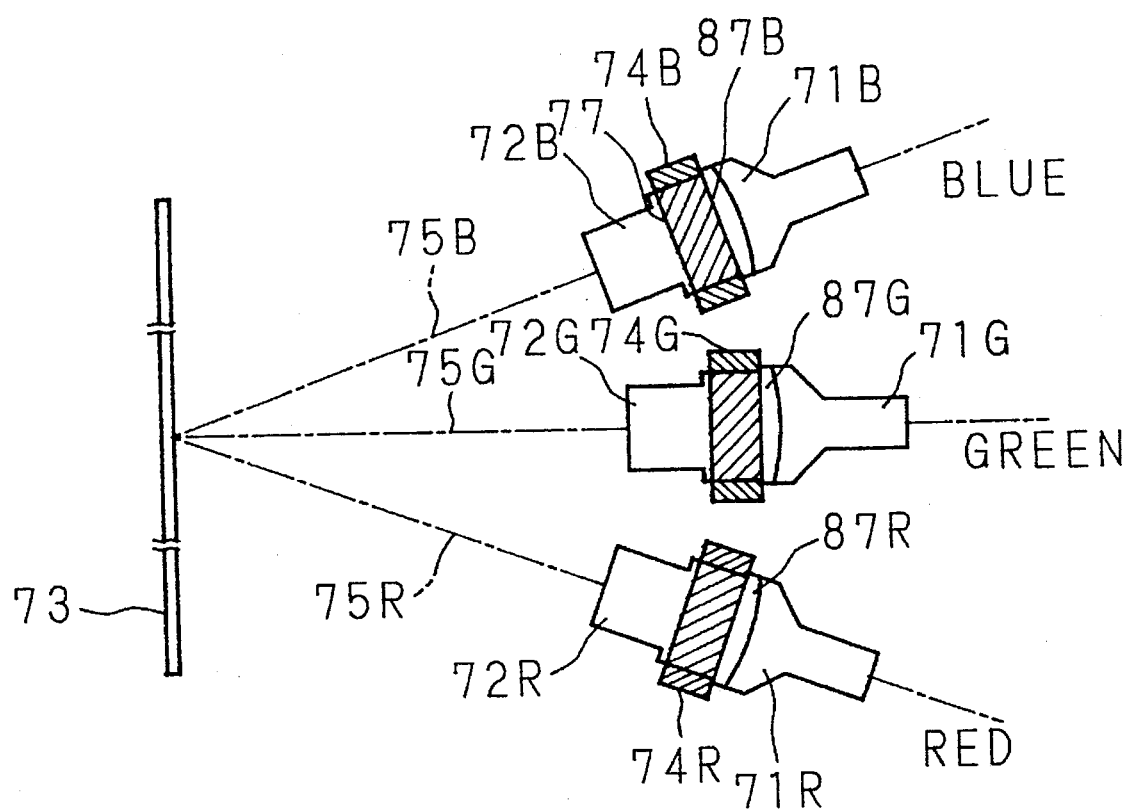

FIG. 52 is a structural diagram showing a projection type display apparatus in embodiment 29 of the invention.

14

Figure 53:
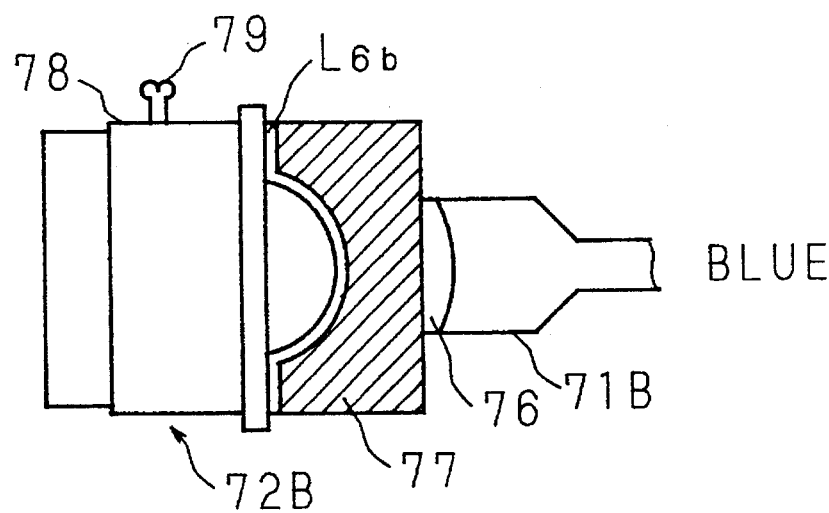
Figure 53:
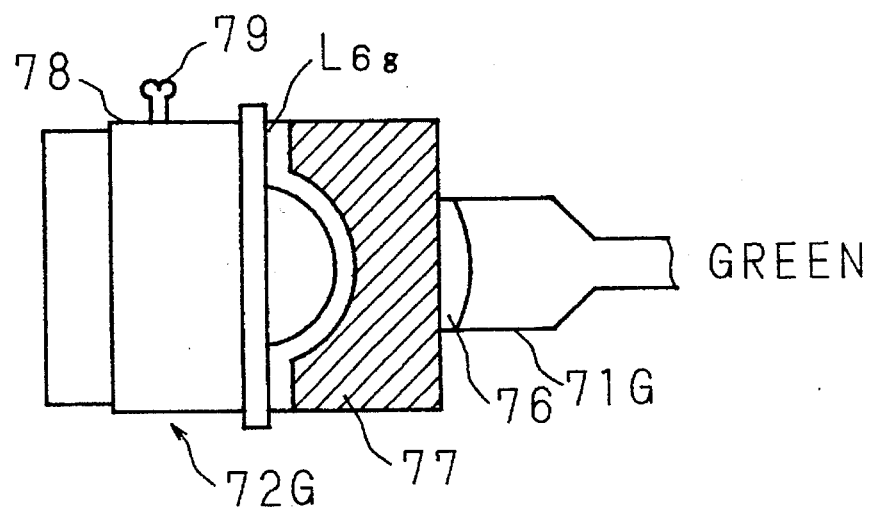
Figure 53:
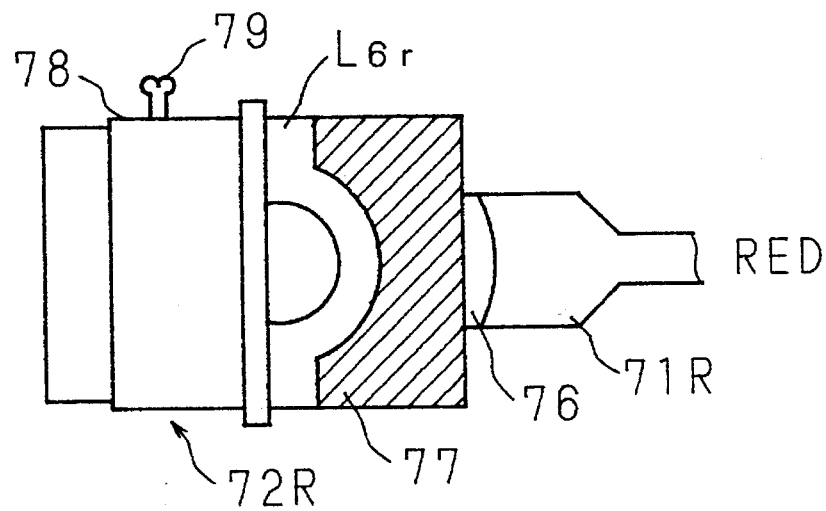

FIG. 53 is a structural diagram showing a projection type display apparatus in embodiment 30 of the invention.

Figure 54:
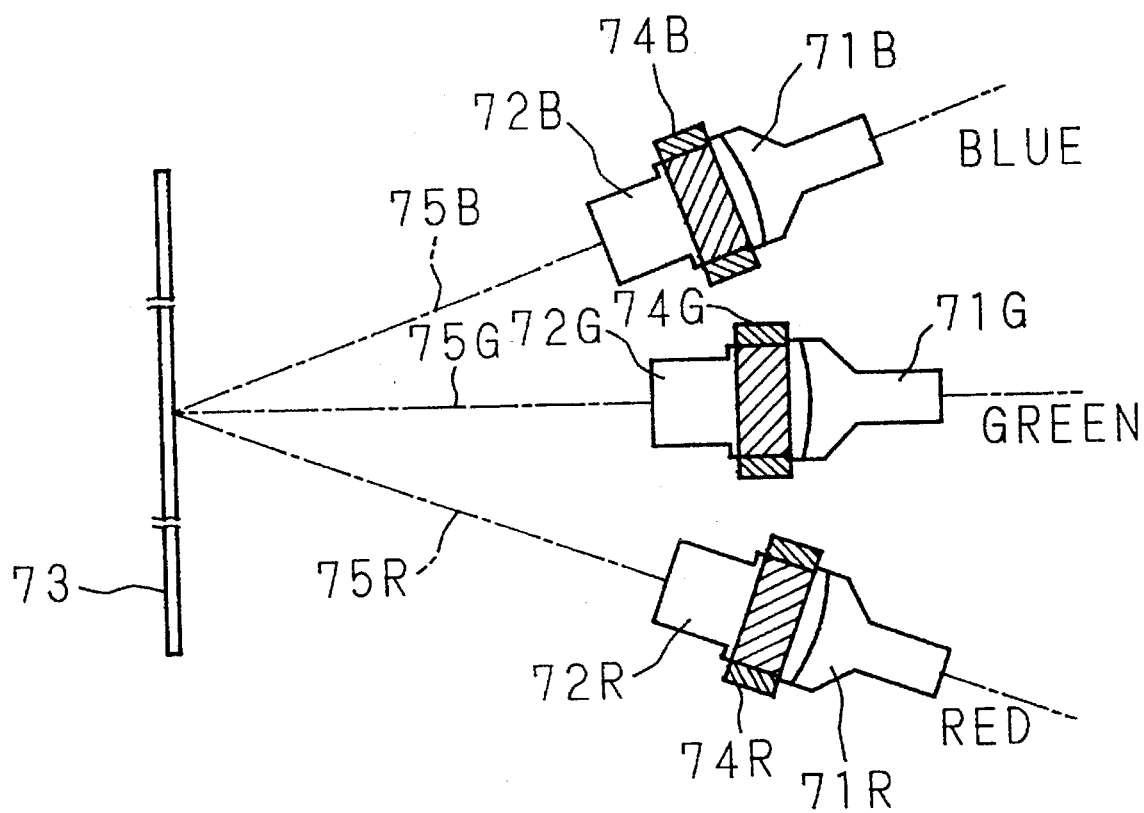

FIG. 54 is a structural diagram showing a projection type display apparatus in embodiment 31 of the invention.

DESCRIPTION OF THE PREFERRED EMBODIMENTS

Referring now to the drawings, embodiments of the invention are described in detail below.

EMBODIMENT 1

Figure 11:
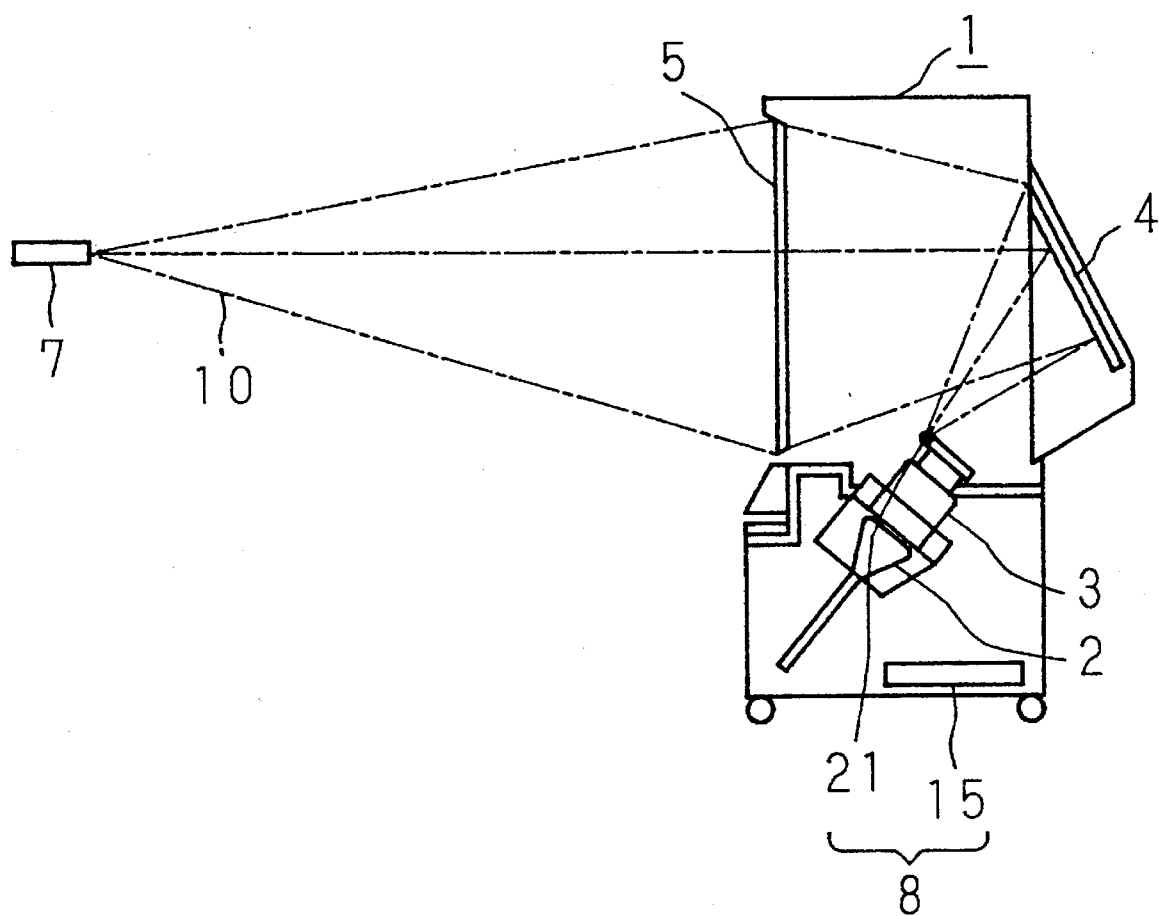
FIG. 11 is a schematic longitudinal sectional view showing embodiment 1 of a projection type display apparatus of the invention.

FIG. 11 is a schematic longitudinal view showing embodiment 1 of a projection type display apparatus of the invention. Reference numeral 1 denotes a projection type display apparatus. A screen 5 is provided at the front side of the projection type display apparatus 1, and a mirror 4 is provided obliquely downward in the back side. At a further lower side, a CRT 2 is installed so as to form a specific angle to the mirror 4, and a projection lens 3 is provided at the display surface side of the CRT 2.

The image formed on the CRT 2 is magnified by the projection lens 3, and is reflected by the mirror 4, and is magnified and projected on the screen 5.

A spatial light transmission apparatus comprises, same as in the prior art, a light transmitter 7 including a modulation circuit and a light source, and a light receiver 8 including a photoreceptor 21 containing a photo detector and a demodulation circuit 15. In this embodiment, the light receiver 8 is incorporated in the projection type display apparatus 1, and the photoreceptor 21 is disposed by the side at the exit side of the image luminous flux of the projection lens 3.

Figure 12:
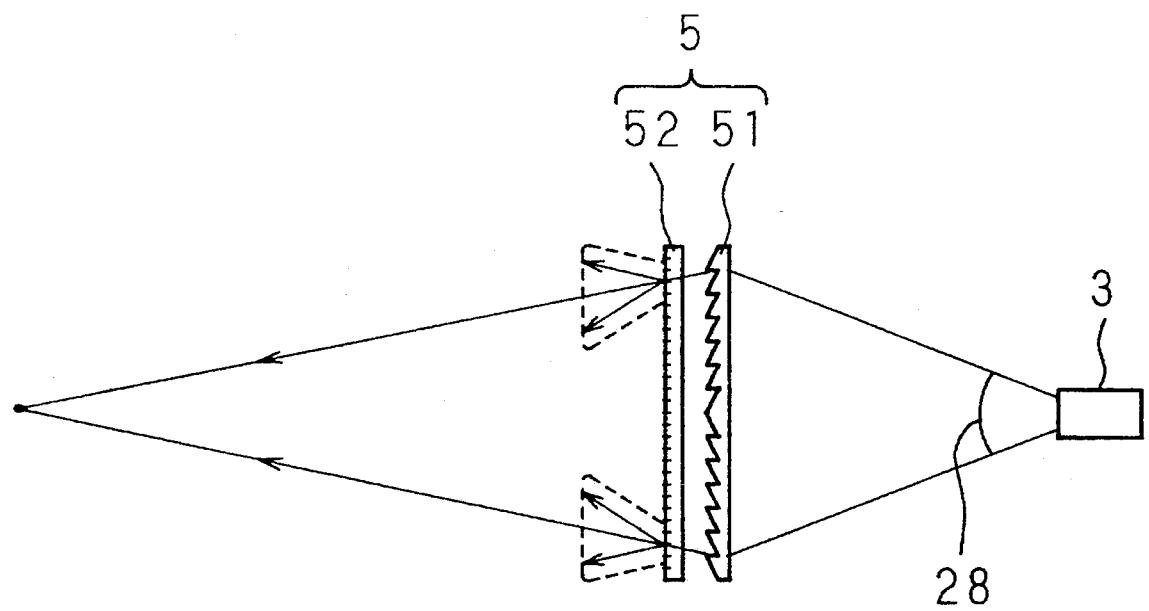
FIG. 12 is a diagram for explaining the screen action of the projection type display apparatus.

The ordinary function of the screen 5, which is a key part in the invention, is described below. Generally, the screen 5 is composed of two pieces as shown in FIG. 12, that is, a Fresnel lens plate 51 and a lenticular plate 52, and the luminous flux emitted from the projection lens 3 is first condensed toward the position apart from the Fresnel lens plate 51 by 10 to 20 m. As a result, the viewer can brightly see the image in the peripheral parts of the screen. The lenticular plate 52 includes an action for diffusing the luminous flux, so that the viewer can appreciate not only from the front of the screen, but also from oblique direction.

The spatial light transmission optical path of the invention is described below. In FIG. 11, a luminous flux 10 emitted from the light transmitter 7 disposed remote from the projection type display apparatus 1 enters the screen 5. This luminous flux advances in the reverse direction of FIG. 12, and is condensed near the projection lens 3 at the focal point position by the Fresnel lens plate 51. The luminous flux 10 condensed nearly from the entire surface of the screen 5 is photoelectrically converted by the photo detector of the photoreceptor 21, so that a desired video signal and audio signal may be obtained.

Figure 1:
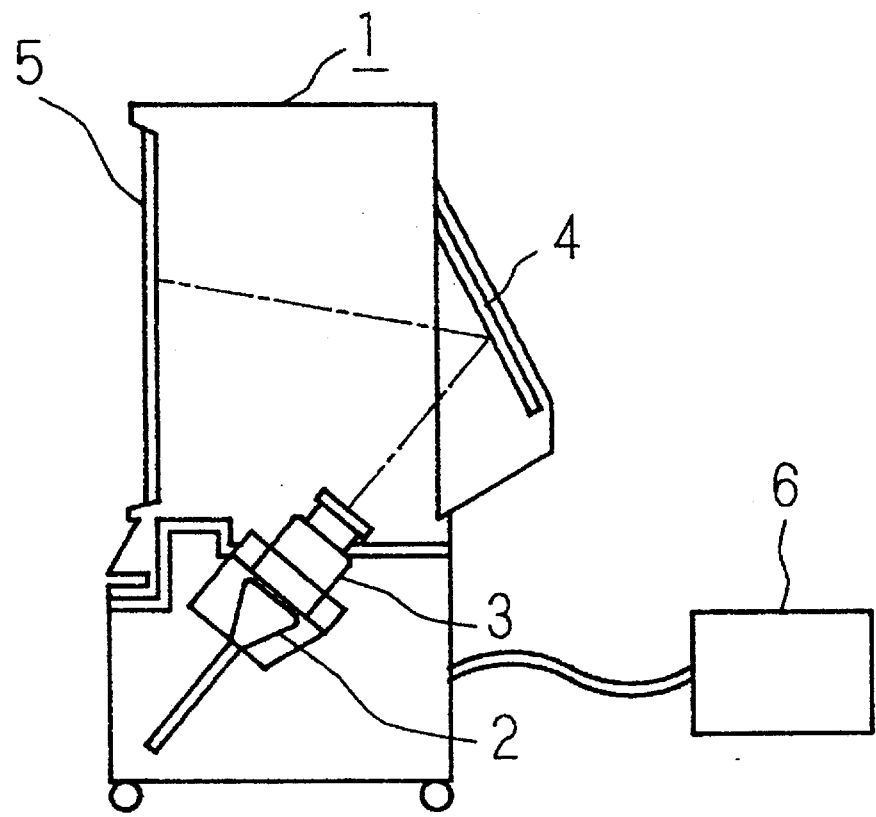
FIG. 1 is a schematic longitudinal sectional view showing a conventional projection type display apparatus.
Figure 2:
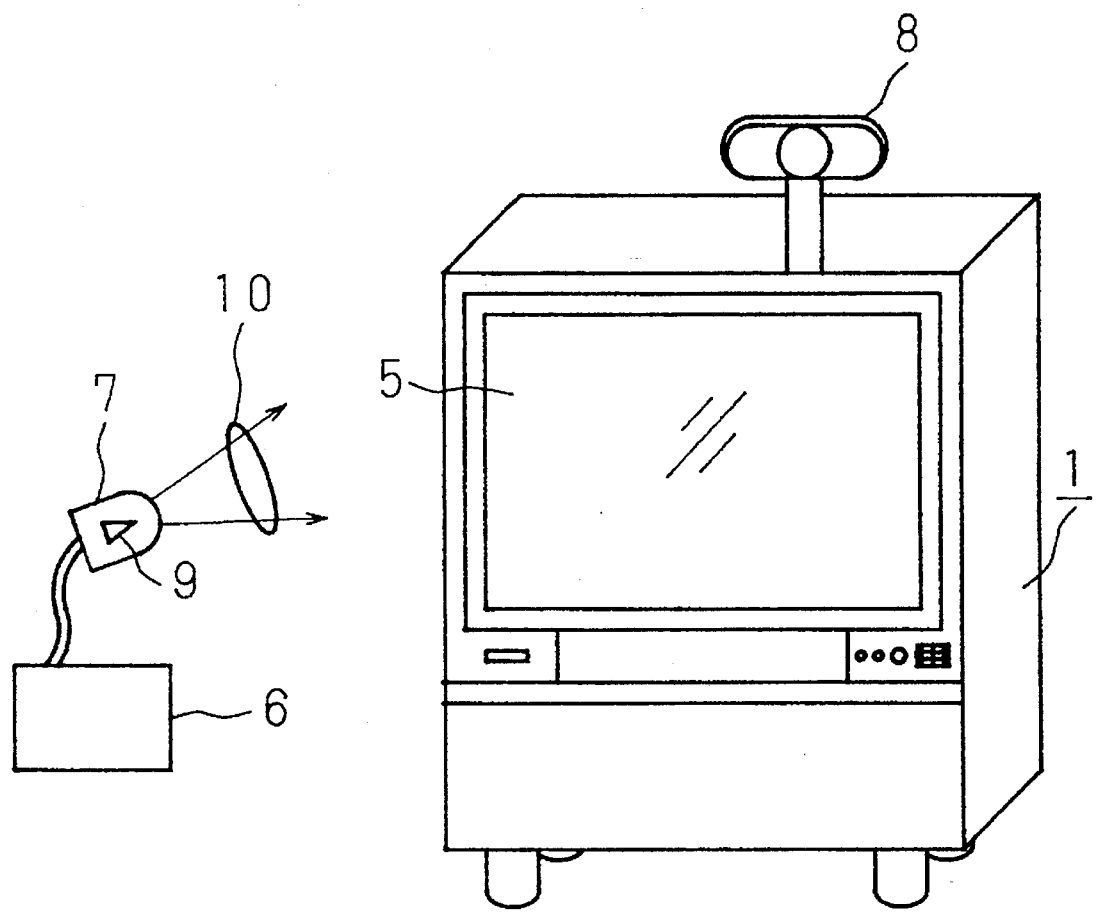
FIG. 2 is a structural diagram showing a conventional spatial light transmission apparatus.
Figure 3:
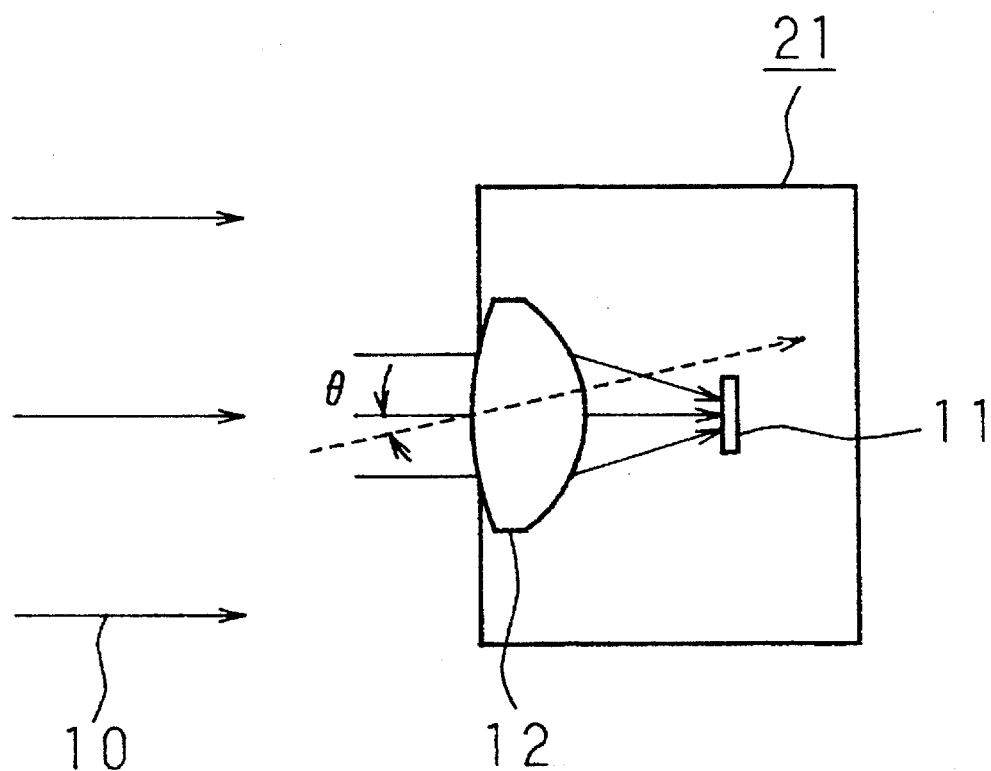
FIG. 3 is a structural diagram showing a conventional light receiver.

The photo detector 11 used in the embodiment is of the same size as in the prior art, about 3 mm to 5 mm, in order to satisfy the specific response speed. At this time, the luminous flux 10 from the screen 5 is not entirely received, but there also exists a wasteful luminous flux due to condensing aberration or diffusion effect. At this time, same as in the prior art, it is ineffective to use the condensing lens 12 as shown in FIG. 3 in order to expand the apparent light receiving area. The reason is as follows. That is, the viewing angle 28 of the projection lens 3 is generally more than 50 degrees as shown in FIG. 12, and when receiving the luminous flux transmitted in space, it enters the photoreceptor 21 at an incident angle of more than 50 degrees, to the contrary, from the entire surface of the screen 5. When using the condensing lens 12 as shown in FIG. 3, to the contrary, since the incident angle range is limited to about 10 degrees, and hence the effect of the invention is impeded reversely.

Thus, the luminous flux 10 that can be used has been limited by the size of the photo detector, or the aperture area of the condensing lens disposed at the front side as shown in FIG. 3, but, in the invention, since the luminous flux 10 entering the entire surface of the screen 5 which has a wide area can be received by the photoreceptor 21, the utility efficiency is improved about 1000 times. As a result, the distance that can be space-transmitted is extended.

Moreover, on the screen 5, since it is diffused somewhat by the lenticular plate 52, the luminous flux from an oblique direction can be received efficiently, without input of the luminous flux 10 from the screen front side. Generally, an incident angle is allowed by about 140 degrees in the horizontal direction to the screen 5 and about 30 in the vertical direction, and a far larger incident angle can be realized, as compared with the conventional photoreceptor 21 shown in FIG. 31.

In the invention, since the entire light receiver 8 is incorporated in the display apparatus 1, the signal wire distance between the light receiver 8 and the electric circuit of the projection type display apparatus 1 can be substantially shortened as compared with the prior art, and a projection image of high SN is realized. The appearance is also excellent because the parts are not installed outside as in prior art.

EMBODIMENT 2

Figure 13:
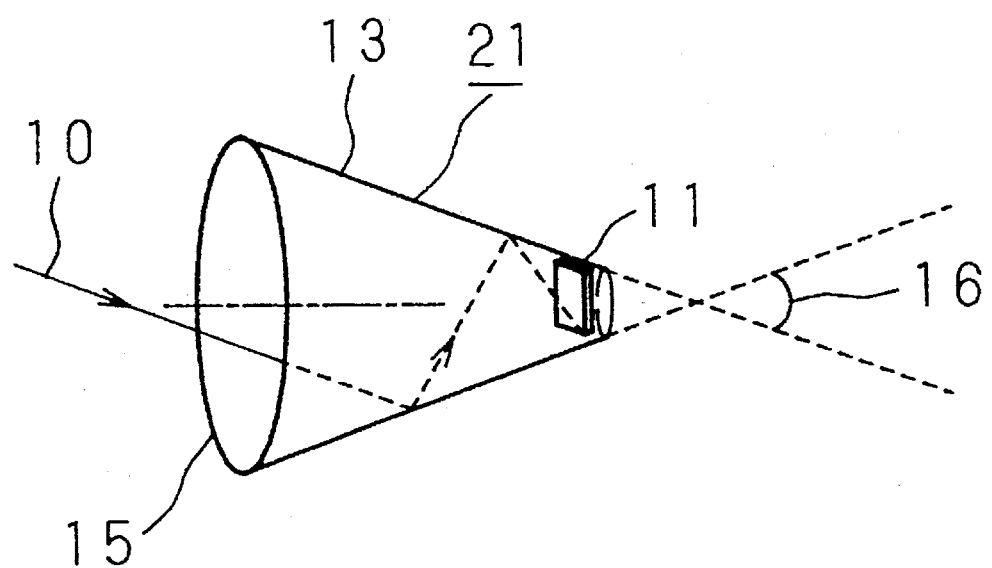
FIG. 13 is a structural diagram showing a receiver in embodiment 2 of a projection type display apparatus of the invention.

FIG. 13 is a structural diagram showing embodiment 2 of the projection type display apparatus of the invention, showing only the photoreceptor 21 of the light receiver. The photoreceptor 21 in the embodiment has a photo detector 11 attached to the inside of the smaller end of a cone-shaped reflector 13. The incident aperture 15 of the reflector 13 is set, for example, more than 10 times by area ratio as compared with the photo detector 11. The luminous flux entering the incident aperture 15 is reflected several times by the inside of the reflector 13, and is received by the photo detector 11. When the peak angle 16 of the reflector 13 is set at more than the viewing angle 28 of the projection lens 3, For example, 50 degrees, the luminous flux from the entire screen 5 can be received. It is more effective when the photo detector 11 is disposed at the inner side, rather than the outer side, of the reflector 13. The other constitution is same as in embodiment 1, and its description is omitted.

In this embodiment, without impeding the effect of the invention, the luminous flux utility rate may be improved more than 10 times as compared with embodiment 1. As a result, the spatial light transmission distance can be extended. The cone shaped reflector is, for example, fabricated by plastic forming, and coating the inner surface with aluminum to obtain a mirror-smooth surface, and any expensive optical part is not needed.

EMBODIMENT 3

Figure 14:
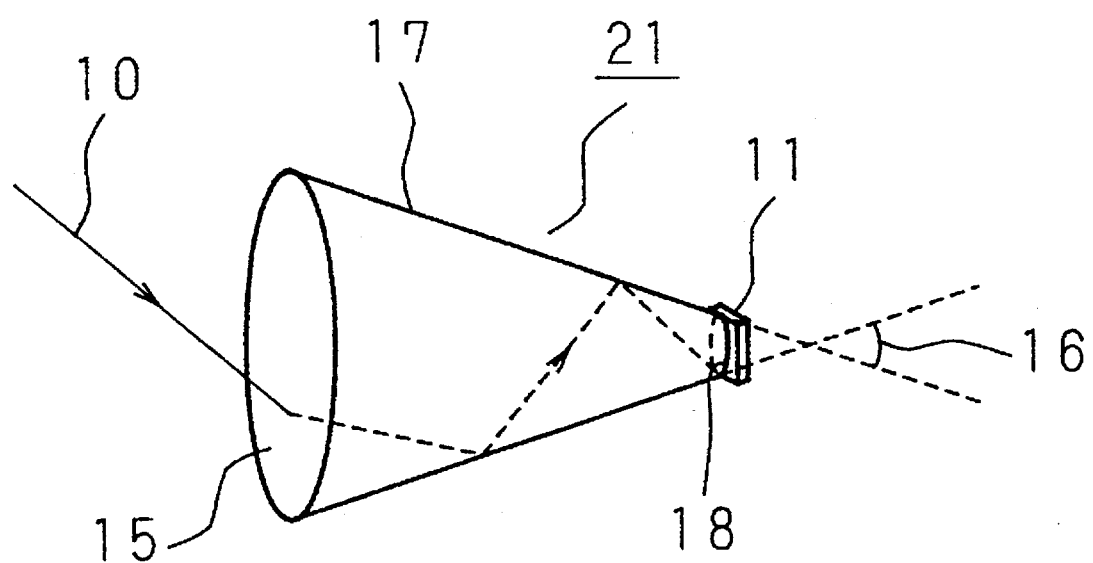
FIG. 14 is a structural diagram showing a receiver in embodiment 3 of a projection type display apparatus of the invention.

FIG. 14 is a structural diagram showing embodiment 3 of a projection type display apparatus of the invention, showing only the photoreceptor 21 of the light receiver. The photoreceptor 21 in the embodiment comprises a photo detector 11 at the outer side of the smaller end of a valve 17 made of a conical plastic material. The luminous flux 10 entering through the screen 5 is refracted at the incident aperture 15, and is received by the photo detect or 11 after repeating reflection and total reflection. The other constitution is same as in embodiment 1, and the description is omitted.

The action of the embodiment includes the following in addition to the action in embodiment 1. The valve 17 acts as a light guide, and hence the incident luminous flux 10 is refracted by the incident aperture 15. Therefore, according to Snell's law, the peak angle 16 of the valve 17 is about 30 degrees, more or less depending on the plastic material, when the viewing angle of the projection lens 3 is about 50 degrees, and therefore the luminous flux from the entire surface of the screen 5 can be led into the photo detector 11. At this time, the photo detector 11 is more effective when the exit opening 18 of the valve 17 is applied with an optical coupling with transparent adhesive or the like. Besides, to receive the luminous flux from the screen 5 more efficiently, it is preferred that the photoreceptor 21 be located near the projection lens 3.

EMBODIMENT 4

Figure 15:
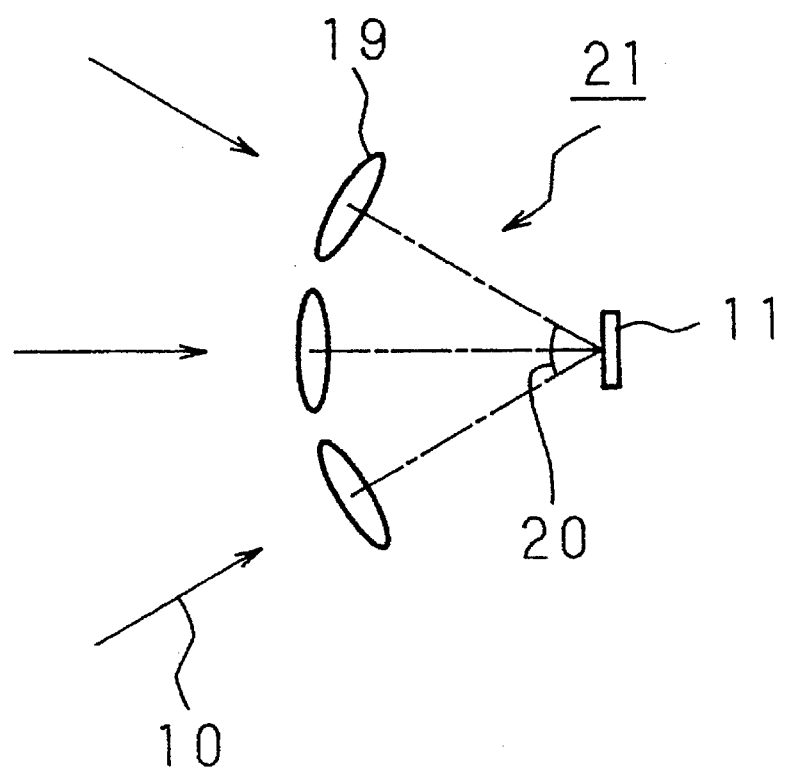
FIG. 15 is a structural diagram showing a receiver in embodiment 4 of a projection type display apparatus of the invention.

FIG. 15 is a structural diagram showing embodiment 4 of a projection type display apparatus of the invention, showing only the photoreceptor 21 of the light receiver. It is mentioned in embodiment 1 that the condensing lens 12 used in the conventional apparatus in FIG. 3 should not be used preferably, but in this embodiment, by using plural condensing lenses 19, the problem of the allowable incident angle can be solved. In FIG. 15, the condensing lenses 19 are arranged so that their focal positions may all coincide at one point, and the photo detector 11 is disposed at this condensing point. The other constitution is same as in embodiment, and the description is omitted.

Although the incident angle range of each condensing lens 19 is narrow, the entire luminous flux 10 from the screen 5 can be received on one photo detector 11 by using a plurality thereof. The condensing lenses 19 may be disposed so that the angle 20 formed by the optical axis of the outermost peripheral lens may conform to the angle of view of the projection lens 3, for example, about 50 degrees.

EMBODIMENT 5

Figure 16:
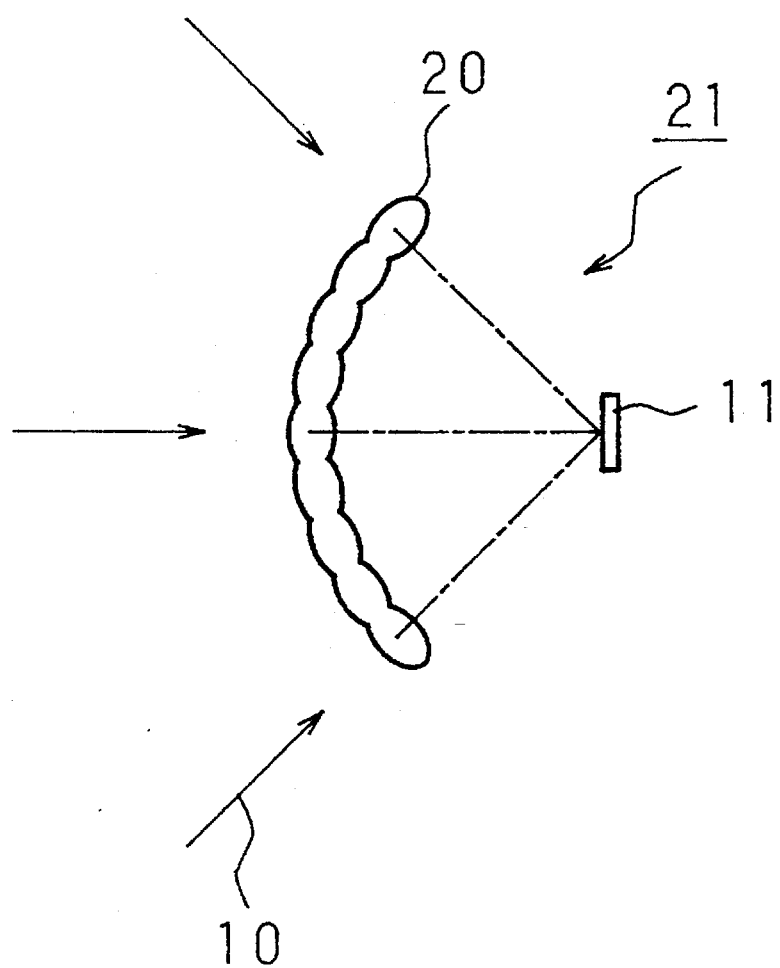
FIG. 16 is a structural diagram showing a receiver in embodiment 5 of a projection type display apparatus of the invention.

FIG. 16 is a structural diagram showing embodiment 5 of a projection type display apparatus of the invention, showing only the photoreceptor 21 of the receiver. In this embodiment, a plurality of condensing lenses 19 shown in embodiment 4 are arranged in a hemisphere, and are integrally fabricated by plastic forming to obtain an optical element 20. At this time, the condensing point of each lens element substantially coincides with the center of the hemisphere, and is arranged around the photo detector 11. The other constitution is same as in embodiment 1, and the description is omitted.

In this embodiment, too, the luminous flux 10 from the entire screen 5 can be led in and received by the photo detector 11.

EMBODIMENT 6

Figure 17:
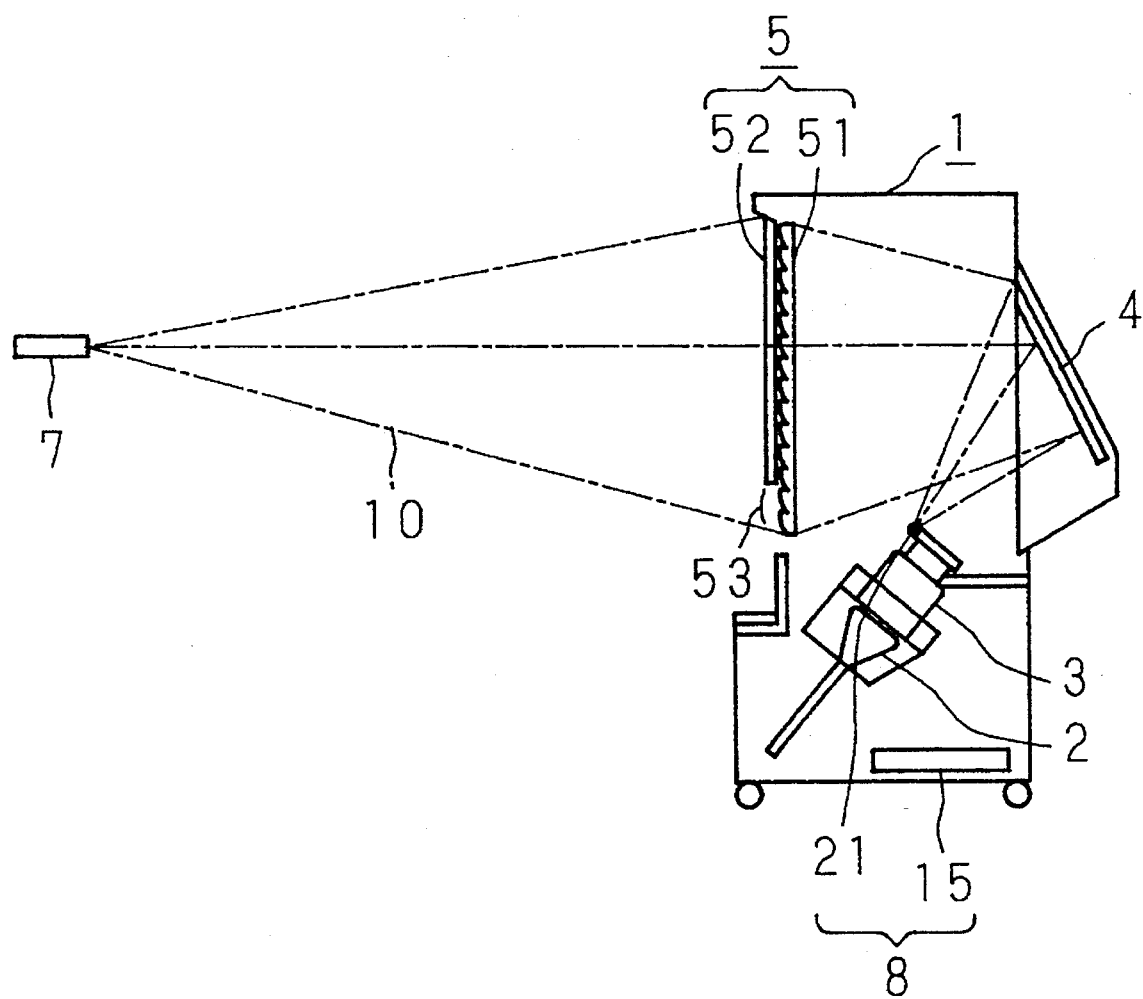
FIG. 17 is a schematic longitudinal sectional view showing embodiment 6 of a projection type display apparatus of the invention.

FIG. 17 is a schematic longitudinal sectional view showing embodiment 6 of a projection type display apparatus of the invention. In the embodiment, a Fresnel lens plate 51 is set larger than a lenticular plate 52 in the vertical direction of the screen 5, and the lower side 53 of the screen 5 is free of the lenticular plate 52. The other constitution is same as in embodiment 1, and same reference numbers are given and the description is omitted.

The spatial light transmission optical path in embodiment 6 is explained below. In FIG. 17, the luminous flux 10 emitted from the light transmitter 7 disposed at a position remote from the projection type display apparatus 1 enters the screen 5. The Fresnel lens plate 51 composing the screen 5 has a wider area than the lenticular plate 52. The incident luminous flux 10 runs in the reverse direction of FIG. 12, and is condensed near the projection lens 3 which is the condensing point position by the Fresnel lens plate 51. The condensed luminous flux 10 is photoelectrically converted by the photo detector provided in the photoreceptor 21, and demodulated into specific video signal and audio signal by the demodulation circuit.

According to embodiment 6, the utility efficiency of luminous flux is improved remarkably from the prior art. As stated above, the luminous flux 10 that could be used in the conventional apparatus was limited by the size of the photo detector, or the aperture area of the condensing lens 12 disposed before it as shown in FIG. 3, but in embodiment 6, since the luminous flux 10 entering the entire surface of the screen 5 having a large area can be condensed in the photoreceptor 21, the utility efficiency is improved about 1,000 times. Furthermore, of the Fresnel lens plate 51, the luminous flux 10 passing through the lower side 53 which is free of lenticular plate 52 escapes the diffusion effect of the lenticular plate 52, so that a very high utility efficiency is realized. This is because the transmissivity through the Fresnel lens plate 51 only is more than 90%. As a result, space-transmission over a long distance is outstandingly easier.

EMBODIMENT 7

Figure 18:
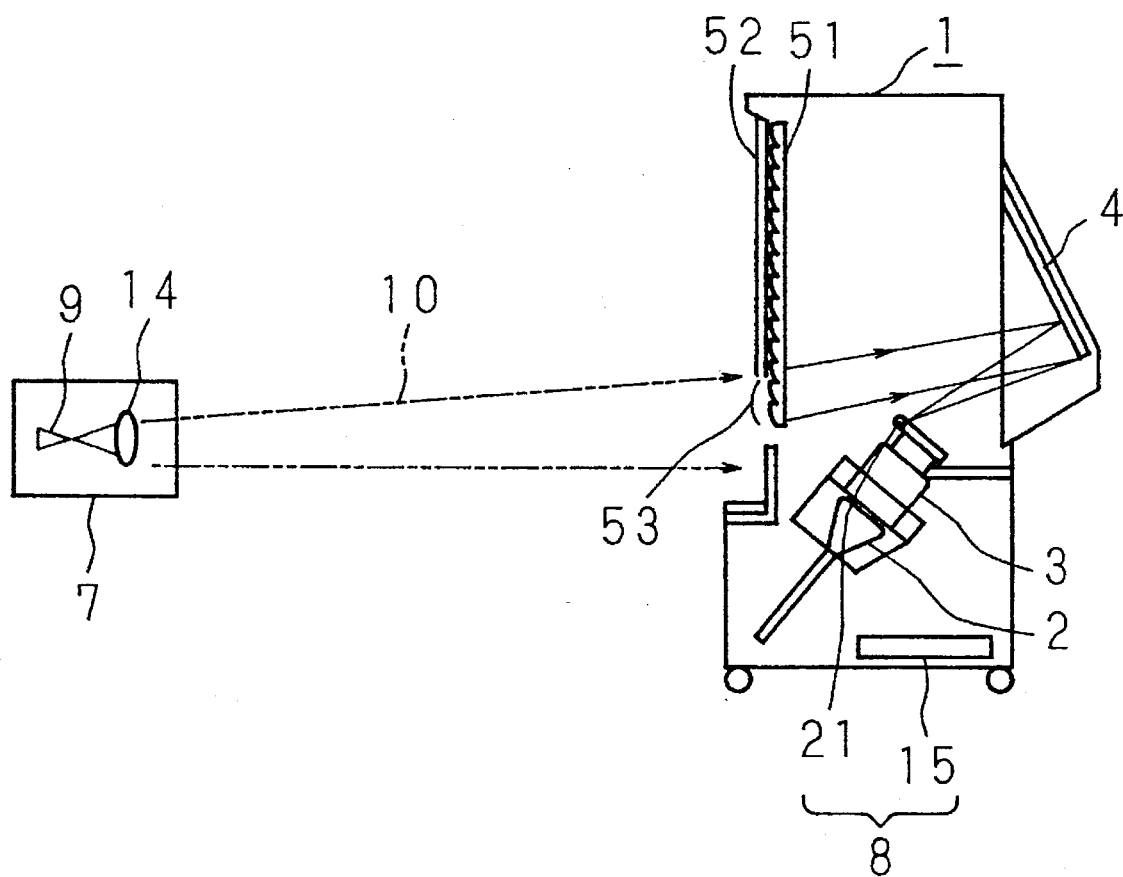
FIG. 18 is a schematic longitudinal sectional view showing embodiment 7 of a projection type display apparatus of the invention.

FIG. 18 is a schematic longitudinal sectional view showing embodiment 7 of a projection type display apparatus of the invention. In this embodiment, same as in embodiment 6, a lower side 53 free of lenticular plate 52 is provided in the lower part of the screen 5. The light transmitter 7 comprises a lens 14 for transforming the exit light of the light source 9 to be nearly parallel luminous flux. As a result, the luminous flux 10 from the light transmitter 7 is transmitted as nearly parallel luminous flux by the lens 14, and enters the lower side 53 which is free of lenticular plate 52. According to the embodiment, the luminous flux 10 can be condensed and entered into the projection type display apparatus 1 efficiently.

EMBODIMENT 8

In embodiments 6 and 7 shown in FIGS. 17 and 18, the projected image of the projection type display apparatus 1 is displayed in the existing area of the lenticular plate 52. By contrast, in the lower side 53 free of the lenticular plate 52, image is not displayed, and this is an unnecessary area for the projected image, and external light enters, which causes troubles such as deterioration of contrast.

Figure 19:
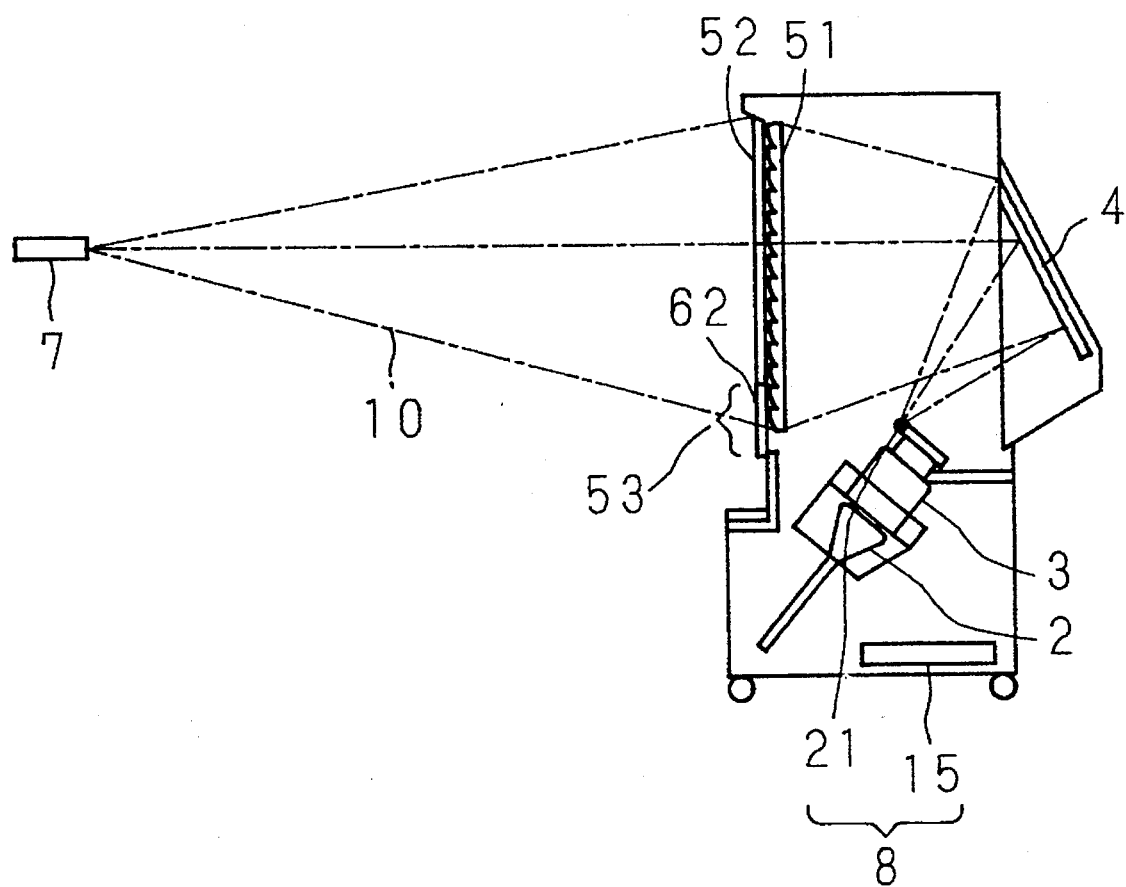
FIG. 19 is a schematic longitudinal sectional view showing embodiment 8 of a projection type display apparatus of the invention.

FIG. 19 is a schematic longitudinal sectional view showing embodiment 8 of a projection type display apparatus of the invention intended to solve such problems. A near infrared ray passing filter 62 is provided before the lower side 53 free of lenticular plate 52. The other constitution is same as shown in FIG. 17, and same reference numbers are given and explanations are omitted.

Figure 20:
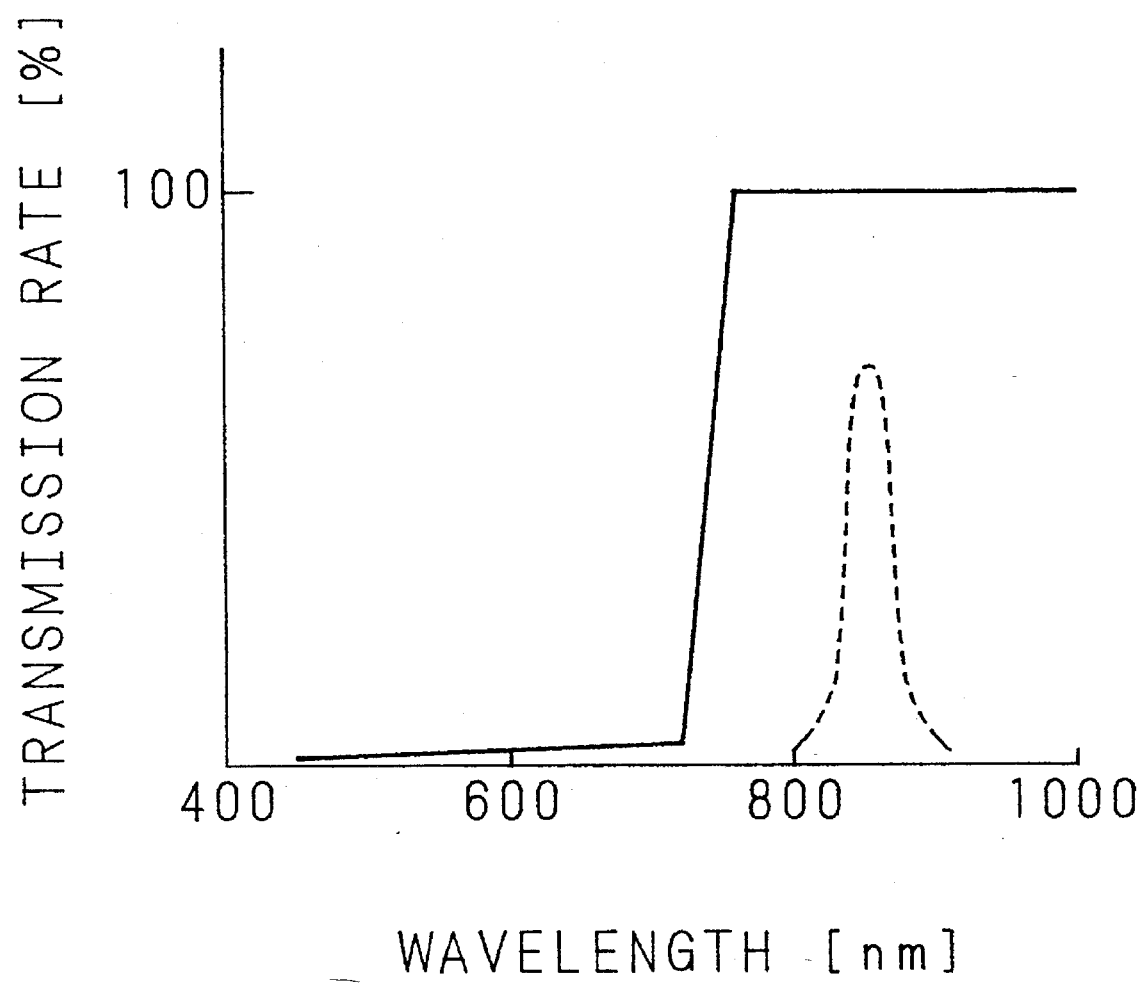
FIG. 20 is a characteristic diagram showing the relation between the transmission wavelength and its transmission rate in a near infrared ray transmission filter.

FIG. 20 is a characteristic diagram showing the relation between the passing wavelength and transmission rate in the near infrared ray passing filter 62. The characteristic of the near infrared ray passing filter 62 is indicated by solid line, and it is known that near infrared rays of about 700 nanometers (nm) can be passed. The wavelength (800 to 1000 nm) of the near infrared rays generally used as the light source of space-transmission apparatus is indicated by broken line. By installing the near infrared ray passing filter 62, infrared external light transmitted from the light transmitter 7 passes through the near infrared ray passing filter 62 and enters the projection type display apparatus 1, while the visible light cannot pass through the near infrared ray passing filter 62 and hence does not reach the projection type display apparatus 1. Therefore, a display performance of high contrast is maintained.

EMBODIMENT 9

Figure 21:
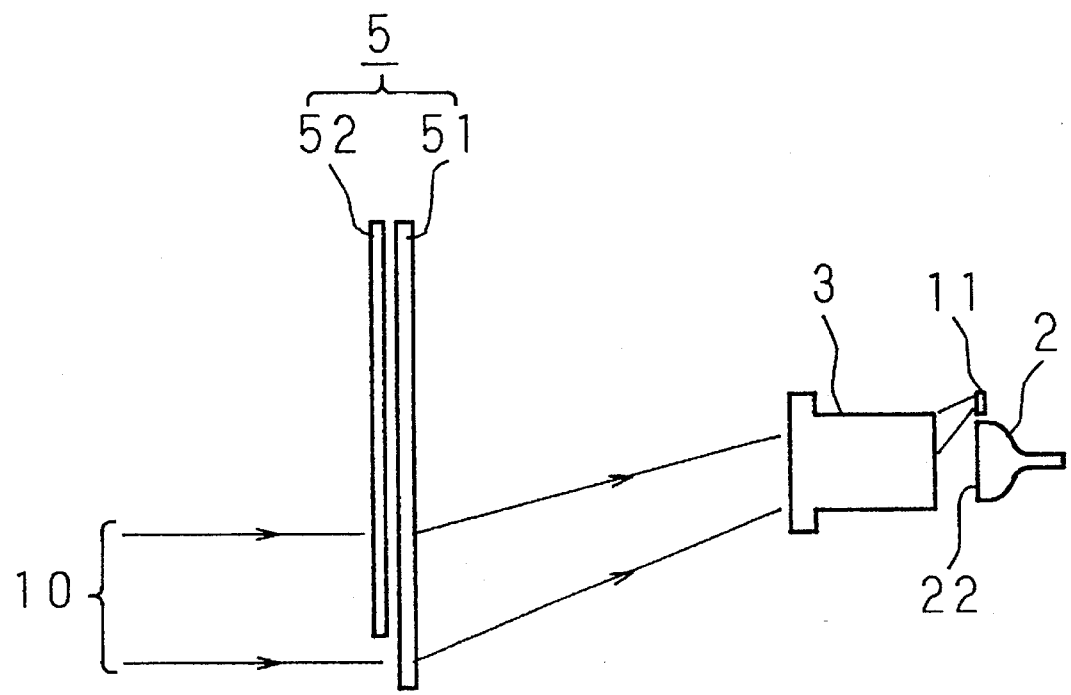
FIG. 21 is a schematic longitudinal sectional view showing embodiment 9 of a projection type display apparatus of the invention.

FIG. 21 is a schematic longitudinal sectional view showing embodiment 9 of a projection type display apparatus of the invention. In this embodiment, the photo detector 11 of the photoreceptor 21 is disposed beside the display screen 22 of the CRT 2. Same reference numbers as in FIG. 11 denote same or corresponding parts. The luminous flux 10 entering from the screen 5 is further condensed by the projection lens 3 having a relatively wide aperture, and is roughly collected in the photo detector 11. Hence, the luminous flux utility efficiency is improved from embodiment 8, and spatial light transmission over a longer distance is realized.

EMBODIMENT 10

Figure 22:
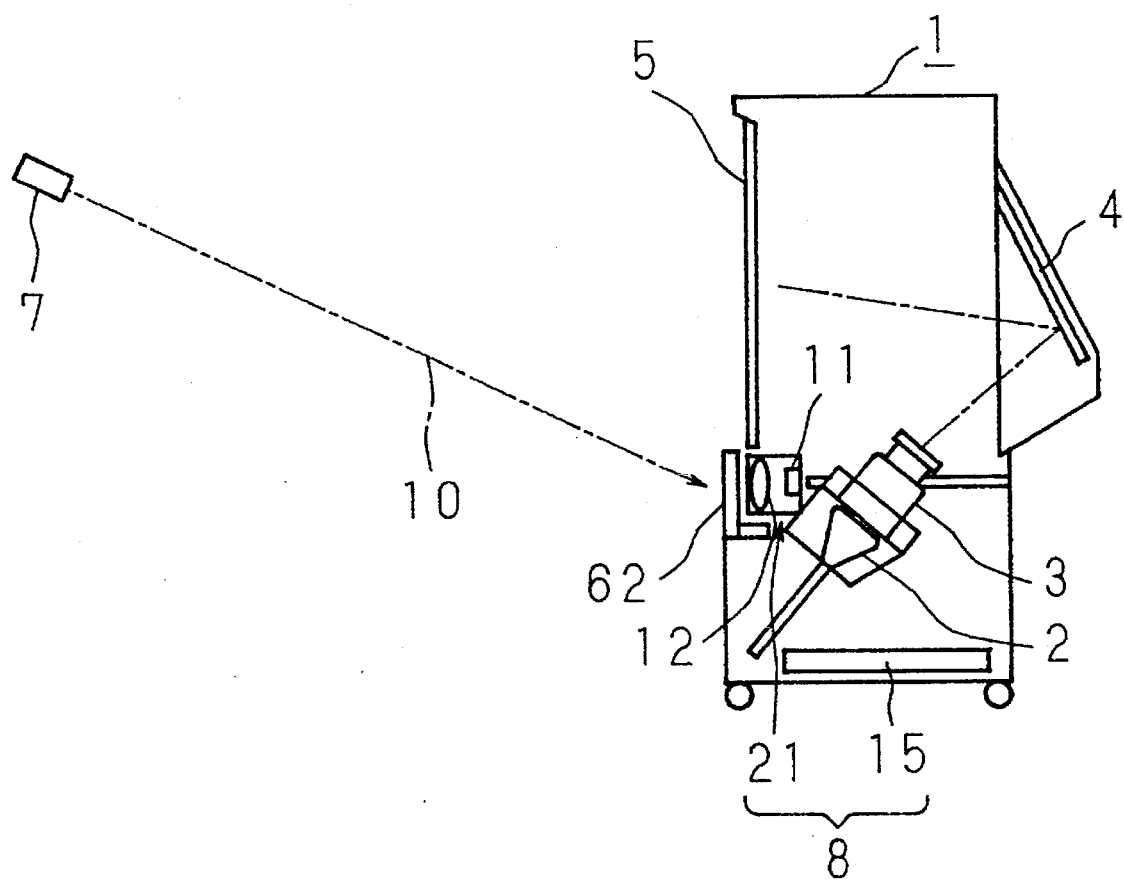
FIG. 22 is a schematic longitudinal sectional view showing embodiment 10 of a projection type display apparatus of the invention.

FIG. 22 is a schematic longitudinal sectional view showing embodiment 10 of a projection type display apparatus of the invention. At the lower side of the screen 5 provided at the front side of the projection type display apparatus 1, a near infrared ray passing filter 62 is provided, and a photoreceptor 21 is provided inside the near infrared ray passing filter 62. The luminous flux 10 entering from the front side is received by the photoreceptor 21. The photoreceptor 21 comprises a condensing lens 12 and a photo detector 11 same as shown in FIG. 3, and the luminous flux 10 of a relatively wide area can be condensed into the photo detector by the condensing lens 12. The other constitution is same as shown in FIG. 11, and same reference numbers are given and explanations are omitted.

The spatial light transmission optical path in embodiment 10 is described below. In FIG. 22, the luminous flux 10 emitted from the light transmitter 7 disposed remote from the display apparatus 1 enters the photoreceptor 21. The light signal is photoelectrically converted by the photoreceptor 21, and is demodulated into specified signal in the demodulation circuit 15.

In this embodiment, same as in embodiment 8, a near infrared ray passing filter 62 is provided in the previous stage of the photoreceptor 21, and prevents external light different in wavelength from the light source of the light transmitter 7 from invading, so that a projected image of high contrast is maintained.

EMBODIMENT 11

Figure 23:
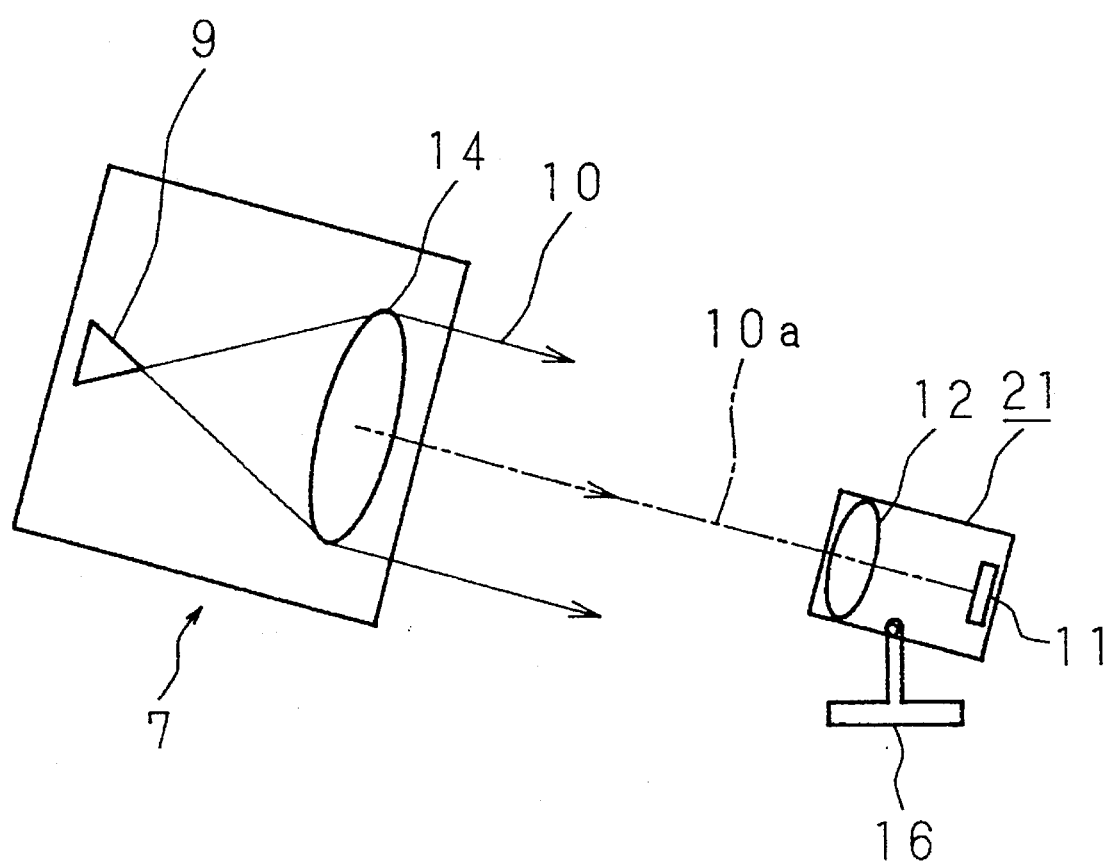
FIG. 23 is a structural diagram showing a receiver in embodiment 11 of a projection type display apparatus of the invention.

FIG. 23 is a structural diagram showing embodiment 11 of a projection type display apparatus of the invention, showing only the light transmitter 7 and photo receptor 21 of the light receiver 8. The photoreceptor 21 comprises a photo detector 11 and a condensing lens 12, and also includes an optical axis adjusting mechanism 16 capable of rotating the entire body. The luminous flux 10 emitted from the light transmitter 7 is not always irradiated from the front side of the projection type display apparatus 1, and may also enter obliquely. At this time, when the angle of the photoreceptor 21 is adjusted by the optical axis adjusting mechanism 16 so that the optical axis of the condensing lens 12 and the optical axis 10a of the luminous flux 10 to be entered may be matched, the luminous flux may be led to the photo detector 11 always efficiently.

EMBODIMENT 12

Figure 24:
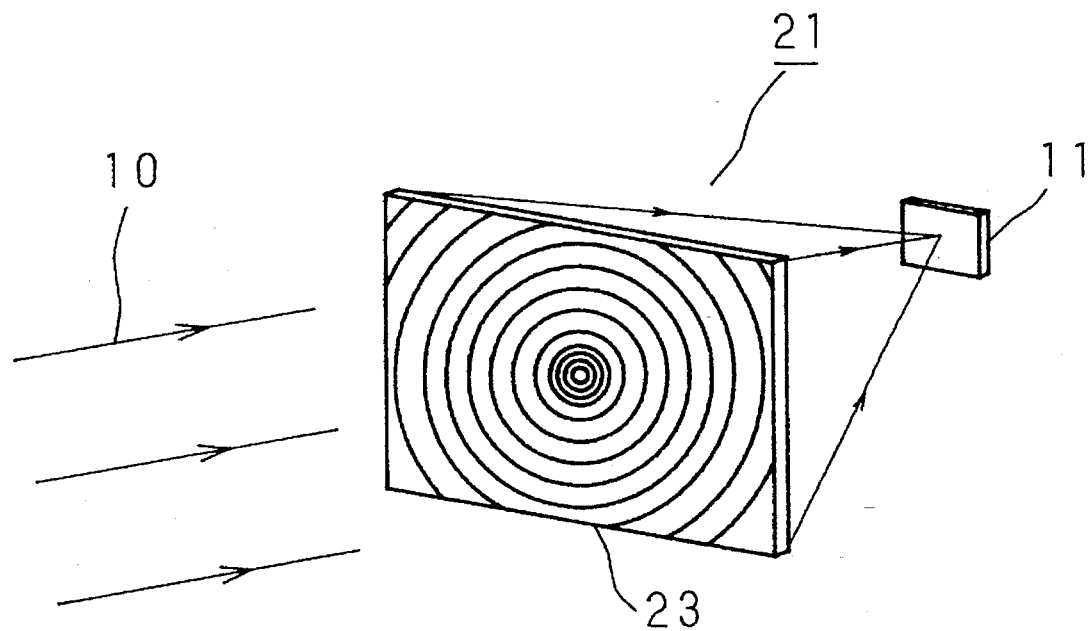
FIG. 24 is a structural diagram showing a receiver in embodiment 12 of a projection type display apparatus of the invention.

FIG. 24 is a structural diagram showing embodiment 12 of a projection type display apparatus of the invention, showing only the photoreceptor 21. In above mentioned embodiment, a convex lens is used as the condensing lens 12, and a Fresnel lens 23 as shown in FIG. 24 is used in this embodiment. As a result, the constitution is simplified and the cost is lowered. The Fresnel lens 23 should have a shorter focal length, and the photoreceptor 21 can be reduced in size and the incident allowable angle of the luminous flux 10 may be expanded.

EMBODIMENT 13

Figure 25:
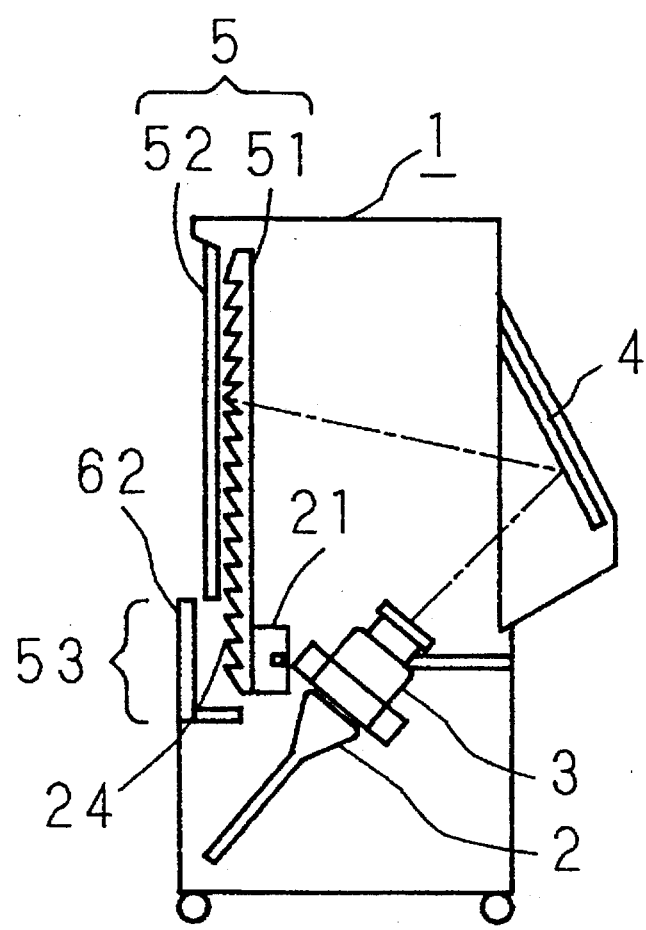
FIG. 25 is a schematic longitudinal sectional view showing embodiment 13 of a projection type display apparatus of the invention.
Figure 26:
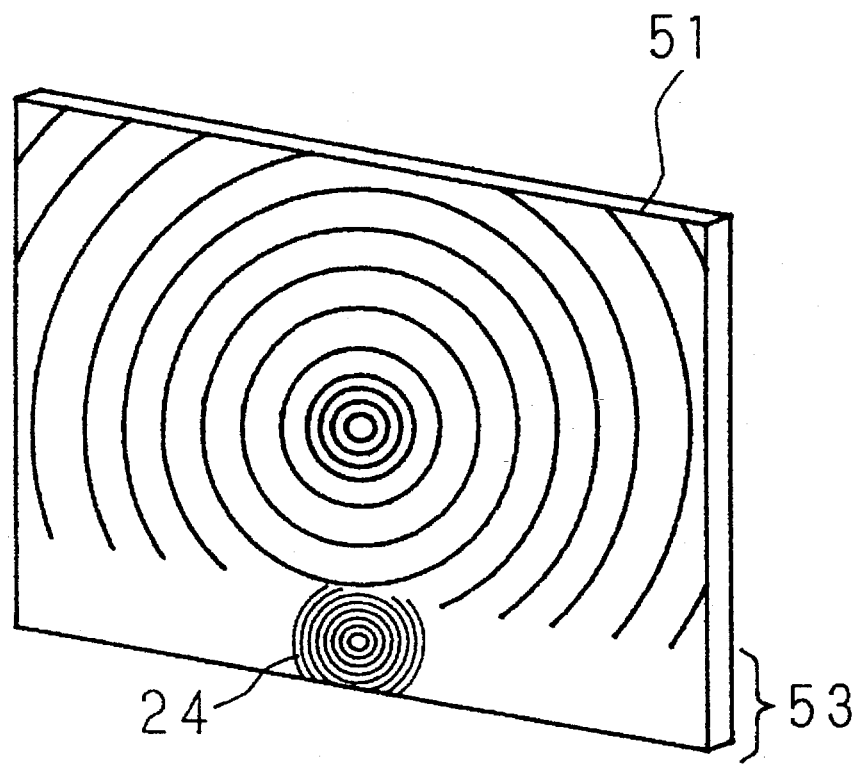
FIG. 26 is a front perspective view showing a Fresnel lens plate shown in FIG. 25.

FIG. 25 is a schematic longitudinal sectional view showing embodiment 13 of a projection type display apparatus of the invention. FIG. 26 is a front perspective view showing a Fresnel lens plate 51 shown in FIG. 25. The Fresnel lens plate 51 is larger than the lenticular plate 52, and in the lower side 53 free of lenticular plate 52, a Fresnel lens 24 having a different focal length from the original Fresnel lens plate 51 is integrally formed. The focal length of the Fresnel lens 24 is preferred to be shorter than that of the Fresnel lens plate 51.

As shown in FIGS. 25 and 26, since the Fresnel lens 24 as the condensing lens for spatial light transmission is formed integrally with the Fresnel screen 51, the parts can be used commonly without affecting the original projected image, and the same action and effect as in the embodiment without lower side 53 may be brought about.

EMBODIMENT 14

FIG. 27 is a perspective view showing embodiment 14 of a projection type display apparatus of the invention. In this embodiment, the condensing lens 25 for photoreceptor 21 is composed of plural coaxial Fresnel lenses 26, 26 . . . of nearly same focal length, and provided at the front side of the projection type display apparatus 1. Hitherto, the luminous flux 10 entering obliquely the photoreceptor 21 could not be received when exceeding the allowable angle θ determined by the focal length of the condensing lens 12 and the size of the photo detector 11 as shown in FIG. 3. In embodiment 11, as its countermeasure, the optical axis adjusting mechanism 16 was used, but in this embodiment, since the plural condensing lenses 12 are used, the optical axis adjusting mechanism 16 is not needed.

FIG. 28 is a plan view for explaining the optical path in embodiment 14. The diagram shows Fresnel lenses 26, 26 . . . and photo detector 11 arranged in a row. When the optical axis 10a of the luminous flux 10 entering from various directions A, B, C, and others enters any Fresnel lens 26 so as to reach nearly the photo detector 11, that luminous flux 10 is received by the photo detector 11. Therefore, when the light transmitter is at a position dislocated from the exact front side of the projection type display apparatus 1, when the light transmitter is directed to the projection type display apparatus 1, the luminous flux 10 enters any one of the plural Fresnel lenses 26, 26 . . . , and is received by the photoreceptor. The direction of arranging the Fresnel lenses 26, 26 . . . may be either longitudinal direction or lateral direction, but the position of the light transmitter is higher in possibility in the change in the longitudinal direction than in the change in the lateral direction, and generally it is constituted as shown in FIG. 27 by arranging in the lateral direction so as to receive the oblique incident luminous flux entering from a wide range in the lateral direction.

EMBODIMENT 15

FIG. 29 is a diagram showing embodiment 15 of a projection type display apparatus of the invention, showing only the Fresnel lens plate 51. The Fresnel lens plate 51 in the embodiment is larger than the lenticular plate 52, and a lower side 53 free of lenticular plate 52 is provided. Plural Fresnel lenses 26, 26 . . . are integrally formed in the lower side 53. The other constitution is same as in the preceding embodiment.

As a results the same action and effect as in embodiment 14 are brought about, and it also excels in the assembling performance of the projection type display apparatus, and the cost can be lowered.

EMBODIMENT 16

FIG. 30 is a perspective view showing embodiment 16 of a projection type display apparatus of the invention. In this embodiment, the condensing lens 25 for photoreceptor 21 comprises plural Fresnel lenses, and is provided at the front side of the projection type display apparatus 1. In the diagram, seven Fresnel lenses 27a, 27b . . . 27g are shown. These Fresnel lenses 27a, 27b . . . 27g have nearly same focal lengths, but gradually differ in the eccentricity.

FIG. 31 is a plan view for explaining the optical path in embodiment 16. In the diagram, the Fresnel lenses 27a, 27b . . . 27g and photo detector 11 which are arranged in a row are shown. In embodiment 14, coaxial Fresnel lenses 26, 26 . . . were used, and the luminous flux 10 could be received only when the photo detector 11 was present on the optical axis 10a as shown in FIG. 28, but in this embodiment, since the Fresnel lenses 27a, 27b . . . 27g differ in the degree of eccentricity, the luminous flux 10 from a smaller incident angle direction A can be also led into the photo detector 11 as shown in FIG. 31. This is because the optical axis 10a is refracted by the eccentric Fresnel condensing lens 12.

EMBODIMENT 17

FIG. 32 shows embodiment 17 of a projection type display apparatus of the invention, showing only the Fresnel lens plate 51. The Fresnel lens plate 51 in this embodiment is larger than the lenticular plate 52, and there is a lower side 53 free of lenticular plate 52. In the lower side 53 of the Fresnel lens plate 51, same as in embodiment 16, Fresnel lenses 27a, 27b . . . 27g differing gradually in the eccentricity are formed integrally. The other constitution is same as in the preceding embodiment.

As a result, the same action and effect as in embodiment 16 are brought about,and it is excellent in the assembling performance of the projection type display apparatus, and the cost can be lowered.

An infrared ray passing filter 62 may be, meanwhile, disposed at the front side of the photoreceptor 21 in embodiments 10 to 17.

EMBODIMENT 18

FIG. 33 is a schematic longitudinal sectional view showing embodiment 18 of a projection type display apparatus of the invention. The spatial light transmission apparatus comprises a light transmitter 33 and a light receiver 34, and the light transmitter 33 is incorporated in the projection type display apparatus 1, being installed near the projection lens 3. On the other hand, the light receiver 34 is attached to a headphone 31. The other constitution is same as in the preceding embodiment, and same reference numerals are given and the explanations are omitted.

FIG. 34 is a structural diagram showing the light transmitter 33. The light transmitter 33 comprises a modulation circuit 45 and a light source 46. The light source 46 is usually a light emitting diode (LED) of near infrared wavelength, and plural LEDs are used in this embodiment. When the divergence region of the light source 46 is smaller than the pupil diameter of the projection lens 3, it is received sufficiently by the screen 5, running the same optical path as the optical path of the projected image. Using plural light sources, the optical power that can be transmitted increases, and the transmission distance can be extended.

FIG. 35 is a structural diagram of the light receiver 34. The light receiver 34 is built in the headphone 31, and the received light signal is photoelectrically converted by a photo detector 43, and is demodulated to a specified audio signal by a demodulation circuit 44.

In the projection type display apparatus 1 shown in FIG. 33, the image of the CRT 2 is magnified and projected by the projection lens 3, and is focused on the screen 5 through a mirror 4. At this time, the optical axis 41 of the projected image luminous flux is directed to the viewer sitting nearly in the front, so that a bright picture can be enjoyed.

The spatial light transmission optical path in embodiment 18 is explained. In FIG. 33, the light transmitter 33 is located near the projection lens 3, and the optical axis 42 of the luminous flux emitted from the light transmitter 33 runs in the optical path substantially same as the optical axis 41 of the projected image to be irradiated to the viewer, and is received by the light receiver 34.

Figure 5:
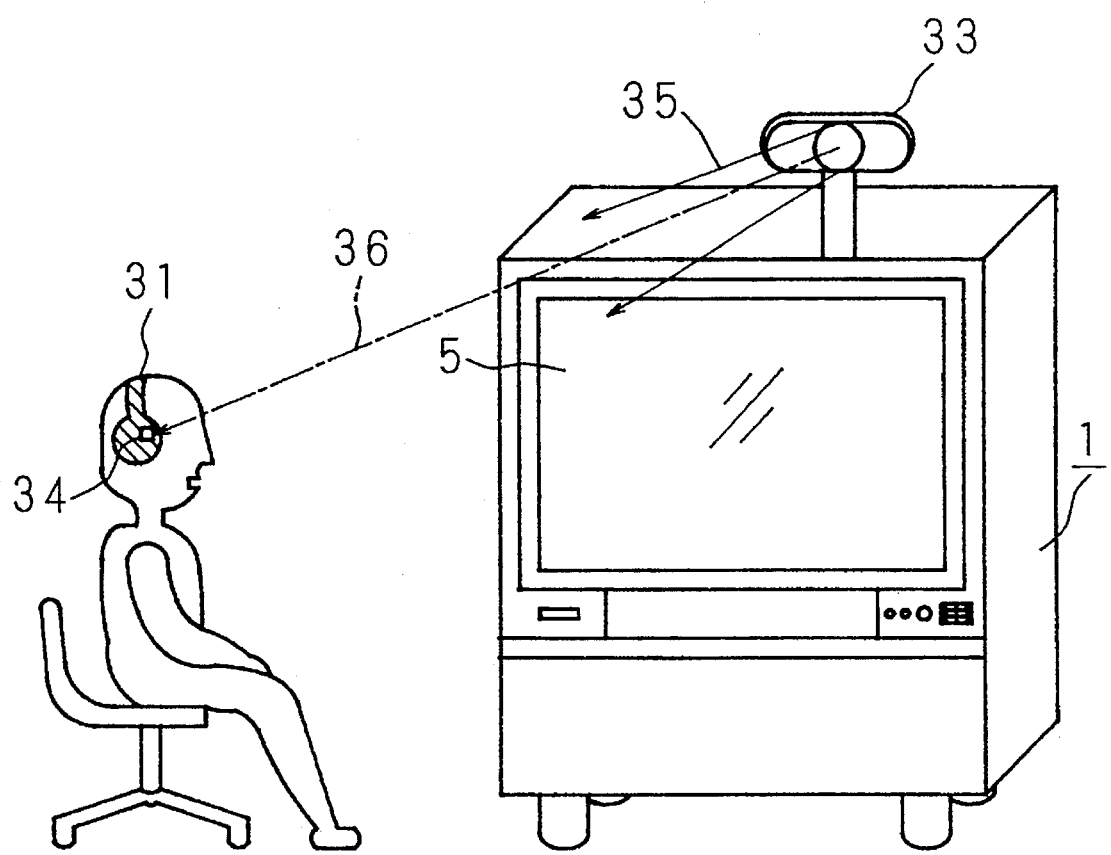
FIG. 5 is a structural diagram showing other constitution of a conventional spatial light transmission apparatus.
Figure 6:
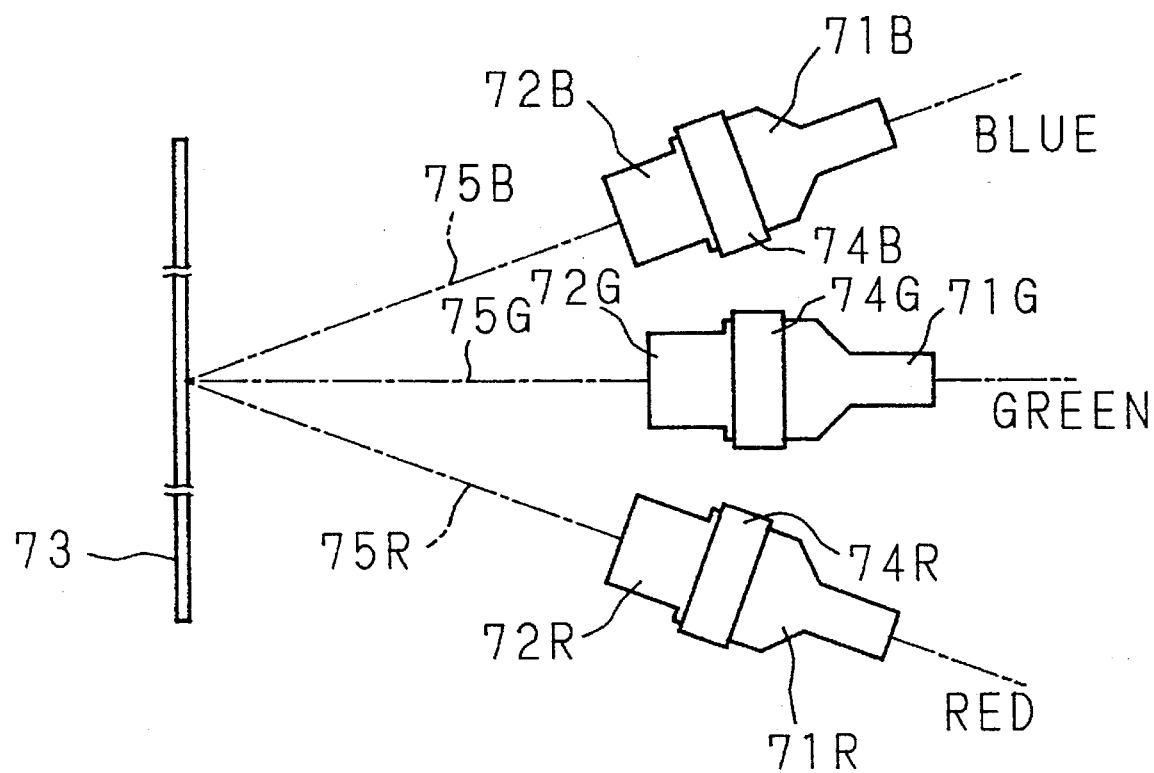
FIG. 6 is a structural diagram showing a constitution of a conventional three-tube projection type display apparatus.
Figure 7:
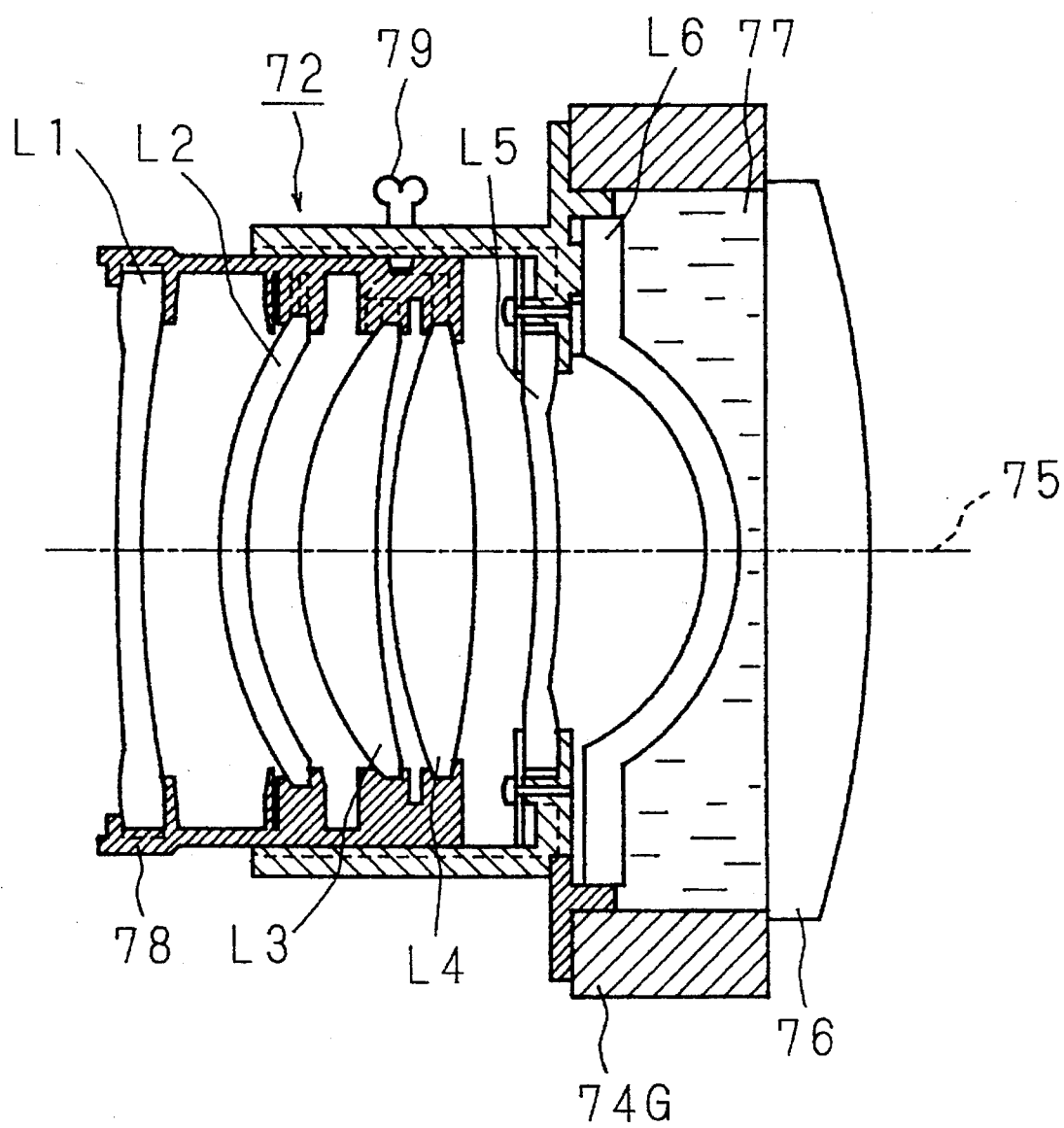
FIG. 7 is a longitudinal sectional view of the projection unit in FIG. 6.

The spatial light transmission transmitter in the embodiment is located near the projection lens 3, and only when the exit luminous flux enters the screen 5, the effect of the screen 5 is received same as the image luminous flux, so that the viewer can receive the audio signal as far as sitting in the position capable of seeing the image, which is an excellent effect. Besides, the light transmitter 33 is not provided outside as in the conventional apparatus shown in FIG. 5, but is incorporated inside, so that the appearance is superior. Furthermore, by incorporating the light transmitter 33, the signal wire is shortened, and the signal quality deterioration can be prevented.

EMBODIMENT 19

FIG. 36 is a structural diagram showing embodiment 19 of a projection type display apparatus of the invention, showing only the light transmitter. The light transmitter 33 in the embodiment comprises an LED 47 and a condensing lens 48. In the embodiment in FIG. 34, the divergence angle 49 of the exit luminous flux from the light transmitter is determined by the divergence angle of the LED 47. When the divergence angle 20 is greater than the angle of view 28 of the projection lens 3 shown in FIG. 12, the entire luminous flux cannot be taken into the screen 5, and the optical power is lost. In this embodiment, using the condensing lens 48, the divergence angle 49 is controlled, and hence it may be adjusted to the angle of view 28 of the projection lens 3, for example, so that the luminous flux can be entered in the screen 5 without loss of quantity of light.

EMBODIMENT 20

In the constitutions shown in embodiments 18 and 19, it is extremely difficult to arrange so that the position of the viewer to see the brightest picture and the position of the viewer to obtain the strongest luminous flux for spatial light transmission may coincide perfectly with each other. Its countermeasure is explained in embodiment 20. FIG. 37 is a structural diagram showing embodiment 20 of a projection type display apparatus of the invention, showing only the light transmitter. The light transmitter 33 includes an optical axis adjusting mechanism 50 capable of adjusting the direction of the optical axis 42 of the exit luminous flux. The light transmitter 33 is located near the projection lens 3 same as in FIG. 33. The other constitution is same as in the preceding embodiment.

FIG. 38 shows the mode of diffusion when the luminous flux enters the lenticular plate 52 from the light source 46. The luminous flux 51 diffused by the lenticular plate 52 includes a diffusion angle 52, and the luminous flux 51 can be transmitted to the viewer even when he is located in an oblique direction as mentioned above, but the power is strongest in the direction of the optical axis 42. Hence, using the optical axis adjusting mechanism 50, the direction of the light transmitter 33 may be changed so that the most luminous flux 51 may be received by the viewer. Since the light transmitter 33 is incorporated in the projection type display apparatus 1, it cannot be directly adjusted by hand, but it may be remote controlled by the viewer.

EMBODIMENT 21

FIG. 39 is a structural diagram showing essential parts of embodiment 21 of a projection type display apparatuses of the invention. In the embodiment, at least the light source 46 of the light transmitter 33 is arranged beside the CRT 2 of the projection unit. The other constitution is same as in the foregoing embodiments.

In this constitution, of the exit luminous flux from the light source 46, the luminous flux passing through the pupil 61 of the projection lens 3 can run along the edge of the screen 5 in FIG. 33. In this embodiment, the condensing function of the projection lens 3 can be utilized, and the luminous flux can be efficiently transmitted to the screen.

EMBODIMENT 22

FIG. 40 is a structural diagram showing essential parts of embodiment 22 of a projection type display apparatus of the invention. In this embodiment, same as in embodiment 21, the light source 46 is arranged beside the CRT 2, and a mirror 54 is disposed ahead of the light source 46. The other constitution is same as in the foregoing embodiments.

In such constitution, the luminous flux emitted from the light source 46 is reflected by the mirror 54, and enters the display surface of the CRT 2. The phosphor used in the display surface of the CRT 2 is generally high in reflectivity, and the luminous flux reflected by the mirror 54 is further reflected on the phosphor surface as shown in the diagram, and enters the projection lens 3. In this embodiment, since the optical path of the luminous flux for spatial light transmission and the optical path of the image luminous flux coincide perfectly with each other, the luminous flux for spatial light transmission is efficiently transmitted to the viewer through the projection lens 3 and screen 5. While the image luminous flux is a visible light, the spatial light transmission luminous flux is near infrared external light and is not visible, so that it will not affect the picture at all.

EMBODIMENT 23

FIG. 41 is a structural diagram showing a CRT 2 in embodiment 23 of a projection type display apparatus of the invention. On the display surface 55 of the CRT 2, an ordinary image display region 56 and an emission region 57 for spatial light transmission are formed. The image display region 56 is coated with a phosphor for emitting visible light, and an image is formed by drawing a scanning line 60 by an electron beam 59 from an electron gun 58. On the other hand, the emission region 57 is coated with a phosphor for emitting near infrared light, and a signal corresponding to audio signal is emitted as light signal by an electron beam 59 from the electron gun 58. The other constitution is same as in the foregoing embodiments.

The luminous flux emitted from the emission region 57 runs same as shown in FIG. 40, that is, the luminous flux passing through the pupil 61 of the projection lens 3 reaches the edge of the screen 5 shown in FIG. 33. That is, the emission region 57 includes the function of the light source 46 in embodiments 21 and 22, and when combined integrally with the CRT 2, the number of parts is curtailed, the assembling performance is enhanced, and many other excellent effects are brought about. The electron gun 58 may be provided in a plurality for drawing the image display region 56 and for emission region 57, separately.

EMBODIMENT 24

FIG. 42 is a schematic longitudinal sectional view showing embodiment 24 of the projection type display apparatus of the invention. The screen 5 includes a lower side 53 in which image is not formed, aside from the region for forming an image by projected image luminous flux. The luminous flux from the light source 46 disposed beside the CRT 2 is transmitted to the edge of the screen 5 through the projection lens 3 as indicated by optical axis 42. The lower side 53 is used as the region for passing this luminous flux and emitting from the projection type display apparatus 1. That is, this is an ideal screen constitution for the projection type display apparatus 1 incorporating the projection unit of embodiments 21 and 22.

In this constitution, projected image is not displayed in the lower side 53, and when the near infrared ray passing filter 62 for not passing visible light is disposed at the front side, only the spatial light transmission luminous flux can be passed, and the presence of the screen can be hidden from the viewer.

EMBODIMENT 25

FIG. 43 is a schematic longitudinal sectional view showing embodiment 25 of a projection type display apparatus of the invention. In embodiments 18 to 24, the light source 46 is disposed near the projection lens 3, the optical path of the projected image luminous flux and the optical path of spatial light transmission luminous flux are nearly in the same route, and the action of the screen 5 is effectively utilized, while, in this embodiment, the light transmitter 33 is installed remote from the projection lens 3, and the spatial light transmission luminous flux is emitted through the middle position of the screen 5. That is, the light transmitter 33 includes a mirror 4, and is installed in the bottom of the convex part 1a formed on the back side of the projection type display apparatus 1. The light transmitter 33 is designed to emit the luminous flux from this position toward the screen 5. The other constitution is same as in the foregoing embodiments.

When the distance from the light transmitter 33 to the screen 5 is set shorter than the projection distance of the projection lens 3, it is possible to transmit to the viewer in a wider range than the projected image by the action of the Fresnel screen 51 in FIG. 43. Although the power finally reaching the viewer is diffused, this is a very effective constitution when a luminous flux of sufficient power is emitted from the light transmitter 33.

EMBODIMENT 26

FIG. 44 is a schematic longitudinal sectional view showing embodiment 26 of a projection type display apparatus of the invention. In this embodiment, a near infrared ray passing filter 62 is provided at the lower side of the screen 5, and the light transmitter 33 is disposed inside the near infrared ray passing filter 62. The luminous flux emitted from the light transmitter 33 passes through the near infrared ray passing filter 62, and is emitted outside of the projection type display apparatus 1. The other constitution is same as in the foregoing embodiments.

In this embodiment, since the light transmitter 33 is covered with the near infrared ray passing filter 62, the light transmitter 33 is not visible from the viewer. Therefore, the appearance is not spoiled. Although the diffusion performance of the screen 5 cannot be utilized because the screen 5 is not used for the purpose of emission of spatial light transmission luminous flux, this is a very effective constitution when a sufficient power can be emitted from the light transmitter 33.

In embodiments 18 to 26, meanwhile, the audio signal is explained as the signal for spatial light transmission, but it may be video signal or control signal as the case may be, and it may be also applied, for example, in the image signal transmission apparatus from the projection type display apparatus 1 to other display.

The screen 5 is not particularly defined as far as it includes the condensing action of Fresnel lens plate 51 and diffusion action of lenticular plate 52. In the foregoing embodiments, the CRT is explained as the image forming means, but the same effects are obtained when applied in the projection type display apparatus using light valve such as liquid crystal panel, and the like.

EMBODIMENT 27

FIG. 45 is a structural diagram showing embodiment 27 of a projection type display apparatus of the invention. Reference numerals 71R, 71G, and 71B are CRTs having red, green and blue image forming means, respectively, and at the face plate sides of the CRTs 71R, 71G, and 71B, projection lenses 72R, 72G, and 72B are disposed respectively through spacers 74R, 74G, and 74B. Numeral 85R is an interval between the CRT 71R and projection lens 72R, 85G is an interval between the CRT 71G and projection lens 72G, and 85B is an interval between the CRT 71B and projection lens 72B. The projection units are disposed at specified angles so that the optical axes 75R, 75G, and 75B of the lights emitted from the CRTs 71R, 71G, and 71B and passing through the projection lenses 72R, 72G, and 72B may intersect in the middle of the screen 73. The projection distances along the optical axes 75R, 75G, and 75B from the projection lens 72 to the screen 73 are arranged to be of a same length. The constitution of the projection lens 72 and other constitutions are identical in all three projection units.

In this embodiment, the intervals 85R, 85G, and 85B are different from each other, and on the basis of the interval 85G of the green projection unit, the interval 85R of the red projection unit is set longer, and the interval 85b of the blue projection unit is set shorter. The difference of the interval 85G of the green projection unit from the interval 85R of the red projection unit, and the interval 85B of the blue projection unit is adjusted to the difference in the condensing direction of the projection lens 72 by the difference in color. More specifically, the interval 85G of the green projection unit is 5 mm, the interval 85R of the red projection unit is 5.5 mm, and the interval 85b of the blue projection unit is 4.5 mm. This values mean the center thickness of each coolants.

FIG. 46 is an explanatory diagram showing both green and red projection units. Without focal adjustment of the projection lenses 72R and 72G, the condensing position is remoter in the red light R of longer wavelength than in the green light G as seen from the diagram. At this time, when the position of the CRT 71R is set away from the projection lens 72R, the focus is nearly matched. Furthermore, by fine adjustment by using a focus adjusting mechanism 79 of the projection lens 2, the focus can be matched precisely.

FIG. 47 is a longitudinal sectional view showing the constitution of the projection unit shown in FIG. 45, showing both the green and red projection units. The projection lens 72 comprises lens elements L1 to L6 disposed sequentially from the screen side, being supported by a lens barrel 78. The lens barrel 78 supports the lens elements L1 to L4, and lens elements L5, L6 separately, and there is a focus adjusting mechanism 79 for adjusting the interval between the lens element L4 and lens element L5 by means of a screw. The face plate 76 of the CRT 1 and the lens barrel 78 of the projection lens 72 are fixed by means of the spacer 74. The space enclosed by the face plate 76, the lens element L6 located at the closest CRT side, and the spacer 74 is filled with a coolant 77.

In the diagram, the positions of the spacer 74R and face plate 76R of the red projection unit are indicated by dotted line, while the spacer 74G and face plate 76G of the green projection unit are indicated by solid line. The spacer 74R of the red projection unit is longer in the length in the optical axis direction than the spacer 74G of the green projection unit, and therefore the position of the face plate 76R is deviated to the Fight side of the position of the face plate 76G. Hence, the coolant 77 sealed in the spacers 74R, 74G differs in thickness.

Figure 8:
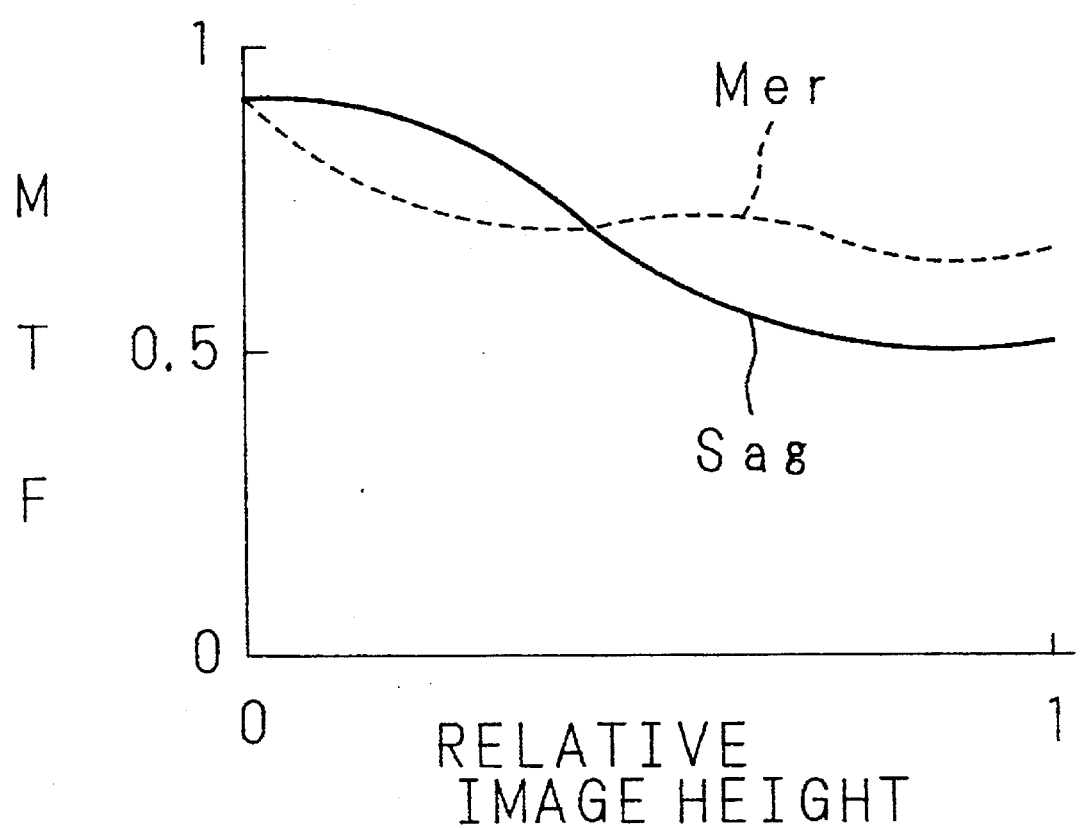
FIG. 8 is a graph showing the resolution characteristic at the optimum focus position when the projection lens shown in FIG. 6 is used in green light (545 nm).
Figure 9:
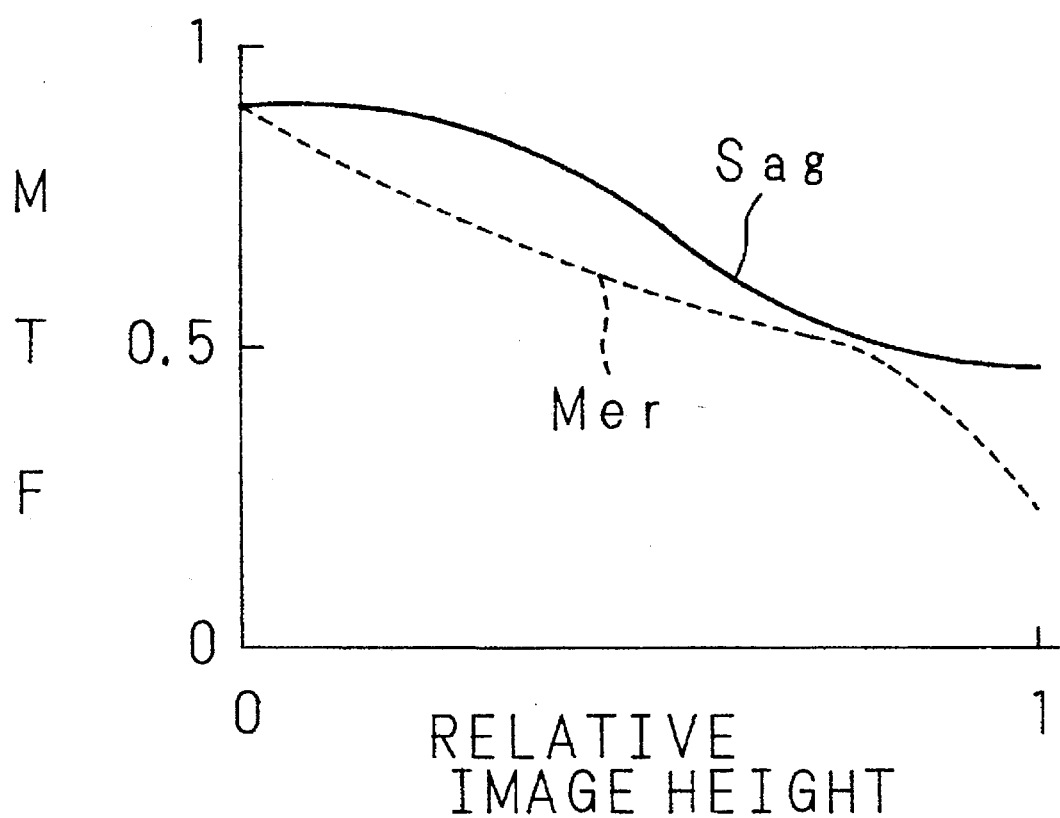
FIG. 9 is a graph showing the resolution characteristic at the optimum focus position when the projection lens shown in FIG. 6 is used in red light (610 nm).
Figure 10:
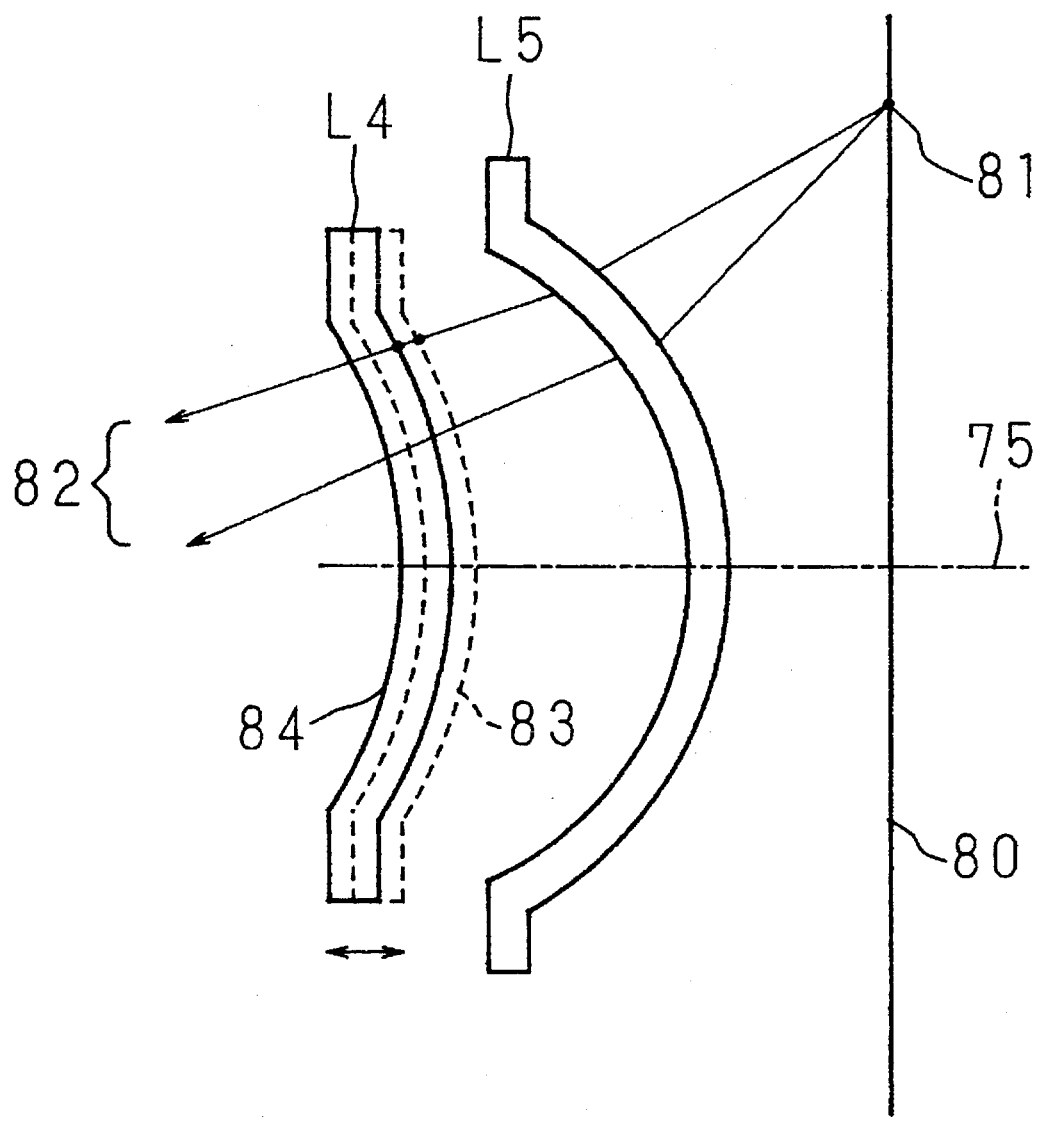
FIG. 10 is an explanatory diagram showing an optical path in a projection lens.

FIG. 48 is a schematic diagram showing an optical path in the projection lens 72 in embodiment 27, corresponding to FIG. 10 showing the parts of the lens elements L4, L5. On the phosphor surfaces 80R, 80G of the CRTs 71R, 71G, the luminous flux 82 emitted from the emission points 81R, 81G in the peripheral area of the screen is refracted deflected by the lens elements L5, L4. The difference in the position of the ray of light passing through the lens elements L5, L4 and the incident angle is evidently smaller than in the prior art, and when the projection lens 72 designed on the basis of the green projection unit is, for example, used in the red projection unit, the design capacity of aberration correction is nearly maintained, and the design performance as shown in FIG. 8 can be obtained. Therefore, the projection units of individual colors may be realized in high picture quality even in the peripheral parts of the screen. In FIG. 48, meanwhile, the position in the plane of the emission points 81R, 81G differs depending on the color, but actually it does not matter because it is as small as hundreds of microns.

In this embodiment, a large focal deviation due to difference in color is corrected by varying the interval of the projection lens 72 and CRT 71 in each projection unit. As a result, it is not necessary to change the interval of the lens element L4 and lens element L5 largely depending on the difference in wavelength, and the focus adjusting mechanism 79 is used only for fine adjustment. Therefore, a projected image of high quality can be realized.

In the explanation herein, on the basis of the green projection unit, the interval of the CRT and projection lens of the red projection unit and green projection unit is changed, but by changing only the red projection unit which is relatively high in the spectral luminous efficiency to a specific interval, when the interval of the blue projection unit is not changed, the projected image is not affected so much.

Figure 4:
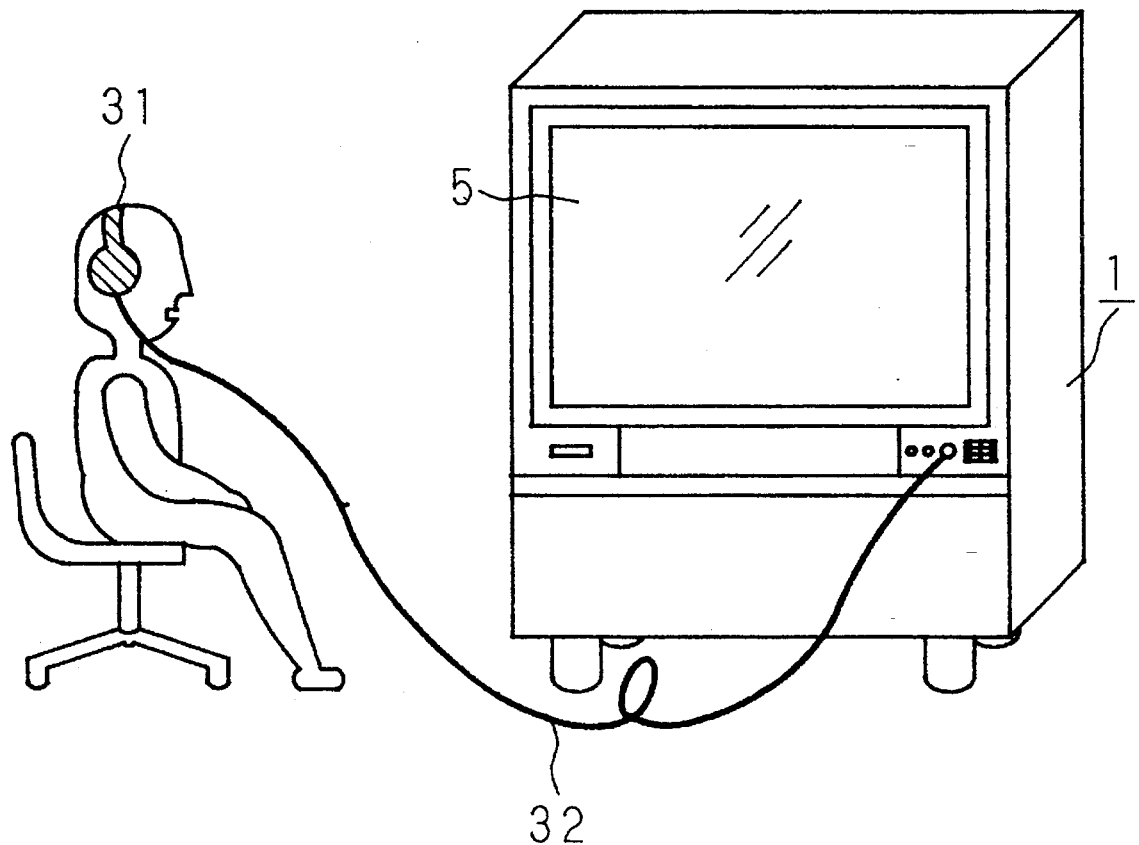
FIG. 4 is a schematic diagram showing the image viewing state in a conventional projection type display apparatus.

In this embodiment, the focus adjusting mechanism 79 is designed to adjust the interval between the lens element L4 and lens element L5, but it may be also designed to adjust the interval between the lens element L5 and the lens element L6. Or, above mentioned effects are obtained by applying any projection lens using an aspherical lens, not limited to the lens type shown FIG. 4.

The projection type display apparatus using CRT is explained so far, but flat image forming means such as liquid crystal panel may be used, or similar effects are obtained when using projection lenses of identical construction in plural optical systems.

The lenses of identical construction mean the lenses are same in shape in lens element and lens barrel, and difference such as reflectionless coating may be individual in the projection units of different colors, which is not related with the invention.

EMBODIMENT 28

FIG. 49 is a structural diagram showing embodiment 28 of a projection type display apparatus of the invention. In embodiment 28, the refractive index of the coolants sealed between the projection lenses 72R, 72G, 72B and CRTs 71R, 71G, 71B differs individually depending on color. On the basis of the refractive index of the coolant 86G of the green projection unit, the refractive index of the red coolant 86R is lower, and the refractive index of the blue coolant 86B is higher, and the difference in refractive indices conforms to the difference in the condensing positions of the projection lenses 72 due to difference in color. More specifically, in the projection type display apparatus same as explained in embodiment 27, the refractive index of the coolant 86G of the green projection unit is 1.40, the refractive index of the coolant 86R of the red projection unit is 1.35, and the refractive index of the coolant 86B of the blue projection unit is 1.50. The method of varying the refractive index of the coolant is to change the mixing ratio of ethylene glycol solution and water, or to add a special solvent, among others. The other constitutions including the interval of the CRT 71 and projection lens 72 are identical in all three projection units. Same reference numerals are given to those same as in embodiment 27, and their explanations are omitted.

FIG. 50 is a schematic diagram for explaining the optical path in the green projection unit in FIG. 49, and FIG. 51 is a schematic diagram for explaining the optical path in the red projection unit in FIG. 49. In FIG. 50, the optical path of the green light G in the projection unit is indicated by solid line, and the red light R is indicated by broken line. In the case of red light R, since the wavelength is longer than in green light G, the focal length is longer. Therefore, the focus is not adjusted unless the CRT is moved to the position indicated by broken line. Herein, as shown in FIG. 51, by using the coolant 86R lower in refractive index than the coolant 86G, the optical distance which is an apparent liquid thickness can be extended than the case shown in FIG. 50 in the case of red light R, and the actual interval of the projection lens 72 and CRT 71 can be set nearly equal in the green projection unit and red projection unit.

Afterwards, by further fine adjustment by using the focus adjusting mechanism 79 of the projection lens 72, the focus can be adjusted precisely.

In embodiment 28, the large focal deviation due to difference in color is corrected not only by the focus adjusting mechanism 79 of the projection lens 72, but also by varying in each color the refractive index of the coolants sealed between the CRT 71 and projection lens 72, and the focus adjusting mechanism 79 is used only for fine adjustment, and it is rarely necessary to vary the relative positions of the lens elements of the projection lens 72. Therefore, when the projection lens 72 designed on the basis of the green projection unit is used in the red projection unit or blue projection unit, a sufficient design performance can be obtained.

EMBODIMENT 29

FIG. 52 is a structural diagram showing embodiment 29 of a projection type display apparatus of the invention. In embodiment 28, by varying the refractive index of coolant in every color, the difference in focal position of each color is corrected, and in this embodiment, as shown in FIG. 52, the coolants of same refractive index are used, and the central thickness of the face plate of the CRT 71 differs in each color. As compared with the face plate 87G of the green projection unit, the central thickness of the face plate 87R of the red projection unit is increased, while the face plate 87B of the blue projection unit is thinner. More specifically, in the same projection type display apparatus as explained in embodiment 27, the central thickness of the face plate 87G of the green projection unit is 14.0, the central thickness of the face plate 87R of the red projection unit is 14.5, and the central thickness of the face plate 87B of the blue projection unit is 13.5, and other constitution is identical in all three projection units. In the parts same as in embodiments 27 and 28, same reference numerals are given and explanations are omitted.

In this embodiment, the difference in focal length as shown in FIG. 46 is corrected by the difference in the thickness of face plate. That is, of the lights emitted from the phosphor surface which is the image forming area of the CRT 71, the red light longer in wavelength than the green light can be extended in the distance to the projection lens 72R, by the face plate 87R thicker than the face plate 87G. By defining this thickness as specified above, the difference between the focal length in the red projection unit and the focal length in the green projection unit can be corrected. In the blue projection unit, by using the face plate 87B thinner than the face plate 87G, the difference between the focal length in the blue projection unit and the focal length in the green projection unit can be corrected. By thus varying the thickness of the face plates, the focal deviation due to difference in wavelength is corrected, so that the focus adjusting extent in the projection lens 2 can be reduced.

EMBODIMENT 30

FIG. 53 is a structural diagram showing embodiment 30 of a projection type display apparatus of the invention, showing essential parts of the projection units. In this embodiment, the central thickness of the lens element L6 at the closest position to the CRT 71 side, contacting with the coolant 7, differs in each color. In the diagram, L6r is a lens element of red projection lens 72R, L6g is a lens element of green projection lens 72G, and L6b is a lens element of blue projection lens 72B. As compared with the lens element L6g of green projection lens 72G, the central thickness of the lens element L6r of the red projection lens 72R is thicker, and the central thickness of the lens element L6b of the blue projection lens 72B is thinner. More specifically, in the same projection type display apparatus as explained in embodiment 27, the central thickness of the lens element L6g of the green projection unit is 3 mm, the central thickness of the lens element L6r of the red projection unit is 3.5 mm, and the central thickness of the lens element L6b of the blue projection unit is 2.5 mm. The other constitution is identical in all three projection units. The parts same as in embodiments 27 to 29 are identified with same reference numerals, and their explanations are omitted.

In this embodiment, the difference in focal length as shown in FIG. 46 is corrected by the difference in thickness of lens elements. That is, of the lights emitted from the CRT 71, the red light longer in wavelength than the green light can be shortened in the substantial distance to the projection lens, by the lens element L6r thicker than the lens element L6g, that is, the distance to the lens elements L3, L4 having strong condensing actions. By defining the thickness as specified, the difference between the focal length in the red projection unit and the focal length in the green projection unit can be corrected. In the blue projection unit, similarly, by using the lens element L6b thinner than the lens element L6g, the difference between the focal length in the blue projection unit and the focal length in the green projection unit can be corrected. Thus, by varying the thickness of the lens elements, the focal deviation due to difference in wavelength is corrected, so that the focal adjusting amount in the projection lens 2 can be curtailed.

EMBODIMENT 31

FIG. 54 is a structural diagram showing embodiment 31 of a projection type display apparatus of the invention. Reference numeral 75R is an optical axis of the red projection unit, 75G is an optical axis of the green projection unit, and 75B is an optical axis of the blue projection unit.

In embodiment 31, the projection distance from the projection lens 72 to the screen 73, that is, the length of the optical axis 75 is set slightly different in each color. The optical axis 75R of the red projection unit is set longer than the optical axis 75G of the green projection unit, and the optical axis 75B of the blue projection unit is set shorter than the optical axis 75G of the green projection unit. More specifically, in the projection type display apparatus same as explained in embodiment 27, the optical axis 75G of the green projection optical axis is 690 mm, the optical axis 75R of the red projection optical axis is 720 mm, and the optical axis 75B of the blue projection optical axis is 660 mm. The other constitution is identical in all three projection units. The same parts as in embodiments 27 to 30 are identified with same reference numerals, and their explanations are omitted.

As mentioned above, it is evident that the focal length varies depending on the difference in wavelength of color. For example, the red color has a longer wavelength than the green color, and when the projection lens designed for green projection unit is used in a red system, it is evident that the focal position is remoter. Therefore, in embodiment 31, the red projection position is preset longer than in green. Besides, since the blue color has a shorter wavelength than the green color, when the projection lens designed for the green projection unit is used in a blue system, it is evident that the focal position becomes nearer. Hence, in embodiment 31, the blue projection position is preset shorter than in the green color. Accordingly, for correcting the difference in the focal position, the adjustment extent of the focal adjusting mechanism of the projection lens can be decreased, and the projection lens designed for green projection unit can be sufficiently used to present its design performance even in the red projection unit and blue projection unit.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A projection type display apparatus comprising:

a plurality of projection units, each of said plurality of projection units including, an image forming apparatus, and at least one projection lens, wherein a distance between said image forming apparatus and said projection lens differs between at least two of said plurality of projection units depending on a wavelength of a ray of light projected therethrough.

2. A projection type display apparatus according to claim 1, further comprising:

a spacer for defining said distance between said image forming apparatus and said projection lens, said spacer including a coolant sealed in a space formed by said image forming apparatus, said projection lens and said spacer; wherein a length of said spacer in an optical axis direction of said ray of light differs in each projection unit depending on said wavelength of said ray of light.

3. A projection type display apparatus according to claim 2, wherein said plurality of projection units include at least three projection units for projecting a red ray of light, a green ray of light, and a blue ray of light, respectively; and wherein said length of said spacer is shorter in an order of a projection unit for projecting said red ray of light, a projection unit for projecting said green ray of light, and a projection unit for projecting said blue ray of light.

4. A projection type display apparatus, comprising:

a plurality of projection units, each of said projection units having, an image forming apparatus, at least one projection lens, and a coolant sealed between said image forming apparatus and said projection, lens, wherein a refractive index of said coolant differs between at least two of said projection units depending on a wavelength of a ray of light projected therethrough.

5. A projection type display apparatus according to claim 4, wherein said plurality of projection units include at least three projection units for projecting a red ray of light, a green ray of light, and a blue ray of light, respectively; and said refractive index of said coolant increases in an order of a projection unit for projecting said red ray of light, a projection unit for projecting said green ray of light, and a projection unit for projecting said blue ray of light.

6. A projection type display apparatus, comprising:

a plurality of projection units, each of said projection units having, an image forming apparatus, and at least one projection lens, wherein a central thickness of a face plate of said image forming apparatus differs between at least two of said projection units depending on a wavelength of a ray of light projected therethrough.

7. A projection type display apparatus according to claim 6, wherein said plurality of projection units include at least three projection units for projecting a red ray of light, a green ray of light, and a blue ray of light, respectively; and said central thickness of said face plate decreases in an order of a projection unit for projecting said red ray of light, a projection unit for projecting said green ray of light, and a projection unit for projecting said blue ray of light.

8. A projection type display apparatus, comprising:

a plurality of projection units, each of said projection units having, an image forming apparatus, and at least one projection lens, said projection lens including a plurality of lens elements, wherein a central thickness of one of said plurality of lens elements located most closely to said image forming apparatus differs between at least two of said projection units depending on a wavelength of a ray of light projected therethrough.

9. A projection type display apparatus according to claim 8, wherein said plurality of projection units include at least three projection units for projecting a red ray of light, a green ray of light, and a blue ray of light, respectively; and said central thickness of said lens element decreases in an order of a projection unit for projecting said red ray of light, a projection unit for projecting said green ray of light, and a projection unit for projecting said blue ray of light.

10. A projection type display apparatus, comprising:

a plurality of projection units, each of said projection units having, an image forming apparatus, and at least one projection lens; and a screen, wherein a projection distance from said projection lens to a center portion of said screen differs between at least two projection units depending on a wavelength of a ray of light projected therethrough.

11. A projection type display apparatus according to claim 10, wherein said plurality of projection units include at least three projection units for projecting a red ray of light, a green ray of light, and a blue ray of light, respectively; and said projection distance shortens in an order of a projection unit for projecting said red ray of light, a projection unit for passing said green ray of light, and a projection unit for passing said blue ray of light.

* * * * *